US011043848B2

(12) United States Patent
Danilovic et al.

(10) Patent No.: US 11,043,848 B2
(45) Date of Patent: Jun. 22, 2021

(54) PROTECTION AND CONTROL OF WIRELESS POWER SYSTEMS

(71) Applicant: WiTricity Corporation, Watertown, MA (US)

(72) Inventors: Milisav Danilovic, Watertown, MA (US); Bryan Ashworth Esteban, Belmont, MA (US); Kinjeo Yeung, Newton, MA (US)

(73) Assignee: WiTricity Corporation, Watertown, MA (US)

( * ) Notice: Subject to any disclaimer, the term of this patent is extended or adjusted under 35 U.S.C. 154(b) by 418 days.

(21) Appl. No.: 16/024,045

(22) Filed: Jun. 29, 2018

(65) Prior Publication Data
US 2019/0006836 A1   Jan. 3, 2019

Related U.S. Application Data

(60) Provisional application No. 62/526,842, filed on Jun. 29, 2017, provisional application No. 62/608,052, (Continued)

(51) Int. Cl.
*H02J 50/12* (2016.01)
*H02H 7/122* (2006.01)
(Continued)

(52) U.S. Cl.
CPC .............. *H02J 50/12* (2016.02); *H02H 3/20* (2013.01); *H02H 3/38* (2013.01); *H02H 3/44* (2013.01);
(Continued)

(58) Field of Classification Search
CPC .. H02J 7/025; H02J 50/80; H02J 50/12; H02J 5/005; H02H 3/20; H02H 7/1227; H02H 3/44; H02H 7/122
See application file for complete search history.

(56) References Cited

U.S. PATENT DOCUMENTS 645,576 A   3/1900 Tesla
649,621 A   5/1900 Tesla
(Continued)

FOREIGN PATENT DOCUMENTS

CA   142352   8/1912
CN   102239633   11/2011
(Continued)

OTHER PUBLICATIONS

International Search Report and Written Opinion of the International Searching Authority for International Application No. PCT/US2018/040411 dated Oct. 1, 2018.
(Continued)

Primary Examiner — Jared Fureman
Assistant Examiner — Duc M Pham
(74) Attorney, Agent, or Firm — Fish & Richardson P.C.

(57) ABSTRACT

One general aspect includes methods, systems, and apparatus, including computer programs encoded on a computer storage medium, for fault protection of a bidirectional wireless power transfer system. The method includes the actions of detecting, by control circuitry of a wireless power transfer device, a fault for the bidirectional wireless power transfer system. Identifying an operating personality of the wireless power transfer device and a hardware configuration of the wireless power transfer device. Identifying, in response to detecting the fault and based on the operating personality and the hardware configuration, protection operations for protecting the wireless power transfer device from the fault. Controlling operations of the wireless power transfer device according to the protection operations. Other implementations of this aspect include corresponding systems, circuitry, controllers, apparatus, and computer programs, configured to perform the actions of the methods, encoded on computer storage devices.

20 Claims, 42 Drawing Sheets

Related U.S. Application Data filed on Dec. 20, 2017, provisional application No. 62/662,148, filed on Apr. 24, 2018, provisional application No. 62/662,462, filed on Apr. 25, 2018, provisional application No. 62/662,486, filed on Apr. 25, 2018.

(51) Int. Cl.

| | | |
|---|---|---|
| H02H 3/38 | (2006.01) | |
| H02H 3/44 | (2006.01) | |
| H02H 7/125 | (2006.01) | |
| H02J 50/80 | (2016.01) | |
| H02J 50/60 | (2016.01) | |
| H02H 3/20 | (2006.01) | |
| H02J 5/00 | (2016.01) | |
| H02J 7/02 | (2016.01) | |
| H02J 7/04 | (2006.01) | |

(52) U.S. Cl.
CPC .......... *H02H 7/122* (2013.01); *H02H 7/1227* (2013.01); *H02H 7/1252* (2013.01); *H02J 5/005* (2013.01); *H02J 7/025* (2013.01); *H02J 7/045* (2013.01); *H02J 50/60* (2016.02); *H02J 50/80* (2016.02)

(56) References Cited

U.S. PATENT DOCUMENTS

| | | |
|---|---|---|
| 787,412 A | 4/1905 | Tesla |
| 1,119,732 A | 12/1914 | Tesla |
| 2,133,494 A | 10/1938 | Waters |
| 3,517,350 A | 6/1970 | Beaver |
| 3,535,543 A | 10/1970 | Dailey |
| 3,780,425 A | 12/1973 | Penn et al. |
| 3,871,176 A | 3/1975 | Schukei |
| 4,088,999 A | 5/1978 | Fletcher et al. |
| 4,095,998 A | 6/1978 | Hanson |
| 4,180,795 A | 12/1979 | Matsuda et al. |
| 4,280,129 A | 7/1981 | Wells |
| 4,450,431 A | 5/1984 | Hochstein |
| 4,588,978 A | 5/1986 | Allen |
| 5,027,709 A | 7/1991 | Slagle |
| 5,033,295 A | 7/1991 | Schmid et al. |
| 5,034,658 A | 7/1991 | Hiering et al. |
| 5,053,774 A | 10/1991 | Schuermann et al. |
| 5,070,293 A | 12/1991 | Ishii et al. |
| 5,118,997 A | 6/1992 | El-Hamamsy |
| 5,216,402 A | 6/1993 | Carosa |
| 5,229,652 A | 7/1993 | Hough |
| 5,287,112 A | 2/1994 | Schuermann |
| 5,341,083 A | 8/1994 | Klontz et al. |
| 5,367,242 A | 11/1994 | Hulman |
| 5,374,930 A | 12/1994 | Schuermann |
| 5,408,209 A | 4/1995 | Tanzer et al. |
| 5,437,057 A | 7/1995 | Richley et al. |
| 5,455,467 A | 10/1995 | Young et al. |
| 5,493,691 A | 2/1996 | Barrett |
| 5,522,856 A | 6/1996 | Reineman |
| 5,528,113 A | 6/1996 | Boys et al. |
| 5,541,604 A | 7/1996 | Meier |
| 5,550,452 A | 8/1996 | Shirai et al. |
| 5,565,763 A | 10/1996 | Arrendale et al. |
| 5,608,276 A | 3/1997 | Suelzle |
| 5,630,835 A | 5/1997 | Brownlee |
| 5,697,956 A | 12/1997 | Bornzin |
| 5,703,461 A | 12/1997 | Minoshima et al. |
| 5,703,573 A | 12/1997 | Fujimoto et al. |
| 5,710,413 A | 1/1998 | King et al. |
| 5,742,471 A | 4/1998 | Barbee, Jr. et al. |
| 5,821,728 A | 10/1998 | Sshwind |
| 5,821,731 A | 10/1998 | Kuki et al. |
| 5,864,323 A | 1/1999 | Berthon |
| 5,898,579 A | 4/1999 | Boys et al. |
| 5,903,134 A | 5/1999 | Takeuchi |
| 5,923,544 A | 7/1999 | Urano |
| 5,940,509 A | 8/1999 | Jovanovich et al. |
| 5,957,956 A | 9/1999 | Kroll et al. |
| 5,959,245 A | 9/1999 | Moe et al. |
| 5,986,895 A | 11/1999 | Stewart et al. |
| 5,993,996 A | 11/1999 | Firsich |
| 5,999,308 A | 12/1999 | Nelson et al. |
| 6,012,659 A | 1/2000 | Nakazawa et al. |
| 6,047,214 A | 4/2000 | Mueller et al. |
| 6,066,163 A | 5/2000 | John |
| 6,067,473 A | 5/2000 | Greeninger et al. |
| 6,108,579 A | 8/2000 | Snell et al. |
| 6,127,799 A | 10/2000 | Krishnan |
| 6,176,433 B1 | 1/2001 | Uesaka et al. |
| 6,184,651 B1 | 2/2001 | Fernandez et al. |
| 6,207,887 B1 | 3/2001 | Bass et al. |
| 6,232,841 B1 | 5/2001 | Bartlett et al. |
| 6,238,387 B1 | 5/2001 | Miller, III |
| 6,252,762 B1 | 6/2001 | Amatucci |
| 6,301,128 B1 | 10/2001 | Jang et al. |
| 6,436,299 B1 | 8/2002 | Baarman et al. |
| 6,450,946 B1 | 9/2002 | Forsell |
| 6,452,465 B1 | 9/2002 | Brown et al. |
| 6,459,218 B2 | 10/2002 | Boys et al. |
| 6,473,028 B1 | 10/2002 | Luc |
| 6,483,202 B1 | 11/2002 | Boys |
| 6,515,878 B1 | 2/2003 | Meins et al. |
| 6,535,133 B2 | 3/2003 | Gohara |
| 6,561,975 B1 | 5/2003 | Pool et al. |
| 6,563,425 B2 | 5/2003 | Nicholson et al. |
| 6,597,076 B2 | 7/2003 | Scheible et al. |
| 6,609,023 B1 | 8/2003 | Fischell et al. |
| 6,631,072 B1 | 10/2003 | Paul et al. |
| 6,650,227 B1 | 11/2003 | Bradin |
| 6,664,770 B1 | 12/2003 | Bartels |
| 6,673,250 B2 | 1/2004 | Kuennen et al. |
| 6,683,256 B2 | 1/2004 | Kao |
| 6,696,647 B2 | 2/2004 | Ono et al. |
| 6,703,921 B1 | 3/2004 | Wuidart et al. |
| 6,731,071 B2 | 5/2004 | Baarman |
| 6,749,119 B2 | 6/2004 | Scheible et al. |
| 6,772,011 B2 | 8/2004 | Dolgin |
| 6,798,716 B1 | 9/2004 | Charych |
| 6,803,744 B1 | 10/2004 | Sabo |
| 6,806,649 B2 | 10/2004 | Mollema et al. |
| 6,812,645 B2 | 11/2004 | Baarman |
| 6,825,620 B2 | 11/2004 | Kuennen et al. |
| 6,831,417 B2 | 12/2004 | Baarman |
| 6,839,035 B1 | 1/2005 | Addonisio et al. |
| 6,844,702 B2 | 1/2005 | Giannopoulos et al. |
| 6,856,291 B2 | 2/2005 | Mickle et al. |
| 6,858,970 B2 | 2/2005 | Malkin et al. |
| 6,906,495 B2 | 6/2005 | Cheng et al. |
| 6,917,163 B2 | 7/2005 | Baarman |
| 6,917,431 B2 | 7/2005 | Soljacic et al. |
| 6,937,130 B2 | 8/2005 | Scheible et al. |
| 6,960,968 B2 | 11/2005 | Odendaal et al. |
| 6,961,619 B2 | 11/2005 | Casey |
| 6,967,462 B1 | 11/2005 | Landis |
| 6,975,198 B2 | 12/2005 | Baarman |
| 6,988,026 B2 | 1/2006 | Breed et al. |
| 7,027,311 B2 | 4/2006 | Vanderelli et al. |
| 7,035,076 B1 | 4/2006 | Stevenson |
| 7,042,196 B2 | 5/2006 | Ka-Lai et al. |
| 7,069,064 B2 | 6/2006 | Govorgian et al. |
| 7,084,605 B2 | 8/2006 | Mickle et al. |
| 7,116,200 B2 | 10/2006 | Baarman et al. |
| 7,118,240 B2 | 10/2006 | Baarman et al. |
| 7,126,450 B2 | 10/2006 | Baarman et al. |
| 7,127,293 B2 | 10/2006 | MacDonald |
| 7,132,918 B2 | 11/2006 | Baarman et al. |
| 7,147,604 B1 | 12/2006 | Allen et al. |
| 7,180,248 B2 | 2/2007 | Kuennen et al. |
| 7,191,007 B2 | 3/2007 | Desai et al. |
| 7,193,418 B2 | 3/2007 | Freytag |
| D541,322 S | 4/2007 | Garrett et al. |
| 7,212,414 B2 | 5/2007 | Baarman |
| 7,233,137 B2 | 6/2007 | Nakamura et al. |

(56) References Cited

U.S. PATENT DOCUMENTS

| | | |
|---|---|---|
| D545,855 S | 7/2007 | Garrett et al. |
| 7,239,110 B2 | 7/2007 | Cheng et al. |
| 7,248,017 B2 | 7/2007 | Cheng et al. |
| 7,251,527 B2 | 7/2007 | Lyden |
| 7,288,918 B2 | 10/2007 | DiStefano |
| 7,340,304 B2 | 3/2008 | MacDonald |
| 7,375,492 B2 | 5/2008 | Calhoon et al. |
| 7,375,493 B2 | 5/2008 | Calhoon et al. |
| 7,378,817 B2 | 5/2008 | Calhoon et al. |
| 7,382,636 B2 | 6/2008 | Baarman et al. |
| 7,385,357 B2 | 6/2008 | Kuennen et al. |
| 7,443,135 B2 | 10/2008 | Cho |
| 7,462,951 B1 | 12/2008 | Baarman |
| 7,466,213 B2 | 12/2008 | Lobl et al. |
| 7,471,062 B2 | 12/2008 | Bruning |
| 7,474,058 B2 | 1/2009 | Baarman |
| 7,492,247 B2 | 2/2009 | Schmidt et al. |
| 7,514,818 B2 | 4/2009 | Abe et al. |
| 7,518,267 B2 | 4/2009 | Baarman |
| 7,521,890 B2 | 4/2009 | Lee et al. |
| 7,525,283 B2 | 4/2009 | Cheng et al. |
| 7,545,337 B2 | 6/2009 | Guenther |
| 7,554,316 B2 | 6/2009 | Stevens et al. |
| 7,599,743 B2 | 10/2009 | Hassler, Jr. et al. |
| 7,615,936 B2 | 11/2009 | Baarman et al. |
| 7,639,514 B2 | 12/2009 | Baarman |
| 7,741,734 B2 | 6/2010 | Joannopoulos et al. |
| 7,795,708 B2 | 9/2010 | Katti |
| 7,825,543 B2 | 11/2010 | Karalis et al. |
| 7,825,544 B2 | 11/2010 | Jansen et al. |
| 7,835,417 B2 | 11/2010 | Heideman et al. |
| 7,843,288 B2 | 11/2010 | Lee et al. |
| 7,844,306 B2 | 11/2010 | Shearer et al. |
| 7,863,859 B2 | 1/2011 | Soar |
| 7,880,337 B2 | 2/2011 | Farkas |
| 7,884,697 B2 | 2/2011 | Wei et al. |
| 7,885,050 B2 | 2/2011 | Lee |
| 7,919,886 B2 | 4/2011 | Tanaka |
| 7,923,870 B2 | 4/2011 | Jin |
| 7,932,798 B2 | 4/2011 | Tolle et al. |
| 7,948,209 B2 | 5/2011 | Jung |
| 7,952,322 B2 | 5/2011 | Partovi et al. |
| 7,963,941 B2 | 6/2011 | Wilk |
| 7,969,045 B2 | 6/2011 | Schmidt et al. |
| 7,994,880 B2 | 8/2011 | Chen et al. |
| 7,999,506 B1 | 8/2011 | Hollar et al. |
| 8,022,576 B2 | 9/2011 | Joannopoulos et al. |
| 8,035,255 B2 | 10/2011 | Kurs et al. |
| 8,076,800 B2 | 12/2011 | Joannopoulos et al. |
| 8,076,801 B2 | 12/2011 | Karalis et al. |
| 8,084,889 B2 | 12/2011 | Joannopoulos et al. |
| 8,097,983 B2 | 1/2012 | Karalis et al. |
| 8,106,539 B2 | 1/2012 | Schatz et al. |
| 8,115,448 B2 | 2/2012 | John |
| 8,131,378 B2 | 3/2012 | Greenberg et al. |
| 8,178,995 B2 | 5/2012 | Amano et al. |
| 8,193,769 B2 | 6/2012 | Azancot et al. |
| 8,212,414 B2 | 7/2012 | Howard et al. |
| 8,260,200 B2 | 9/2012 | Shimizu et al. |
| 8,304,935 B2 | 11/2012 | Karalis et al. |
| 8,324,759 B2 | 12/2012 | Karalis et al. |
| 8,334,620 B2 | 12/2012 | Park et al. |
| 8,362,651 B2 | 1/2013 | Hamam et al. |
| 8,395,282 B2 | 3/2013 | Joannopoulos et al. |
| 8,395,283 B2 | 3/2013 | Joannopoulos et al. |
| 8,400,017 B2 | 3/2013 | Kurs et al. |
| 8,400,018 B2 | 3/2013 | Joannopoulos et al. |
| 8,400,019 B2 | 3/2013 | Joannopoulos et al. |
| 8,400,020 B2 | 3/2013 | Joannopoulos et al. |
| 8,400,021 B2 | 3/2013 | Joannopoulos et al. |
| 8,400,022 B2 | 3/2013 | Joannopoulos et al. |
| 8,400,023 B2 | 3/2013 | Joannopoulos et al. |
| 8,400,024 B2 | 3/2013 | Joannopoulos et al. |
| 8,410,636 B2 | 4/2013 | Kurs et al. |
| 8,441,154 B2 | 5/2013 | Karalis et al. |
| 8,457,547 B2 | 6/2013 | Meskens |
| 8,461,719 B2 | 6/2013 | Kesler et al. |
| 8,461,720 B2 | 6/2013 | Kurs et al. |
| 8,461,721 B2 | 6/2013 | Karalis et al. |
| 8,461,722 B2 | 6/2013 | Kurs et al. |
| 8,461,817 B2 | 6/2013 | Martin et al. |
| 8,466,583 B2 | 6/2013 | Karalis et al. |
| 8,471,410 B2 | 6/2013 | Karalis et al. |
| 8,476,788 B2 | 7/2013 | Karalis et al. |
| 8,482,157 B2 | 7/2013 | Cook et al. |
| 8,482,158 B2 | 7/2013 | Kurs et al. |
| 8,487,480 B1 | 7/2013 | Kesler et al. |
| 8,497,601 B2 | 7/2013 | Hall et al. |
| 8,552,592 B2 | 10/2013 | Schatz et al. |
| 8,569,914 B2 | 10/2013 | Karalis et al. |
| 8,587,153 B2 | 11/2013 | Schatz et al. |
| 8,587,155 B2 | 11/2013 | Giler et al. |
| 8,598,743 B2 | 12/2013 | Hall et al. |
| 8,618,696 B2 | 12/2013 | Karalis et al. |
| 8,629,578 B2 | 1/2014 | Kurs et al. |
| 8,643,326 B2 | 2/2014 | Campanella et al. |
| 2002/0032471 A1 | 3/2002 | Loftin et al. |
| 2002/0105343 A1 | 8/2002 | Scheible et al. |
| 2002/0118004 A1 | 8/2002 | Scheible et al. |
| 2002/0130642 A1 | 9/2002 | Ettes et al. |
| 2002/0167294 A1 | 11/2002 | Odaohhara |
| 2003/0038641 A1 | 2/2003 | Scheible |
| 2003/0062794 A1 | 4/2003 | Scheible et al. |
| 2003/0062980 A1 | 4/2003 | Scheible et al. |
| 2003/0071034 A1 | 4/2003 | Thompson et al. |
| 2003/0124050 A1 | 7/2003 | Yadav et al. |
| 2003/0126948 A1 | 7/2003 | Yadav et al. |
| 2003/0160590 A1 | 8/2003 | Schaefer et al. |
| 2003/0199778 A1 | 10/2003 | Mickle et al. |
| 2003/0214255 A1 | 11/2003 | Baarman et al. |
| 2004/0000974 A1 | 1/2004 | Odenaal et al. |
| 2004/0026998 A1 | 2/2004 | Henriott et al. |
| 2004/0100338 A1 | 5/2004 | Clark |
| 2004/0113847 A1 | 6/2004 | Qi et al. |
| 2004/0130425 A1 | 7/2004 | Dayan et al. |
| 2004/0130915 A1 | 7/2004 | Baarman |
| 2004/0130916 A1 | 7/2004 | Baarman |
| 2004/0142733 A1 | 7/2004 | Parise |
| 2004/0150934 A1 | 8/2004 | Baarman |
| 2004/0189246 A1 | 9/2004 | Bulai et al. |
| 2004/0201361 A1 | 10/2004 | Koh et al. |
| 2004/0222751 A1 | 11/2004 | Mollema et al. |
| 2004/0227057 A1 | 11/2004 | Tuominen et al. |
| 2004/0232845 A1 | 11/2004 | Baarman |
| 2004/0233043 A1 | 11/2004 | Yazawa et al. |
| 2004/0267501 A1 | 12/2004 | Freed et al. |
| 2005/0007067 A1 | 1/2005 | Baarman et al. |
| 2005/0021134 A1 | 1/2005 | Opie |
| 2005/0027192 A1 | 2/2005 | Govari et al. |
| 2005/0033382 A1 | 2/2005 | Single |
| 2005/0085873 A1 | 4/2005 | Gord et al. |
| 2005/0093475 A1 | 5/2005 | Kuennen et al. |
| 2005/0104064 A1 | 5/2005 | Hegarty et al. |
| 2005/0104453 A1 | 5/2005 | Vanderelli et al. |
| 2005/0116650 A1 | 6/2005 | Baarman |
| 2005/0116683 A1 | 6/2005 | Cheng et al. |
| 2005/0122058 A1 | 6/2005 | Baarman et al. |
| 2005/0122059 A1 | 6/2005 | Baarman et al. |
| 2005/0125093 A1 | 6/2005 | Kikuchi et al. |
| 2005/0127849 A1 | 6/2005 | Baarman et al. |
| 2005/0127850 A1 | 6/2005 | Baarman et al. |
| 2005/0127866 A1 | 6/2005 | Hamilton et al. |
| 2005/0135122 A1 | 6/2005 | Cheng et al. |
| 2005/0140482 A1 | 6/2005 | Cheng et al. |
| 2005/0151511 A1 | 7/2005 | Chary |
| 2005/0156560 A1 | 7/2005 | Shimaoka et al. |
| 2005/0189945 A1 | 9/2005 | Reiderman |
| 2005/0194926 A1 | 9/2005 | DiStefano |
| 2005/0253152 A1 | 11/2005 | Klimov et al. |
| 2005/0285445 A1* | 12/2005 | Wruck .............. H02J 1/14 307/10.1 |
| 2005/0288739 A1 | 12/2005 | Hassler, Jr. et al. |
| 2005/0288740 A1 | 12/2005 | Hassler, Jr. et al. |
| 2005/0288741 A1 | 12/2005 | Hassler, Jr. et al. |

(56) References Cited

U.S. PATENT DOCUMENTS

| | | |
|---|---|---|
| 2005/0288742 A1 | 12/2005 | Giordano et al. |
| 2006/0001509 A1 | 1/2006 | Gibbs |
| 2006/0010902 A1 | 1/2006 | Trinh et al. |
| 2006/0022636 A1 | 2/2006 | Xian et al. |
| 2006/0053296 A1 | 3/2006 | Busboom et al. |
| 2006/0061323 A1 | 3/2006 | Cheng et al. |
| 2006/0066443 A1 | 3/2006 | Hall |
| 2006/0090956 A1 | 5/2006 | Peshkovskiy et al. |
| 2006/0132045 A1 | 6/2006 | Baarman |
| 2006/0164866 A1 | 7/2006 | Vanderelli et al. |
| 2006/0181242 A1 | 8/2006 | Freed et al. |
| 2006/0184209 A1 | 8/2006 | John et al. |
| 2006/0184210 A1 | 8/2006 | Singhal et al. |
| 2006/0185809 A1 | 8/2006 | Elfrink et al. |
| 2006/0199620 A1 | 9/2006 | Greene et al. |
| 2006/0202665 A1 | 9/2006 | Hsu |
| 2006/0205381 A1 | 9/2006 | Beart et al. |
| 2006/0214626 A1 | 9/2006 | Nilson et al. |
| 2006/0219448 A1 | 10/2006 | Grieve et al. |
| 2006/0238365 A1 | 10/2006 | Vecchione et al. |
| 2006/0270440 A1 | 11/2006 | Shearer et al. |
| 2006/0281435 A1 | 12/2006 | Shearer et al. |
| 2007/0010295 A1 | 1/2007 | Greene et al. |
| 2007/0013483 A1 | 1/2007 | Stewart |
| 2007/0016089 A1 | 1/2007 | Fischell et al. |
| 2007/0021140 A1 | 1/2007 | Keyes, IV et al. |
| 2007/0024246 A1 | 2/2007 | Flaugher |
| 2007/0064406 A1 | 3/2007 | Beart |
| 2007/0069687 A1 | 3/2007 | Suzuki |
| 2007/0096875 A1 | 5/2007 | Waterhouse et al. |
| 2007/0105429 A1 | 5/2007 | Kohl et al. |
| 2007/0117596 A1 | 5/2007 | Greene et al. |
| 2007/0126650 A1 | 6/2007 | Guenther |
| 2007/0145830 A1 | 6/2007 | Lee et al. |
| 2007/0164839 A1 | 7/2007 | Naito |
| 2007/0171681 A1 | 7/2007 | Baarman |
| 2007/0176840 A1 | 8/2007 | Pristas et al. |
| 2007/0178945 A1 | 8/2007 | Cook et al. |
| 2007/0182367 A1 | 8/2007 | Partovi |
| 2007/0208263 A1 | 9/2007 | John et al. |
| 2007/0222542 A1 | 9/2007 | Joannopoulos et al. |
| 2007/0257636 A1 | 11/2007 | Phillips et al. |
| 2007/0267918 A1 | 11/2007 | Gyland |
| 2007/0276538 A1 | 11/2007 | Kjellsson et al. |
| 2008/0012569 A1 | 1/2008 | Hall et al. |
| 2008/0014897 A1 | 1/2008 | Cook et al. |
| 2008/0030415 A1 | 2/2008 | Homan et al. |
| 2008/0036588 A1 | 2/2008 | Iverson et al. |
| 2008/0047727 A1 | 2/2008 | Sexton et al. |
| 2008/0051854 A1 | 2/2008 | Bulkes et al. |
| 2008/0067874 A1 | 3/2008 | Tseng |
| 2008/0132909 A1 | 6/2008 | Jascob et al. |
| 2008/0154331 A1 | 6/2008 | John et al. |
| 2008/0176521 A1 | 7/2008 | Singh et al. |
| 2008/0191638 A1 | 8/2008 | Kuennen et al. |
| 2008/0197710 A1 | 8/2008 | Kreitz et al. |
| 2008/0197802 A1 | 8/2008 | Onishi et al. |
| 2008/0211320 A1 | 9/2008 | Cook et al. |
| 2008/0238364 A1 | 10/2008 | Weber et al. |
| 2008/0255901 A1 | 10/2008 | Carroll et al. |
| 2008/0265684 A1 | 10/2008 | Farkas |
| 2008/0266748 A1 | 10/2008 | Lee |
| 2008/0272860 A1 | 11/2008 | Pance |
| 2008/0273242 A1 | 11/2008 | Woodgate et al. |
| 2008/0278264 A1 | 11/2008 | Karalis et al. |
| 2008/0291277 A1 | 11/2008 | Jacobsen et al. |
| 2008/0300657 A1 | 12/2008 | Stultz |
| 2008/0300660 A1 | 12/2008 | John |
| 2009/0010028 A1 | 1/2009 | Baarmen et al. |
| 2009/0015075 A1 | 1/2009 | Cook et al. |
| 2009/0033280 A1 | 2/2009 | Choi et al. |
| 2009/0033564 A1 | 2/2009 | Cook et al. |
| 2009/0038623 A1 | 2/2009 | Farbarik et al. |
| 2009/0045772 A1 | 2/2009 | Cook et al. |
| 2009/0051224 A1 | 2/2009 | Cook et al. |
| 2009/0058189 A1 | 3/2009 | Cook et al. |
| 2009/0058361 A1 | 3/2009 | John |
| 2009/0067198 A1 | 3/2009 | Graham et al. |
| 2009/0072627 A1 | 3/2009 | Cook et al. |
| 2009/0072628 A1 | 3/2009 | Cook et al. |
| 2009/0072629 A1 | 3/2009 | Cook et al. |
| 2009/0072782 A1 | 3/2009 | Randall |
| 2009/0079268 A1 | 3/2009 | Cook et al. |
| 2009/0079387 A1 | 3/2009 | Jin et al. |
| 2009/0085408 A1 | 4/2009 | Bruhn |
| 2009/0085706 A1 | 4/2009 | Baarman et al. |
| 2009/0096413 A1 | 4/2009 | Patovi et al. |
| 2009/0102292 A1 | 4/2009 | Cook et al. |
| 2009/0108679 A1 | 4/2009 | Porwal |
| 2009/0108997 A1 | 4/2009 | Patterson et al. |
| 2009/0115628 A1 | 5/2009 | Dicks et al. |
| 2009/0127937 A1 | 5/2009 | Widmer et al. |
| 2009/0134712 A1 | 5/2009 | Cook et al. |
| 2009/0146892 A1 | 6/2009 | Shimizu et al. |
| 2009/0153273 A1 | 6/2009 | Chen |
| 2009/0160261 A1 | 6/2009 | Elo |
| 2009/0161078 A1 | 6/2009 | Wu et al. |
| 2009/0167449 A1 | 7/2009 | Cook et al. |
| 2009/0174263 A1 | 7/2009 | Baarman et al. |
| 2009/0179502 A1 | 7/2009 | Cook et al. |
| 2009/0188396 A1 | 7/2009 | Hofmann et al. |
| 2009/0189458 A1 | 7/2009 | Kawasaki |
| 2009/0195332 A1 | 8/2009 | Joannopoulos et al. |
| 2009/0195333 A1 | 8/2009 | Joannopoulos et al. |
| 2009/0212636 A1 | 8/2009 | Cook et al. |
| 2009/0213028 A1 | 8/2009 | Cook et al. |
| 2009/0218884 A1 | 9/2009 | Soar |
| 2009/0224608 A1 | 9/2009 | Cook et al. |
| 2009/0224609 A1 | 9/2009 | Cook et al. |
| 2009/0224723 A1 | 9/2009 | Tanabe |
| 2009/0224856 A1 | 9/2009 | Karalis et al. |
| 2009/0230777 A1 | 9/2009 | Baarman et al. |
| 2009/0237194 A1 | 9/2009 | Waffenschmidt et al. |
| 2009/0243394 A1 | 10/2009 | Levine |
| 2009/0243397 A1 | 10/2009 | Cook et al. |
| 2009/0251008 A1 | 10/2009 | Sugaya |
| 2009/0261778 A1 | 10/2009 | Kook |
| 2009/0267558 A1 | 10/2009 | Jung |
| 2009/0267709 A1 | 10/2009 | Joannopoulos et al. |
| 2009/0267710 A1 | 10/2009 | Joannopoulos et al. |
| 2009/0271047 A1 | 10/2009 | Wakamatsu |
| 2009/0271048 A1 | 10/2009 | Wakamatsu |
| 2009/0273242 A1 | 11/2009 | Cook |
| 2009/0273318 A1 | 11/2009 | Rondoni et al. |
| 2009/0281678 A1 | 11/2009 | Wakamatsu |
| 2009/0284082 A1 | 11/2009 | Mohammadian |
| 2009/0284083 A1 | 11/2009 | Karalis et al. |
| 2009/0284218 A1 | 11/2009 | Mohammadian et al. |
| 2009/0284220 A1 | 11/2009 | Toncich et al. |
| 2009/0284227 A1 | 11/2009 | Mohammadian et al. |
| 2009/0284245 A1 | 11/2009 | Kirby et al. |
| 2009/0284369 A1 | 11/2009 | Toncich et al. |
| 2009/0286470 A1 | 11/2009 | Mohammadian et al. |
| 2009/0286475 A1 | 11/2009 | Toncich et al. |
| 2009/0286476 A1 | 11/2009 | Toncich et al. |
| 2009/0289595 A1 | 11/2009 | Chen et al. |
| 2009/0299918 A1 | 12/2009 | Cook et al. |
| 2009/0308933 A1 | 12/2009 | Osada |
| 2009/0322158 A1 | 12/2009 | Stevens et al. |
| 2009/0322280 A1 | 12/2009 | Kamijo et al. |
| 2010/0015918 A1 | 1/2010 | Liu et al. |
| 2010/0017249 A1 | 1/2010 | Fincham et al. |
| 2010/0033021 A1 | 2/2010 | Bennett |
| 2010/0034238 A1 | 2/2010 | Bennett |
| 2010/0036773 A1 | 2/2010 | Bennett |
| 2010/0038970 A1 | 2/2010 | Cook et al. |
| 2010/0045114 A1 | 2/2010 | Sample et al. |
| 2010/0052431 A1 | 3/2010 | Mita |
| 2010/0052811 A1 | 3/2010 | Smith et al. |
| 2010/0060077 A1 | 3/2010 | Paulus et al. |
| 2010/0065352 A1 | 3/2010 | Ichikawa |
| 2010/0066349 A1 | 3/2010 | Lin et al. |
| 2010/0076524 A1 | 3/2010 | Forsberg et al. |
| 2010/0081379 A1 | 4/2010 | Cooper et al. |

(56) References Cited

U.S. PATENT DOCUMENTS

| | | |
|---|---|---|
| 2010/0094381 A1 | 4/2010 | Kim et al. |
| 2010/0096934 A1 | 4/2010 | Joannopoulos et al. |
| 2010/0102639 A1 | 4/2010 | Joannopoulos et al. |
| 2010/0102640 A1 | 4/2010 | Joannopoulos et al. |
| 2010/0102641 A1 | 4/2010 | Joannopoulos et al. |
| 2010/0104031 A1 | 4/2010 | Lacour |
| 2010/0109443 A1 | 5/2010 | Cook et al. |
| 2010/0109445 A1 | 5/2010 | Kurs et al. |
| 2010/0109604 A1 | 5/2010 | Boys et al. |
| 2010/0115474 A1 | 5/2010 | Takada et al. |
| 2010/0117454 A1 | 5/2010 | Cook et al. |
| 2010/0117455 A1 | 5/2010 | Joannopoulos et al. |
| 2010/0117456 A1 | 5/2010 | Karalis et al. |
| 2010/0117596 A1 | 5/2010 | Cook et al. |
| 2010/0123353 A1 | 5/2010 | Joannopoulos et al. |
| 2010/0123354 A1 | 5/2010 | Joannopoulos et al. |
| 2010/0123355 A1 | 5/2010 | Joannopoulos et al. |
| 2010/0123452 A1 | 5/2010 | Amano et al. |
| 2010/0123530 A1 | 5/2010 | Park et al. |
| 2010/0127573 A1 | 5/2010 | Joannopoulos et al. |
| 2010/0127574 A1 | 5/2010 | Joannopoulos et al. |
| 2010/0127575 A1 | 5/2010 | Joannopoulos et al. |
| 2010/0127660 A1 | 5/2010 | Cook et al. |
| 2010/0133918 A1 | 6/2010 | Joannopoulos et al. |
| 2010/0133919 A1 | 6/2010 | Joannopoulos et al. |
| 2010/0133920 A1 | 6/2010 | Joannopoulos et al. |
| 2010/0141042 A1 | 6/2010 | Kesler et al. |
| 2010/0148589 A1 | 6/2010 | Hamam et al. |
| 2010/0148723 A1 | 6/2010 | Cook et al. |
| 2010/0151808 A1 | 6/2010 | Toncich et al. |
| 2010/0156346 A1 | 6/2010 | Takada et al. |
| 2010/0156355 A1 | 6/2010 | Bauerle et al. |
| 2010/0156570 A1 | 6/2010 | Hong et al. |
| 2010/0164295 A1 | 7/2010 | Ichikawa et al. |
| 2010/0164296 A1 | 7/2010 | Kurs |
| 2010/0164297 A1 | 7/2010 | Kurs et al. |
| 2010/0164298 A1 | 7/2010 | Karalis et al. |
| 2010/0171368 A1 | 7/2010 | Schatz et al. |
| 2010/0171370 A1 | 7/2010 | Karalis et al. |
| 2010/0179384 A1 | 7/2010 | Hoeg et al. |
| 2010/0181843 A1 | 7/2010 | Schatz et al. |
| 2010/0181844 A1 | 7/2010 | Karalis et al. |
| 2010/0181845 A1 | 7/2010 | Fiorello et al. |
| 2010/0181961 A1 | 7/2010 | Novak et al. |
| 2010/0181964 A1 | 7/2010 | Huggins et al. |
| 2010/0184371 A1 | 7/2010 | Cook et al. |
| 2010/0187911 A1 | 7/2010 | Joannopoulos et al. |
| 2010/0187913 A1 | 7/2010 | Sample |
| 2010/0188183 A1 | 7/2010 | Shpiro |
| 2010/0190435 A1 | 7/2010 | Cook et al. |
| 2010/0190436 A1 | 7/2010 | Cook et al. |
| 2010/0194206 A1 | 8/2010 | Burdo et al. |
| 2010/0194207 A1 | 8/2010 | Graham |
| 2010/0194334 A1 | 8/2010 | Kirby et al. |
| 2010/0194335 A1 | 8/2010 | Kirby et al. |
| 2010/0201189 A1 | 8/2010 | Kirby et al. |
| 2010/0201201 A1 | 8/2010 | Mobarhan et al. |
| 2010/0201202 A1 | 8/2010 | Kirby et al. |
| 2010/0201203 A1 | 8/2010 | Schatz et al. |
| 2010/0201204 A1 | 8/2010 | Sakoda et al. |
| 2010/0201205 A1 | 8/2010 | Karalis et al. |
| 2010/0201310 A1 | 8/2010 | Vorenkamp et al. |
| 2010/0201312 A1 | 8/2010 | Kirby et al. |
| 2010/0201313 A1 | 8/2010 | Vorenkamp et al. |
| 2010/0201316 A1 | 8/2010 | Takada et al. |
| 2010/0201513 A1 | 8/2010 | Vorenkamp et al. |
| 2010/0207458 A1 | 8/2010 | Joannopoulos et al. |
| 2010/0210233 A1 | 8/2010 | Cook et al. |
| 2010/0213770 A1 | 8/2010 | Kikuchi |
| 2010/0213895 A1 | 8/2010 | Keating et al. |
| 2010/0217553 A1 | 8/2010 | Von Novak et al. |
| 2010/0219694 A1 | 9/2010 | Kurs et al. |
| 2010/0219695 A1 | 9/2010 | Komiyama et al. |
| 2010/0219696 A1 | 9/2010 | Kojima |
| 2010/0222010 A1 | 9/2010 | Ozaki et al. |
| 2010/0225175 A1 | 9/2010 | Karalis et al. |
| 2010/0225270 A1 | 9/2010 | Jacobs et al. |
| 2010/0225271 A1 | 9/2010 | Oyobe et al. |
| 2010/0225272 A1 | 9/2010 | Kirby et al. |
| 2010/0231053 A1 | 9/2010 | Karalis et al. |
| 2010/0231163 A1 | 9/2010 | Mashinsky |
| 2010/0231340 A1 | 9/2010 | Fiorello et al. |
| 2010/0234922 A1 | 9/2010 | Forsell |
| 2010/0235006 A1 | 9/2010 | Brown |
| 2010/0237706 A1 | 9/2010 | Karalis et al. |
| 2010/0237707 A1 | 9/2010 | Karalis et al. |
| 2010/0237708 A1 | 9/2010 | Karalis et al. |
| 2010/0237709 A1 | 9/2010 | Hall et al. |
| 2010/0244576 A1 | 9/2010 | Hillan et al. |
| 2010/0244577 A1 | 9/2010 | Shimokawa |
| 2010/0244578 A1 | 9/2010 | Yoshikawa |
| 2010/0244579 A1 | 9/2010 | Sogabe et al. |
| 2010/0244580 A1 | 9/2010 | Uchida et al. |
| 2010/0244581 A1 | 9/2010 | Uchida |
| 2010/0244582 A1 | 9/2010 | Yoshikawa |
| 2010/0244583 A1 | 9/2010 | Shimokawa |
| 2010/0244767 A1 | 9/2010 | Turner et al. |
| 2010/0244839 A1 | 9/2010 | Yoshikawa |
| 2010/0248622 A1 | 9/2010 | Lyell Kirby et al. |
| 2010/0253152 A1 | 10/2010 | Karalis et al. |
| 2010/0253281 A1 | 10/2010 | Li |
| 2010/0256481 A1 | 10/2010 | Mareci et al. |
| 2010/0256831 A1 | 10/2010 | Abramo et al. |
| 2010/0259108 A1 | 10/2010 | Giler et al. |
| 2010/0259109 A1 | 10/2010 | Sato |
| 2010/0259110 A1 | 10/2010 | Kurs et al. |
| 2010/0264745 A1 | 10/2010 | Karalis et al. |
| 2010/0264746 A1 | 10/2010 | Kazama et al. |
| 2010/0264747 A1 | 10/2010 | Hall et al. |
| 2010/0276995 A1 | 11/2010 | Marzetta et al. |
| 2010/0277003 A1 | 11/2010 | Von Novak et al. |
| 2010/0277004 A1 | 11/2010 | Suzuki et al. |
| 2010/0277005 A1 | 11/2010 | Karalis et al. |
| 2010/0277120 A1 | 11/2010 | Cook et al. |
| 2010/0277121 A1 | 11/2010 | Hall et al. |
| 2010/0289341 A1 | 11/2010 | Ozaki et al. |
| 2010/0289449 A1 | 11/2010 | Elo |
| 2010/0295505 A1 | 11/2010 | Jung et al. |
| 2010/0295506 A1 | 11/2010 | Ichikawa |
| 2010/0308939 A1 | 12/2010 | Kurs |
| 2010/0314946 A1 | 12/2010 | Budde et al. |
| 2010/0327660 A1 | 12/2010 | Karalis et al. |
| 2010/0327661 A1 | 12/2010 | Karalis et al. |
| 2010/0328044 A1 | 12/2010 | Waffenschmidt et al. |
| 2011/0004269 A1 | 1/2011 | Strother et al. |
| 2011/0012431 A1 | 1/2011 | Karalis et al. |
| 2011/0018361 A1 | 1/2011 | Karalis et al. |
| 2011/0025131 A1 | 2/2011 | Karalis et al. |
| 2011/0031928 A1 | 2/2011 | Soar |
| 2011/0043046 A1 | 2/2011 | Joannopoulos et al. |
| 2011/0043047 A1 | 2/2011 | Karalis et al. |
| 2011/0043048 A1 | 2/2011 | Karalis et al. |
| 2011/0043049 A1 | 2/2011 | Karalis et al. |
| 2011/0049995 A1 | 3/2011 | Hashiguchi |
| 2011/0049996 A1 | 3/2011 | Karalis et al. |
| 2011/0049998 A1 | 3/2011 | Karalis et al. |
| 2011/0074218 A1 | 3/2011 | Karalis et al. |
| 2011/0074346 A1 | 3/2011 | Hall et al. |
| 2011/0074347 A1 | 3/2011 | Karalis et al. |
| 2011/0089895 A1 | 4/2011 | Karalis et al. |
| 2011/0095618 A1 | 4/2011 | Schatz et al. |
| 2011/0115303 A1 | 5/2011 | Baarman et al. |
| 2011/0115431 A1 | 5/2011 | Dunworth et al. |
| 2011/0121920 A1 | 5/2011 | Kurs et al. |
| 2011/0128015 A1 | 6/2011 | Dorairaj et al. |
| 2011/0140544 A1 | 6/2011 | Karalis et al. |
| 2011/0148219 A1 | 6/2011 | Karalis et al. |
| 2011/0162895 A1 | 7/2011 | Karalis et al. |
| 2011/0169339 A1 | 7/2011 | Karalis et al. |
| 2011/0181122 A1 | 7/2011 | Karalis et al. |
| 2011/0193416 A1 | 8/2011 | Campanella et al. |
| 2011/0193419 A1 | 8/2011 | Karalis et al. |
| 2011/0198939 A1 | 8/2011 | Karalis et al. |
| 2011/0215086 A1 | 9/2011 | Yeh |

(56) References Cited

U.S. PATENT DOCUMENTS

| | | |
|---|---|---|
| 2011/0221278 A1 | 9/2011 | Karalis et al. |
| 2011/0227528 A1 | 9/2011 | Karalis et al. |
| 2011/0227530 A1 | 9/2011 | Karalis et al. |
| 2011/0241618 A1 | 10/2011 | Karalis et al. |
| 2011/0248573 A1 | 10/2011 | Kanno et al. |
| 2011/0254377 A1 | 10/2011 | Wildmer et al. |
| 2011/0254503 A1 | 10/2011 | Widmer et al. |
| 2011/0266878 A9 | 11/2011 | Cook et al. |
| 2011/0278943 A1 | 11/2011 | Eckhoff et al. |
| 2012/0001492 A9 | 1/2012 | Cook et al. |
| 2012/0001593 A1 | 1/2012 | DiGuardo |
| 2012/0007435 A1 | 1/2012 | Sada et al. |
| 2012/0007441 A1 | 1/2012 | John et al. |
| 2012/0025602 A1 | 2/2012 | Boys et al. |
| 2012/0032522 A1 | 2/2012 | Schatz et al. |
| 2012/0038525 A1 | 2/2012 | Monsalve Carcelen et al. |
| 2012/0062345 A1 | 3/2012 | Kurs et al. |
| 2012/0068549 A1 | 3/2012 | Karalis et al. |
| 2012/0086284 A1 | 4/2012 | Campanella et al. |
| 2012/0086867 A1 | 4/2012 | Kesler et al. |
| 2012/0091794 A1 | 4/2012 | Campanella et al. |
| 2012/0091795 A1 | 4/2012 | Fiorello et al. |
| 2012/0091796 A1 | 4/2012 | Kesler et al. |
| 2012/0091797 A1 | 4/2012 | Kesler et al. |
| 2012/0091819 A1 | 4/2012 | Kulikowski et al. |
| 2012/0091820 A1 | 4/2012 | Campanella et al. |
| 2012/0091949 A1 | 4/2012 | Campanella et al. |
| 2012/0091950 A1 | 4/2012 | Campanella et al. |
| 2012/0098350 A1 | 4/2012 | Campanella et al. |
| 2012/0112531 A1 | 5/2012 | Kesler et al. |
| 2012/0112532 A1 | 5/2012 | Kesler et al. |
| 2012/0112534 A1 | 5/2012 | Kesler et al. |
| 2012/0112535 A1 | 5/2012 | Karalis et al. |
| 2012/0112536 A1 | 5/2012 | Karalis et al. |
| 2012/0112538 A1 | 5/2012 | Kesler et al. |
| 2012/0112691 A1 | 5/2012 | Kurs et al. |
| 2012/0119569 A1 | 5/2012 | Karalis et al. |
| 2012/0119575 A1 | 5/2012 | Kurs et al. |
| 2012/0119576 A1 | 5/2012 | Kesler et al. |
| 2012/0119698 A1 | 5/2012 | Karalis et al. |
| 2012/0139355 A1 | 6/2012 | Ganem et al. |
| 2012/0146575 A1 | 6/2012 | Armstrong et al. |
| 2012/0153732 A1 | 6/2012 | Kurs et al. |
| 2012/0153733 A1 | 6/2012 | Schatz et al. |
| 2012/0153734 A1 | 6/2012 | Kurs et al. |
| 2012/0153735 A1 | 6/2012 | Karalis et al. |
| 2012/0153736 A1 | 6/2012 | Karalis et al. |
| 2012/0153737 A1 | 6/2012 | Karalis et al. |
| 2012/0153738 A1 | 6/2012 | Karalis et al. |
| 2012/0153893 A1 | 6/2012 | Schatz et al. |
| 2012/0184338 A1 | 7/2012 | Kesler et al. |
| 2012/0206096 A1 | 8/2012 | John |
| 2012/0223573 A1 | 9/2012 | Schatz et al. |
| 2012/0228952 A1 | 9/2012 | Hall et al. |
| 2012/0228953 A1 | 9/2012 | Kesler et al. |
| 2012/0228954 A1 | 9/2012 | Kesler et al. |
| 2012/0235500 A1 | 9/2012 | Ganem et al. |
| 2012/0235501 A1 | 9/2012 | Kesler et al. |
| 2012/0235502 A1 | 9/2012 | Kesler et al. |
| 2012/0235503 A1 | 9/2012 | Kesler et al. |
| 2012/0235504 A1 | 9/2012 | Kesler et al. |
| 2012/0235505 A1 | 9/2012 | Schatz et al. |
| 2012/0235566 A1 | 9/2012 | Karalis et al. |
| 2012/0235567 A1 | 9/2012 | Karalis et al. |
| 2012/0235633 A1 | 9/2012 | Kesler et al. |
| 2012/0235634 A1 | 9/2012 | Hall et al. |
| 2012/0239117 A1 | 9/2012 | Kesler et al. |
| 2012/0242159 A1 | 9/2012 | Lou et al. |
| 2012/0242225 A1 | 9/2012 | Karalis et al. |
| 2012/0248884 A1 | 10/2012 | Karalis et al. |
| 2012/0248886 A1 | 10/2012 | Kesler et al. |
| 2012/0248887 A1 | 10/2012 | Kesler et al. |
| 2012/0248888 A1 | 10/2012 | Kesler et al. |
| 2012/0248981 A1 | 10/2012 | Karalis et al. |
| 2012/0256494 A1 | 10/2012 | Kesler et al. |
| 2012/0267960 A1 | 10/2012 | Low et al. |
| 2012/0280765 A1 | 11/2012 | Kurs et al. |
| 2012/0313449 A1 | 12/2012 | Kurs et al. |
| 2012/0313742 A1 | 12/2012 | Kurs et al. |
| 2013/0007949 A1 | 1/2013 | Kurs et al. |
| 2013/0020878 A1 | 1/2013 | Karalis et al. |
| 2013/0033118 A1 | 2/2013 | Karalis et al. |
| 2013/0038402 A1 | 2/2013 | Karalis et al. |
| 2013/0057364 A1 | 3/2013 | Kesler et al. |
| 2013/0062966 A1 | 3/2013 | Verghese et al. |
| 2013/0069441 A1 | 3/2013 | Verghese et al. |
| 2013/0069753 A1 | 3/2013 | Kurs et al. |
| 2013/0099587 A1 | 4/2013 | Lou et al. |
| 2013/0154383 A1 | 6/2013 | Kasturi et al. |
| 2013/0154389 A1 | 6/2013 | Kurs et al. |
| 2013/0159956 A1 | 6/2013 | Verghese et al. |
| 2013/0175874 A1 | 7/2013 | Lou et al. |
| 2013/0175875 A1 | 7/2013 | Kurs et al. |
| 2013/0200716 A1 | 8/2013 | Kesler et al. |
| 2013/0200721 A1 | 8/2013 | Kurs et al. |
| 2013/0221744 A1 | 8/2013 | Hall et al. |
| 2013/0278073 A1 | 10/2013 | Kurs et al. |
| 2013/0278074 A1 | 10/2013 | Kurs et al. |
| 2013/0278075 A1 | 10/2013 | Kurs et al. |
| 2013/0300353 A1 | 11/2013 | Kurs et al. |
| 2013/0307349 A1 | 11/2013 | Hall et al. |
| 2013/0320773 A1 | 12/2013 | Schatz et al. |
| 2013/0334892 A1 | 12/2013 | Hall et al. |
| 2014/0002012 A1 | 1/2014 | McCauley et al. |
| 2014/0063666 A1 | 3/2014 | Kallal et al. |
| 2014/0070764 A1 | 3/2014 | Keeling |
| 2014/0091634 A1 | 4/2014 | Mayo et al. |
| 2015/0084577 A1* | 3/2015 | Schuessler .............. H02J 5/005 320/101 |
| 2015/0274023 A1 | 10/2015 | Houivet et al. |
| 2015/0372493 A1 | 12/2015 | Sankar |
| 2016/0250932 A1* | 9/2016 | Keeling .................. H01F 38/14 320/108 |
| 2017/0217325 A1 | 8/2017 | DeBaun et al. |
| 2019/0255966 A1 | 8/2019 | Lee et al. |

FOREIGN PATENT DOCUMENTS

| | | | |
|---|---|---|---|
| CN | 102439669 | 5/2012 | |
| CN | 103329397 | 9/2013 | |
| DE | 38 24 972 | 1/1989 | |
| DE | 100 29147 | 12/2001 | |
| DE | 200 16 655 | 3/2002 | |
| DE | 102 21 484 | 11/2003 | |
| DE | 103 04 584 | 8/2004 | |
| DE | 10 2005 036290 | 2/2007 | |
| DE | 10 2006 044057 | 4/2008 | |
| EP | 1 335 477 | 8/2003 | |
| EP | 1 521 206 | 4/2005 | |
| EP | 1 524 010 | 4/2005 | |
| EP | 2 357 716 | 8/2011 | |
| GB | 2546787 | 8/2017 | ............... H02J 7/02 |
| JP | 02-097005 | 4/1990 | |
| JP | 4-265875 | 9/1992 | |
| JP | 6-341410 | 12/1994 | |
| JP | 9-182323 | 7/1997 | |
| JP | 9-298847 | 11/1997 | |
| JP | 10-164837 | 6/1998 | |
| JP | 11-75329 | 3/1999 | |
| JP | 11-188113 | 7/1999 | |
| JP | 2001-309580 | 11/2001 | |
| JP | 2002-010535 | 1/2002 | |
| JP | 2003-179526 | 6/2003 | |
| JP | 2004-166459 | 6/2004 | |
| JP | 2004-201458 | 7/2004 | |
| JP | 2004-229144 | 8/2004 | |
| JP | 2005-57444 | 3/2005 | |
| JP | 2005-149238 | 6/2005 | |
| JP | 2006-074848 | 3/2006 | |
| JP | 2007-505480 | 3/2007 | |
| JP | 2007-266892 | 10/2007 | |
| JP | 2007-537637 | 12/2007 | |
| JP | 2008-508842 | 3/2008 | |
| JP | 2008-206231 | 9/2008 | |

(56) References Cited

FOREIGN PATENT DOCUMENTS

| | | |
|---|---|---|
| JP | 2008-206327 | 9/2008 |
| JP | 2011-072074 | 4/2011 |
| JP | 2012-504387 | 2/2012 |
| JP | 2013-543718 | 12/2013 |
| KR | 10-2007-0017804 | 2/2007 |
| KR | 10-2008-0007635 | 1/2008 |
| KR | 10-2009-0122072 | 11/2009 |
| KR | 10-2011-0050920 | 5/2011 |
| SG | 112842 | 7/2005 |
| WO | WO 92/17929 | 10/1992 |
| WO | WO 93/23908 | 11/1993 |
| WO | WO 94/28560 | 12/1994 |
| WO | WO 95/11545 | 4/1995 |
| WO | WO 96/02970 | 2/1996 |
| WO | WO 98/50993 | 11/1998 |
| WO | WO 00/77910 | 12/2000 |
| WO | WO 03/092329 | 11/2003 |
| WO | WO 03/096361 | 11/2003 |
| WO | WO 03/096512 | 11/2003 |
| WO | WO 2004/015885 | 2/2004 |
| WO | WO 2004/038888 | 5/2004 |
| WO | WO 2004/055654 | 7/2004 |
| WO | WO 2004/073150 | 8/2004 |
| WO | WO 2004/073166 | 8/2004 |
| WO | WO 2004/073176 | 8/2004 |
| WO | WO 2004/073177 | 8/2004 |
| WO | WO 2004/112216 | 12/2004 |
| WO | WO 2005/024865 | 3/2005 |
| WO | WO 2005/060068 | 6/2005 |
| WO | WO 2005/109597 | 11/2005 |
| WO | WO 2005/109598 | 11/2005 |
| WO | WO 2006/011769 | 2/2006 |
| WO | WO 2007/008646 | 1/2007 |
| WO | WO 2007/020583 | 2/2007 |
| WO | WO 2007/042952 | 4/2007 |
| WO | WO 2007/084716 | 7/2007 |
| WO | WO 2007/084717 | 7/2007 |
| WO | WO 2008/109489 | 9/2008 |
| WO | WO 2008/118178 | 10/2008 |
| WO | WO 2009/009559 | 1/2009 |
| WO | WO 2009/018568 | 2/2009 |
| WO | WO 2009/023155 | 2/2009 |
| WO | WO 2009/023646 | 2/2009 |
| WO | WO 2009/033043 | 3/2009 |
| WO | WO 2009/062438 | 5/2009 |
| WO | WO 2009/070730 | 6/2009 |
| WO | WO 2009/126963 | 10/2009 |
| WO | WO 2009/140506 | 11/2009 |
| WO | WO 2009/149464 | 12/2009 |
| WO | WO 2009/155000 | 12/2009 |
| WO | WO 2010/030977 | 3/2010 |
| WO | WO 2010/036980 | 4/2010 |
| WO | WO 2010/039967 | 4/2010 |
| WO | WO 2010/090538 | 8/2010 |
| WO | WO 2010/090539 | 8/2010 |
| WO | WO 2010/093997 | 8/2010 |
| WO | WO 2010/104569 | 9/2010 |
| WO | WO 2011/061388 | 5/2011 |
| WO | WO 2011/061821 | 5/2011 |
| WO | WO 2011/062827 | 5/2011 |
| WO | WO 2011/112795 | 9/2011 |
| WO | WO 2012/037279 | 3/2012 |
| WO | WO 2012/170278 | 12/2012 |
| WO | WO 2013/013235 | 1/2013 |
| WO | WO 2013/020138 | 2/2013 |
| WO | WO 2013/036947 | 3/2013 |
| WO | WO 2013/059441 | 4/2013 |
| WO | WO 2013/067484 | 5/2013 |
| WO | WO 2013/113017 | 8/2013 |
| WO | WO 2013/142840 | 9/2013 |
| WO | WO 2014/004843 | 1/2014 |

OTHER PUBLICATIONS

International Preliminary Report on Patentability for International Application No. PCT/US2018/040411 dated Jan. 9, 2020.
"Intel CTO Says Gap between Humans, Machines Will Close by 2050", *Intel News Release*, (See intel.com/.../20080821comp.htm?iid=S...) (Printed Nov. 6, 2009).
"Physics Update, Unwired Energy", *Physics Today*, pp. 26, (Jan. 2007) (See http://arxiv.org/abs/physics/0611063.).
"In pictures: A year in technology", *BBC News*, (Dec. 28, 2007).
"Next Little Thing 2010 Electricity without wires", CNN Money (See money.cnn.com/galleries/2009/smallbusiness/0911/gallery.next_little_thing_2010.smb/) (dated Nov. 30, 2009).
Abe et al. "A Noncontact Charger Using a Resonant Converter with Parallel Capacitor of the Secondary Coil". IEEE, 36(2):444-451, Mar./Apr. 2000.
Ahmadian, M. et al., "Miniature Transmitter for Implantable Micro Systems", *Proceedings of the 25th Annual International Conference of the IEEE EMBS Cancun, Mexico*, pp. 3028-3031 (Sep. 17-21, 2003).
Aoki, T. et al., "Observation of strong coupling between one atom and a monolithic microresonator", Nature, vol. 443:671-674 (2006).
Apneseth et al. "Introducing wireless proximity switches" ABB Review Apr. 2002.
Aristeidis Karalis et al., "Efficient Wireless non-radiative mid-range energy transfer", *Annals of Physics*, vol. 323, pp. 34-48 (2008).
Baker et al., "Feedback Analysis and Design of RF Power Links for Low-Power Bionic Systems," *IEEE Transactions on Biomedical Circuits and Systems*, vol. 1(1):28-38 (Mar. 2007).
Balanis, C.A., "Antenna Theory: Analysis and Design," 3rd Edition, Sections 4.2, 4.3, 5.2, 5.3 (Wiley, New Jersey, 2005).
Berardelli, P., "Outlets Are Out", ScienceNOW Daily News, Science Now, http://sciencenow.sciencemag.org/ cgi/content/full/2006/1114/2, (Nov. 14, 2006) 2 pages.
Biever, C., "Evanescent coupling' could power gadgets wirelessly", NewScientistsTech.com, http://www. newscientisttech.com/article.ns?id=dn1 0575&print=true, (Nov. 15, 2006) 2 pages.
Borenstein, S., "Man tries wirelessly boosting batteries", (The Associated Press), USA Today, (Nov. 16, 2006) 1 page.
Borenstein, S., "Man tries wirelessly boosting batteries", AP Science Writer, Boston.com, (See http://www.boston.com/business/technology/articles/2006/11/15/man_tries_wirelessly_b...) (Nov. 15, 2006).
Boyle, A., "Electro-nirvana? Not so fast", MSNBC, http:/lcosmiclog.msnbc.msn.com/_news/2007/06/08/4350760- electro-nirvana-not-so-fast, (Jun. 8, 2007) 1 page.
Budhia, M. et al., "A New IPT Magnetic Coupler for Electric Vehicle Charging Systems", IECON 2010—36th Annual Conference on IEEE Industrial Electronics Society, Glendale, AZ, pp. 2487-2492 (Nov. 7-10, 2010).
Budhia, M. et al., "Development and evaluation of single sided flux couplers for contactless electric vehicle charging", 2011 IEEE Energy Conversion Congress and Exposition (ECCE), Phoenix, AZ, pp. 614-621 (Sep. 17-22, 2011).
Budhia, M. et al.,"Development of a Single-Sided Flux Magnetic Coupler for Electric Vehicle IPT", *IEEE Transactions on Industrial Electronics*, vol. 60:318-328 (Jan. 2013).
Bulkeley, W. M., "MIT Scientists Pave the Way for Wireless Battery Charging", The Wall Street Journal (See http://online.wsj.com/article/SB118123955549228045.html?mod=googlenews_wsj), (Jun. 8, 2007) 2 pages.
Burri et al., "Invention Description", (Feb. 5, 2008).
Cass, S., "Air Power—Wireless data connections are common—now scientists are working on wireless power", Sponsored by IEEE Spectrum, http://spectrum.ieee.org/computing/hardware/air-power, (Nov. 2006) 2 pages.
Castelvecchi, Davide, "The Power of Induction—Cutting the last cord could resonate with our increasingly gadget dependent lives", *Science News Online*, vol. 172, No. 3, Jul. 21, 2007, 6 pages.
Chang, A., "Recharging the Wireless Way—Even physicists forget to recharge their cell phones sometimes.", PC Magazine, ABC News Internet Ventures, (Dec. 12, 2006) 1 page.

(56) References Cited

OTHER PUBLICATIONS

Chinaview, ,"Scientists light bulb with 'wireless electricity'",www. Chinaview.cn, http://news.xinhuanet.com/english/2007-06/08/content_6215681.htm,Jun. 2007,1 page.
Cooks, G., "The vision of an MIT physicist: Getting rid of pesky rechargers", Boston.com, (Dec. 11, 2006) 1 page.
Derbyshire, D., "The end of the plug? Scientists invent wireless device that beams electricity through your home", Daily Mail, http://www.dailymail.co.uk/pages/live/articles/technology/technology.html?in_article_id=4...), (Jun. 7, 2007) 3 pages.
Eisenberg, Anne, "Automatic Recharging, From a Distance", The New York Times, (see www.nytimes.com/2012/03/11/business/built-in-wireless-chargeing-for-electronic-devices.html?_r=0) (published on Mar. 10, 2012).
Esser et al., "A New Approach to Power Supplies for Robots", IEEE, vol. 27(5):872-875, (Sep./Oct. 1991).
Fan, Shanhui et al., "Rate-Equation Analysis of Output Efficiency and Modulation Rate of Photomic-Crystal Light-Emitting Diodes", IEEE Journal of Quantum Electronics, vol. 36(10):1123-1130 (Oct. 2000).
Fenske et al., "Dielectric Materials at Microwave Frequencies", Applied Microwave & Wireless, pp. 92-100 (2000).
Fernandez, C. et al., "A simple dc-dc converter for the power supply of a cochlear implant", *IEEE*, pp. 1965-1970 (2003).
Ferris, David, "How Wireless Charging Will Make Life Simpler (and Greener)", Forbes (See forbes.com/sites/davidferris/2012/07/24/how-wireless-charging-will-make-life-simpler-and-greener/print/) (dated Jul. 24, 2012).
Fildes, J., "Physics Promises Wireless Power", (Science and Technology Reporter), BBC News, (Nov. 15, 2006) 3 pages.
Fildes, J., "The technology with impact 2007", BBC News, (Dec. 27, 2007) 3 pages.
Fildes, J., "Wireless energy promise powers up", BBC News, http://news.bbc.co.uk/2/hi/technology/6725955.stm, (Jun. 7, 2007) 3 pages.
Finkenzeller, Klaus, "RFID Handbook—Fundamentals and Applications in Contactless Smart Cards", Nikkan Kohgyo-sya, Kanno Taihei, first version, pp. 32-37, 253 (Aug. 21, 2001).
Finkenzeller, Klaus, "RFID Handbook (2nd Edition)", The Nikkan Kogyo Shimbun, Ltd., pp. 19, 20, 38, 39, 43, 44, 62, 63, 67, 68, 87, 88, 291, 292 (Published on May 31, 2004).
Freedman, D.H., "Power on a Chip", MIT Technology Review, (Nov. 2004).
Gary Peterson, "MIT WiTricity Not So Original After All", *Feed Line No. 9*, (See http://www.tfcbooks.com/articles/witricity.htm) printed Nov. 12, 2009.
Geyi, Wen, "A Method for the Evaluation of Small Antenna Q", IEEE Transactions on Antennas and Propagation, vol. 51(8):2124-2129 (Aug. 2003).
Hadley, F., "Goodbye Wires—MIT Team Experimentally Demonstrates Wireless Power Transfer, Potentially Useful for Power Laptops, Cell-Phones Without Cords", Massachusetts Institute of Technology, Institute for Soldier D Nanotechnologies, http://web.mit.edu/newsoffice/2007/wireless-0607.html, (Jun. 7, 2007) 3 pages.
Haus, H.A., "Waves and Fields in Optoelectronics," Chapter 7 "Coupling of Modes—Reasonators and Couplers" (Prentice-Hall, New Jersey, 1984).
Heikkinen et al., "Performance and Efficiency of Planar Rectennas for Short-Range Wireless Power Transfer at 2.45 GHz", Microwave and Optical Technology Letters, vol. 31(2):86-91, (Oct. 20, 2001).
Highfield, R., "Wireless revolution could spell end of plugs",(Science Editor), Telegraph.co.uk, http://www.telegraph.co.uk/news/main.jhtml?xml=/news/2007/06/07/nwireless1 07.xml, (Jun. 7, 2007) 3 pages.
Hirai et al., "Integral Motor with Driver and Wireless Transmission of Power and Information for Autonomous Subspindle Drive", IEEE, vol. 15(1):13-20, (Jan. 2000).
Hirai et al., "Practical Study on Wireless Transmission of Power and Information for Autonomous Decentralized Manufacturing System", IEEE, vol. 46(2):349-359, Apr. 1999.
Hirai et al., "Study on Intelligent Battery Charging Using Inductive Transmission of Power and Information", IEEE, vol. 15(2):335-345, (Mar. 2000).
Hirai et al., "Wireless Transmission of Power and Information and Information for Cableless Linear Motor Drive", IEEE, vol. 15(1):21-27, (Jan. 2000).
Hirayama, M., "Splashpower—World Leaders in Wireless Power", PowerPoint presentation, Splashpower Japan, (Sep. 3, 2007) 30 pages.
Ho, S. L. et al., "A Comparative Study Between Novel Witricity and Traditional Inductive Magnetic Coupling in Wireless Charging", IEEE Transactions on Magnetics, vol. 47(5):1522-1525 (May 2011).
Infotech Online, "Recharging gadgets without cables", infotech.indiatimes.com, (Nov. 17, 2006) 1 page.
Jackson, J. D., "Classical Electrodynamics", 3rd Edition, Wiley, New York, 1999, pp. 201-203.
Jackson, J.D., "Classical Electrodynamics," 3rd Edition, Sections 1.11, 5.5, 5.17, 6.9, 8.1, 8.8, 9.2, 9.3 (Wiley, New York, 1999).
Jacob, M. V. et al., "Lithium Tantalate—A High Permittivity Dielectric Material for Microwave Communication Systems", *Proceedings of IEEE TENCON—Poster Papers*, pp. 1362-1366, 2003.
Karalis, Aristeidis, "Electricity Unplugged", Feature: Wireless Energy Physics World, physicsworld.com, pp. 23-25 (Feb. 2009).
Kawamura et al., "Wireless Transmission of Power and Information Through One High-Frequency Resonant AC Link Inverter for Robot Manipulator Applications", IEEE, vol. 32(3):503-508, (May/Jun. 1996).
Kurs, A. et al., "Wireless Power Transfer via Strongly Coupled Magnetic Resonances", *Science* vol. 317, pp. 83-86 (Jul. 6, 2007).
Kurs, A. et al., "Simultaneous mid-range power transfer to multiple devices", *Applied Physics Letters*, vol. 96, No. 044102 (2010).
Kurs, A. et al.,"Optimized design of a low-resistance electrical conductor for the multimegahertz range", *Applied Physics Letters*, vol. 98:172504-172504-3 (Apr. 2011).
Lamb, Gregory M. ,"Look Ma—no wires!—Electricity broadcast through the air may someday run your home",The Christian Science Monitor,http://www.csmonitor.com/2006/1116/p14s01-stct.html,Nov. 15, 2006,2 pages.
Lee, "Antenna Circuit Design for RFID Applications," Microchip Technology Inc., AN710, 50 pages (2003).
Lee, "RFID Coil Design," Microchip Technology Inc., AN678, 21 pages (1998).
Liang et al., "Silicon waveguide two-photon absorption detector at 1.5 µm wavelength for autocorrelation measurements," Applied Physics Letters, 81(7):1323-1325 (Aug. 12, 2002).
Markoff, J. ,"Intel Moves to Free Gadgets of Their Recharging Cords", The New York Times—nytimes.com, Aug. 21, 2008, 2 pages.
Mediano, A. et al. "Design of class E amplifier with nonlinear and linear shunt capacitances for any duty cycle", IEEE Trans. Microwave Theor. Tech., vol. 55, No. 3, pp. 484-492, (2007).
Microchip Technology Inc., "microID 13.56 MHz Design Guide—MCRF355/360 Reader Reference Design," 24 pages (2001).
Minkel, J R. ,"Wireless Energy Lights Bulb from Seven Feet Away—Physicists vow to cut the cord between your laptop battery and the wall socket—with just a simple loop of wire",Scientific American,http://www.scientificamerican.com/article.cfm?id=wireless-energy-lights-bulb-from-seven-feet-away,Jun. 7, 2007,1 page.
Minkel, J R. ,"Wireless Energy Transfer May Power Devices at a Distance",Scientific American,Nov. 14, 2006,1 page.
Morgan, J., "Lab report: Pull the plug for a positive charge", The Herald, Web Issue 2680, (Nov. 16, 2006) 3 pages.
Moskvitch, Katia, "Wireless charging—the future for electric cars?", BBC News Technology (See www.bbc.co.uk/news/technology-14183409) (dated Jul. 21, 2011).
O'Brien et al., "Analysis of Wireless Power Supplies for Industrial Automation Systems", IEEE, pp. 367-372 (Nov. 2-6, 2003).
O'Brien et al., "Design of Large Air-Gap Transformers for Wireless Power Supplies", IEEE, pp. 1557-1562 (Jun. 15-19, 2003).
Pendry, J. B., "A Chiral Route to Negative Refraction", Science, vol. 306:1353-1355 (2004).
Physics Today, "Unwired energy questions asked answered", Sep. 2007, pp. 16-17.

(56) References Cited

OTHER PUBLICATIONS

Powercast LLC. "White Paper" Powercast simply wire free, 2003.
PR News Wire, "The Big Story for CES 2007: The public debut of eCoupled Intelligent Wireless Power", Press Release, Fulton Innovation LLC, Las Vegas, NV, (Dec. 27, 2006) 3 pages.
Press Release, ,"The world's first sheet-type wireless power transmission system: Will a socket be replaced by e-wall?",Public Relations Office, School of Engineering, University of Tokyo, Japan,Dec. 12, 2006,4 pages.
PRESSTV, "Wireless power transfer possible", http://edition.presstv.ir/detail/12754.html, Jun. 11, 2007, 1 page.
Reidy, C. (Globe Staff), "MIT discovery could unplug your iPod forever", Boston.com, http://www.boston.com/ business/ticker/2007/06/mit_discovery_c.html, (Jun. 7, 2007) 3 pages.
Risen, C., "Wireless Energy", The New York Times, (Dec. 9, 2007) 1 page.
Sakamoto et al., "A Novel Circuit for Non-Contact Charging Through Electro-Magnetic Coupling", IEEE, pp. 168-174 (1992).
Scheible, G. et al., "Novel Wireless Power Supply System for Wireless Communication Devices in Industrial Automation Systems", IEEE, pp. 1358-1363, (Nov. 5-8, 2002).
Schneider, D. "A Critical Look at Wireless Power", *IEEE Spectrum*, pp. 35-39 (May 2010).
Schneider, David, "Electrons Unplugged. Wireless power at a distance is still far away", *IEEE Spectrum*, pp. 35-39 (May 2010).
Schuder, J. C. et al., "An Inductively Coupled RF System for the Transmission of 1 kW of Power Through the Skin", *IEEE Transactions on Bio-Medical Engineering*, vol. BME-18, No. 4, pp. 265-273 (Jul. 1971).
Schuder, J. C., "Powering an Artificial Heart: Birth of the Inductively Coupled-Radio Frequency System in 1960", *Artificial Organs*, vol. 26:909-915 (2002).
Schuder, J.C. et al., "Energy Transport Into the Closed Chest From a Set of Very-Large Mutually Orthogonal Coils", Communication Electronics, vol. 64:527-534 (Jan. 1963).
Schutz, J. et al., "Load Adaptive Medium Frequency Resonant Power Supply", IEEE, pp. 282-287 (Nov. 2002).
Sekitani et al. "A large-area wireless power-transmission sheet using printed organic transistors and plastic MEMS switches" www.nature.com/naturematerials. Published online Apr. 29, 2007.
Sekitani et al., "A large-area flexible wireless power transmission sheet using printed plastic MEMS switches and organic field-effect transistors", IEDM '06, International Electron Devices Meeting, (Dec. 11-13, 2006) 4 pages.
Sekiya, H. et al., "FM/PWM control scheme in class DE inverter", IEEE Trans. Circuits Syst. I, vol. 51(7) (Jul. 2004).
Senge, M., "MIT's wireless electricity for mobile phones", Vanguard, http://www.vanguardngr.com/articles/2002/features/gsm/gsm211062007.htm, (Jun. 11, 2007) 1 page.
Sensiper, S., "Electromagnetic wave propogation on helical conductors", Technical Report No. 194 (based on PhD Thesis), Massachusetts Institute of Technology, (May 16, 1951) 126 pages.
Soljacic, M. , "Wireless Non-Radiative Energy Transfer—PowerPoint presentation". Massachusetts Institute of Technology, (Oct. 6, 2005).
Soljacic, M. et al., "Wireless Energy Transfer Can Potentially Recharge Laptops Cell Phones Without Cords", (Nov. 14, 2006) 3 pages.
Soljacic, M. et al., "Photonic-crystal slow-light enhancement of nonlinear phase sensitivity", *J. Opt. Soc. Am B*, vol. 19, No. 9, pp. 2052-2059 (Sep. 2002).
Soljacic, M., "Wireless nonradiative energy transfer", *Visions of Discovery New Light on Physics, Cosmology, and Consciousness*, Cambridge University Press, New York, NY pp. 530-542 (2011).
Someya, Takao. "The world's first sheet-type wireless power transmission system". University of Tokyo, (Dec. 12, 2006).
Staelin, David H. et al., Electromagnetic Waves, Chapters 2, 3, 4, and 8, pp. 46-176 and 336-405 (Prentice Hall Upper Saddle River, New Jersey 1998).
Stark III, Joseph C., "Wireless Power Transmission Utilizing a Phased Array of Tesla Coils", Master Thesis, Massachusetts Institute of Technology (2004).
Stewart, W., "The Power to Set you Free", Science, vol. 317:55-56 (Jul. 6, 2007).
Tang, S.C. et al., "Evaluation of the Shielding Effects on Printed-Circuit-Board Transformers Using Ferrite Plates and Copper Sheets", *IEEE Transactions on Power Electronics*, vol. 17:1080-1088 (Nov. 2002).
Tesla, Nikola, "High Frequency Oscillators for Electro-Therapeutic and Other Purposes", *Proceedings of the IEEE*, vol. 87:1282-1292 (Jul. 1999).
Tesla, Nikola, "High Frequency Oscillators for Electro-Therapeutic and Other Purposes", *The Electrical Engineer*, vol. XXVI, No. 50 (Nov. 17, 1898).
Texas Instruments, "HF Antenna Design Notes—Technical Application Report," Literature No. 11-08-26-003, 47 pages (Sep. 2003).
Thomsen et al., "Ultrahigh speed all-optical demultiplexing based on two-photon absorption in a laser diode," Electronics Letters, 34(19):1871-1872 (Sep. 17, 1998).
UPM Rafsec, "Tutorial overview of inductively coupled RFID Systems," 7 pages (May 2003).
Valtchev et al. "Efficient Resonant Inductive Coupling Energy Transfer Using New Magnetic and Design Criteria". IEEE, pp. 1293-1298, 2005.
Vandevoorde et al., "Wireless energy transfer for stand-alone systems: a comparison between low and high power applicability", Sensors and Actuators, vol. 92:305-311 (2001).
Vilkomerson, David et al., "Implantable Doppler System for Self-Monitoring Vascular Grafts", *IEEE Ultrasonics Symposium*, pp. 461-465 (2004).
Villeneuve, Pierre R. et al., "Microcavities in photonic crystals: Mode symmetry, tunability, and coupling efficiency", *Physical Review B*, vol. 54:7837-7842 (Sep. 15, 1996).
Yariv, Amnon et al., "Coupled-resonator optical waveguide: a proposal and analysis", *Optics Letters*, vol. 24(11):711-713 (Jun. 1, 1999).
Yates, David C. et al., "Optimal Transmission Frequency for Ultralow-Power Short-Range Radio Links", IEEE Transactions on Circuits and Systems—1, Regular Papers, vol. 51:1405-1413 (Jul. 2004).
Yoshihiro Konishi, *Microwave Electronic Circuit Technology*, Chapter 4, pp. 145-197 (Marcel Dekker, Inc., New York, NY 1998).
Ziaie, Babak et al., "A Low-Power Miniature Transmitter Using a Low-Loss Silicon Platform for Biotelemetry", *Proceedings—19th International Conference IEEE/EMBS*, pp. 2221-2224, (Oct. 30-Nov. 2, 1997) 4 pages.
Zierhofer, Clemens M. et al., "High-Efficiency Coupling-Insensitive Transcutaneous Power and Data Transmission via an Inductive Link", *IEEE Transactions on Biomedical Engineering*, vol. 37, No. 7, pp. 716-722 (Jul. 1990).

\* cited by examiner

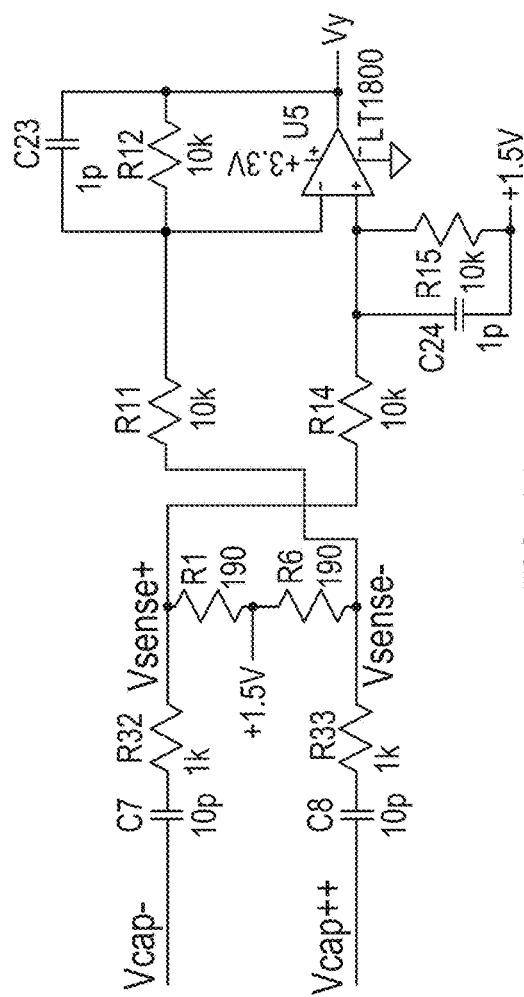
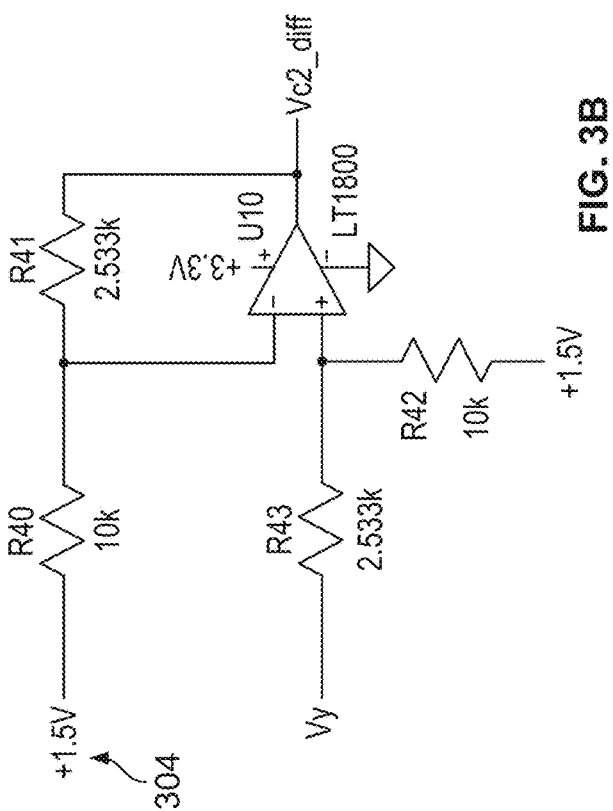
FIG. 3A
FIG. 3B
FIG. 3C

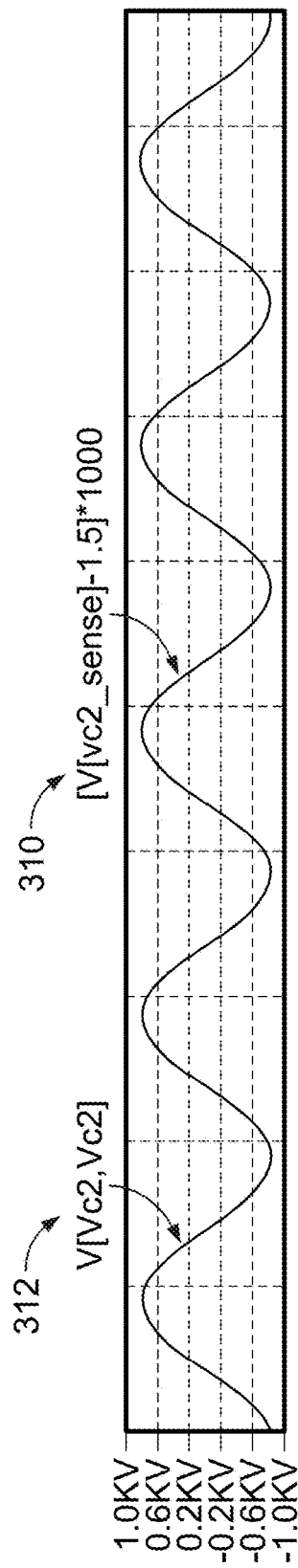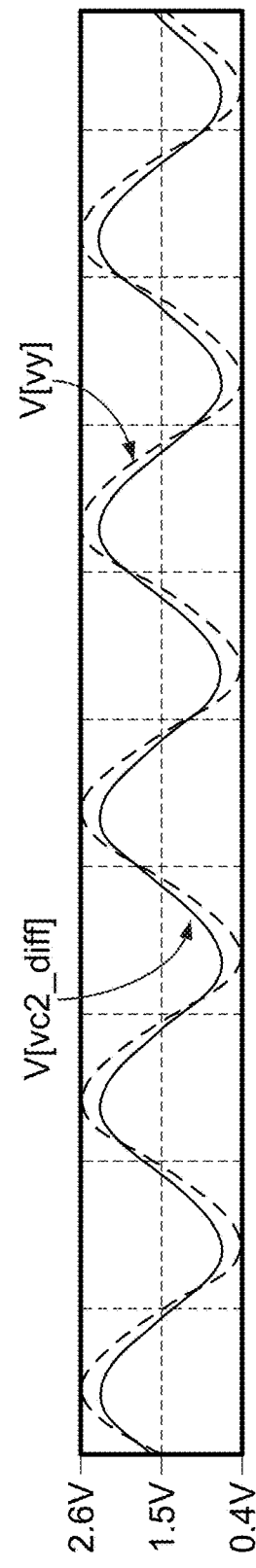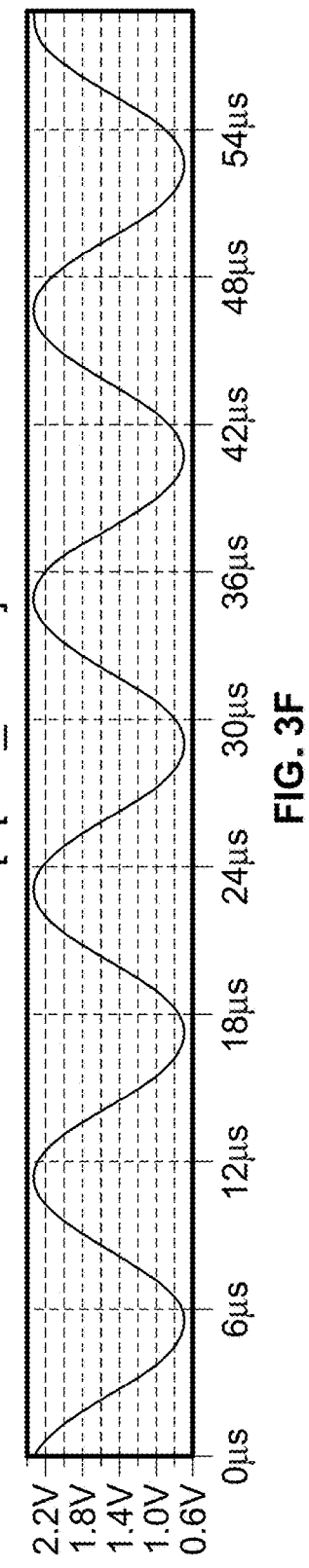
FIG. 3D
FIG. 3E
FIG. 3F

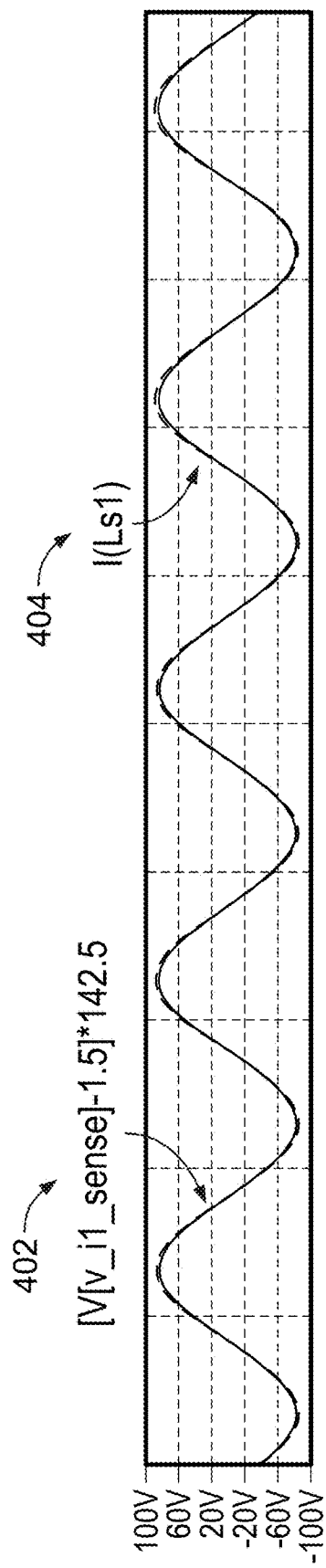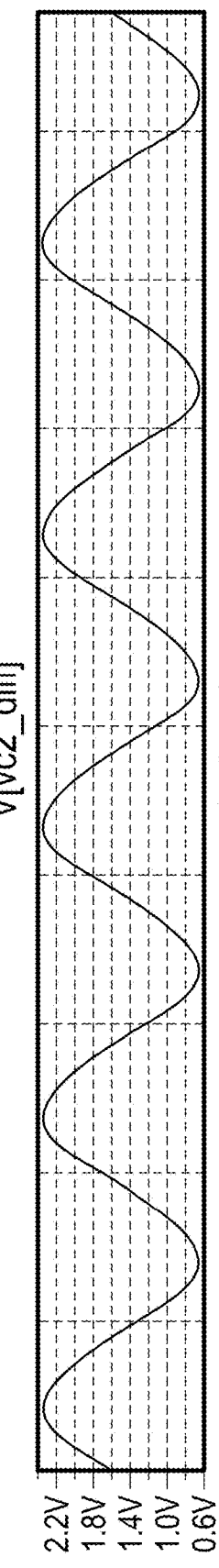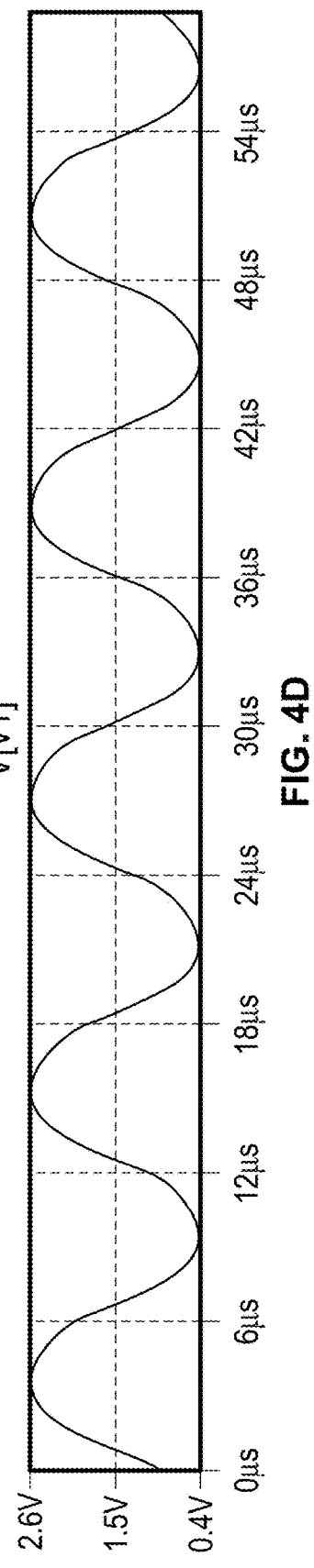
FIG. 4B
FIG. 4C
FIG. 4D

FIG. 22B

TRUTH TABLE 1

| # | INVREC_SIDE | TMN_SIDE | REC_FLTS | INV_ENBL | SIDE | MODE | PERSONALITY | G1, G2 (HS) | G4, G3 (LS) |
|---|---|---|---|---|---|---|---|---|---|
| 1 | 0 | 0 | 0 | 0 | GA | G2V | INV | 0 | 0 |
| 2 | 0 | 0 | 0 | 1 | GA | G2V | INV | PWM | PWM |
| 3 | 0 | 0 | 1 | 0 | GA | G2V | INV | 0 | 0 |
| 4 | 0 | 0 | 1 | 1 | GA | G2V | INV | PWM | PWM |
| 5 | 0 | 1 | 0 | 0 | GA | V2G | REC | 0 | 0 |
| 6 | 0 | 1 | 0 | 1 | GA | V2G | REC | PWM | PWM |
| 7 | 0 | 1 | 1 | 0 | GA | V2G | REC | 0 | 0 |
| 8 | 0 | 1 | 1 | 1 | GA | V2G | REC | PWM | PWM |
| 9 | 1 | 0 | 0 | 0 | VA | V2G | INV | 0 | 0 |
| 10 | 1 | 0 | 0 | 1 | VA | V2G | INV | PWM | PWM |
| 11 | 1 | 0 | 1 | 0 | VA | V2G | INV | 0 | 0 |
| 12 | 1 | 0 | 1 | 1 | VA | V2G | INV | PWM | PWM |
| 13 | 1 | 1 | 0 | 0 | VA | G2V | REC | 0 | 0 |
| 14 | 1 | 1 | 0 | 1 | VA | G2V | REC | PWM | PWM |
| 15 | 1 | 1 | 1 | 0 | VA | G2V | REC | 0 | 0 |
| 16 | 1 | 1 | 1 | 1 | VA | G2V | REC | 0 | 1 |

TRUTH TABLE 2

| # | DESAT_sg | UVLO_sg | WIFI_FLT | TMN_FLT | OC_FLT | uC_EN | INV_ENBL |
|---|---|---|---|---|---|---|---|
| 1 | 0 | 0 | 0 | 0 | 0 | 0 | 0 |
| 2 | 0 | 0 | 0 | 0 | 0 | 1 | 0 |
| ... | . | . | . | . | . | . | . |
| 64 | 1 | 1 | 1 | 1 | 1 | 1 | 1 |

TRUTH TABLE 3

| # | DESAT_sg | UVLO_sg | WIFI_FLT | TMN_FLT | OC_FLT | OV_FLT | REC_FLTS |
|---|---|---|---|---|---|---|---|
| 1 | 0 | 0 | 0 | 0 | 0 | 0 | 1 |
| 2 | 0 | 0 | 0 | 0 | 0 | 1 | 1 |
| ... | . | . | . | . | . | . | . |
| 64 | 1 | 1 | 1 | 1 | 1 | 1 | 0 |

TRUTH TABLE 4

| # | INVREC_SIDE | TMN_SIDE | REC_FLTS | SIDE | MODE | PERSONALITY | OV_CMD |
|---|---|---|---|---|---|---|---|
| 1 | 0 | 0 | 0 | GA | G2V | INV | 0 |
| 2 | 0 | 0 | 1 | GA | G2V | INV | 0 |
| 3 | 0 | 1 | 0 | GA | V2G | REC | 0 |
| 4 | 0 | 1 | 1 | GA | V2G | REC | 0 |
| 5 | 1 | 0 | 0 | VA | V2G | INV | 0 |
| 6 | 1 | 0 | 1 | VA | V2G | INV | 0 |
| 7 | 1 | 1 | 0 | VA | G2V | REC | 0 |
| 8 | 1 | 1 | 1 | VA | G2V | REC | 1 |

PROTECTION AND CONTROL OF WIRELESS POWER SYSTEMS

CROSS-REFERENCE TO RELATED APPLICATION

This application claims the benefit of U.S. Provisional Patent Application No. 62/526,842, filed on Jun. 29, 2017; 62/608,052, filed on Dec. 20, 2017; 62/662,148, filed on Apr. 24, 2018; 62/662,462, filed on Apr. 25, 2018; and 62/662,486 filed on Apr. 25, 2018, the entire contents of which are incorporated herein by reference.

TECHNICAL FIELD

The disclosure generally relates to wireless power systems and, more particularly, the disclosure relates to protection and sensors for wireless power systems.

BACKGROUND

Wireless power systems employ tunable impedance matching circuits to efficiently transmit power to a coupled load. The behavior of the load may be outside the control of the wireless power system and may thus cause undesirable conditions in the components of the wireless power system, leading to dangerous operation and possible damage.

SUMMARY

In general, the disclosure features control and protection systems for uni-directional and bidirectional wireless power transfer systems. The devices and process described herein can be used in a variety of contexts, including implantable devices, cell phone and other mobile computing device chargers, and chargers for electric vehicles.

In a first general aspect, the disclosure features, a sensor network for a wireless power transfer system. The sensor network includes a differential voltage sensing circuit and a current sensing circuit. The differential voltage sensing circuit is arranged within a wireless power transfer system to measure a rate of change of a voltage difference between portions of an impedance matching network and generate a first signal representing the rate of change of the voltage difference. The current sensing circuit is coupled to the differential voltage sensing circuit and configured to calculate, based on the first signal, a current through a resonator coil coupled to the wireless power transfer system.

In a second general aspect, the disclosure features a wireless power transfer system that includes a resonator coil, an impedance matching network coupled to the resonator coil, and a sensor network. The sensor network includes a differential voltage sensing circuit and a current sensing circuit. The differential voltage sensing circuit is arranged to measure a rate of change of a voltage difference between portions of the impedance matching network and generate a first signal representing the rate of change of the voltage difference. The current sensing circuit is coupled to the differential voltage sensing circuit and configured to calculate, based on the first signal, a current through the resonator coil.

These and the following aspects can each optionally include one or more of the following features.

In some implementations, the differential voltage sensing circuit is configured to scale the first signal in response to a second signal, the second signal representing a current through the impedance matching network.

In some implementations, the portions of the impedance matching network are tunable matching networks that include one or more tunable capacitors.

In some implementations, the differential voltage sensing circuit includes an amplification stage having a unity gain amplifier. In some implementations, the unity gain amplifier is configured to provide the first signal as a single-ended voltage signal. In some implementations, the differential voltage sensing circuit is arranged to apply a second signal to the unity gain amplifier to scale the first signal in response to the second signal, the second signal representing a current through the impedance matching network.

In some implementations, the differential voltage sensing circuit includes a differentiator circuit.

In some implementations, the current sensing circuit includes a differential circuit configured to generate a second signal representing the current through the resonator coil coupled to the wireless power transfer system by subtracting the first signal from a second signal, the second signal representing a current through the impedance matching network.

In a third general aspect, the disclosure features a protection network for a wireless power transfer system. The protection network includes a differential voltage sensing circuit, a first current sensing circuit, and a second current sensing circuit. The differential voltage sensing circuit is arranged within a wireless power transfer system to measure a rate of change of a voltage difference between portions of an impedance matching network and generate a first signal representing the rate of change of the voltage difference. The first current sensing circuit is arranged to measure a first current and generate a second signal representing the first current, where the first current is through the impedance matching network. The second current sensing circuit is coupled to the differential voltage sensing circuit and to the first current sensing circuit. The second current sensing circuit is configured to calculate, based on the first signal and the second signal, a second current and generate a third signal representing the second current, where the second current is through a resonator coil coupled to the wireless power transfer system. This aspect can optionally include one or more of the following features.

In some implementations, the differential voltage sensing circuit is coupled to the first current sensing circuit, and wherein the differential voltage sensing circuit is configured to scale the first signal in response to the second signal.

In some implementations, the differential voltage sensing circuit comprises an amplification stage includes a unity gain amplifier.

In some implementations, the unity gain amplifier is configured to provide the first signal as a single-ended voltage signal.

In some implementations, the differential voltage sensing circuit is coupled to the first current sensing circuit, and wherein the differential voltage sensing circuit is arranged to apply the second signal to the unity gain amplifier to scale the first signal in response to the second signal.

In some implementations, the differential voltage sensing circuit comprises a differentiator circuit. In some implementations, the second current sensing circuit comprises a differential circuit configured to generate the third signal by subtracting the first signal from the second signal.

Some implementations further include fault protection circuitry coupled to respective output terminals of the first current sensing circuit and the second current sensing circuit, the fault protection circuitry configured to bypass a tunable matching network (TMN) in response to a magnitude of the second signal or a magnitude of the third signal exceeding a respective threshold value.

In some implementations, the fault protection circuitry is further configured to bypass the tunable matching network by latching a control signal for a TMN bypass transistor in an asserted state.

In some implementations, the fault protection circuitry is further configured to delay latching the control signal until a voltage across the TMN is below a TMN voltage threshold value.

Some implementations further include fault protection circuitry coupled to respective output terminals of the first current sensing circuit and the second current sensing circuit, the fault protection circuitry configured to shutdown an inverter-rectifier in response to a magnitude of the second signal or a magnitude of the third signal exceeding a respective threshold value.

In a fourth general aspect, the disclosure features a fault protection method for a bidirectional wireless power transfer system. The method includes the actions of detecting, by control circuitry of a wireless power transfer device, a fault for the bidirectional wireless power transfer system. Identifying an operating personality of the wireless power transfer device and a hardware configuration of the wireless power transfer device. Identifying, in response to detecting the fault and based on the operating personality and the hardware configuration, protection operations for protecting the wireless power transfer device from the fault. Controlling operations of the wireless power transfer device according to the protection operations. Other implementations of this aspect include corresponding systems, circuitry, controllers, apparatus, and computer programs, configured to perform the actions of the methods, encoded on computer storage devices.

These and other implementations can each optionally include one or more of the following features.

In some implementations, in response to the operating personality indicating that the wireless power transfer device is operating as a wireless power transmitter, the protection operations include shutting down an inverter-rectifier and shorting at least a portion of an impedance matching circuit. In some implementations, shutting down the inverter-rectifier includes overriding inverter-rectifier pulse width modulation (PWM) control signals.

In some implementations, in response to the operating personality indicating that the wireless power transfer device is operating as a wireless power receiver and the hardware configuration indicating that the wireless power transfer device is configured as a grid-connected system, the protection operations include shutting down an inverter-rectifier, shorting at least a portion of an impedance matching circuit to dissipate current from a resonator coil, and switching in a resistor configured to dissipate excess power from the inverter-rectifier. In some implementations, shutting down the inverter-rectifier includes overriding inverter-rectifier pulse width modulation (PWM) control signals.

In some implementations, in response to the operating personality indicating that the wireless power transfer device is operating as a wireless power receiver, the protection operations include shutting down an inverter-rectifier, and shorting at least a portion of an impedance matching circuit to dissipate current from a resonator coil.

In some implementations, shutting down the inverter-rectifier includes overriding inverter-rectifier pulse width modulation (PWM) control signals.

In some implementations, in response to the operating personality indicating that the wireless power transfer device is operating as a wireless power receiver and the hardware configuration indicating that the wireless power transfer device is configured as a device-connected system, the protection operations include closing switches of an inverter-rectifier to provide a short circuit between terminals of a resonator coil. In some implementations, the protection operations cause a corresponding fault condition in a second wireless power transfer device that is magnetically coupled to the first wireless power transfer device.

In some implementations, the fault is at least one of: a tunable impedance matching network fault, an overcurrent fault, or an overvoltage fault.

In some implementations, the fault is an overvoltage fault or an overcurrent fault triggered by a load disconnect.

In some implementations, the method includes initiating the fault by disconnecting a load from the wireless power transfer device in response to detecting a vehicle collision.

In a fifth general aspect, the disclosure features a method of operating a bidirectional wireless power transfer system. The method includes the actions of transmitting, by a first wireless power transfer device to a second wireless power transfer device, instructions to reverse a direction of power flow between the first wireless power transfer device and the second wireless power transfer device. Receiving, from the second wireless power transfer device, an indication that the second wireless power transfer device has reconfigured to operate according a reverse direction of power flow. In response to the indication the first wireless power device assigns an operating personality of the first wireless power transfer device in accordance with the reverse direction of power flow, and controls operation of an inverter-rectifier of the first wireless power transfer device for operation according to the operating personality. Other implementations of this aspect include corresponding systems, circuitry, controllers, apparatus, and computer programs, configured to perform the actions of the methods, encoded on computer storage devices.

These and other implementations can each optionally include one or more of the following features.

In some implementations, the operating personality indicates that the first wireless power transfer device is operating as a wireless power transmitter, and controlling operation of the inverter-rectifier includes generating pulse width modulation (PWM) control signals for operating the inverter-rectifier as an inverter.

In some implementations, the operating personality indicates that the first wireless power transfer device is operating as a wireless power receiver, and controlling operation of the inverter-rectifier includes generating pulse width modulation (PWM) control signals for operating the inverter-rectifier as a rectifier.

In some implementations, the operating personality indicates that the first wireless power transfer device is operating as a wireless power receiver, and controlling operation of the inverter-rectifier includes in response to a power at the inverter-rectifier being less than a threshold value, operating the inverter-rectifier in a passive rectifier mode; and in response to the power at the inverter-rectifier being greater than the threshold value, generating pulse width modulation (PWM) control signals for operating the inverter-rectifier in an active rectification mode.

In some implementations, the PWM control signals alternately turn on corresponding pairs of transistors in the inverter-rectifier to generate a DC output signal.

In some implementations, the PWM control signals alternately turn on corresponding pairs of transistors in the inverter-rectifier in response to detecting a zero current condition at an input to the inverter-rectifier.

In some implementations, the method includes in response to the indication, resetting a tunable matching network of the first wireless power transfer device and controlling operation of the tunable matching network in accordance with the assigned operating personality.

In some implementations, the first wireless power transfer device is coupled to a vehicle and the second wireless power transfer device is coupled to a power grid.

In a sixth general aspect, the disclosure features a method for protecting a wireless power system during a load disconnect condition in which a load is disconnected from an output of a rectifier of a wireless power receiver, the wireless power system comprising the wireless power receiver and a wireless power transmitter, the wireless power receiver configured to receive power from the wireless power transmitter. The method includes detecting, by a load disconnect sensor, a load disconnect condition. Shorting, by a first controller, two or more rectifier-protection switches, each protection switch coupled to a diode of the rectifier. Shorting, by a second controller, a first TMN-protection switch coupled to a receiver-side tunable capacitor, the tunable capacitor coupled to an input of the rectifier. Detecting, by a current sensor coupled to the transmitter, an overcurrent condition in an inverter of the transmitter. Shutting off, by a third controller, the inverter. Shorting, by a fourth controller, a second TMN-protection switch coupled to a receiver-side tunable capacitor, the tunable capacitor coupled to an output of the receiver. Other implementations of this aspect include corresponding systems, circuitry, controllers, apparatus, and computer programs, configured to perform the actions of the methods, encoded on computer storage devices.

In a sixth general aspect, the disclosure features a method for protecting a wireless power system during a load short condition in which a load is shorted at an output of a rectifier of a wireless power receiver, the wireless power system comprising the wireless power receiver and a wireless power transmitter, the wireless power receiver configured to receive power from the wireless power transmitter. The method includes detecting, by a voltage sensor coupled to the rectifier output, an undervoltage condition. Shorting, by a first controller, a first protection switch coupled to a tunable capacitor of the wireless power receiver. Detecting, by a current sensor coupled a tunable capacitor of the wireless power transmitter, an overcurrent condition in the tunable capacitor. Shorting, by a second controller, a second protection switch coupled to a tunable capacitor of the wireless power transmitter. Other implementations of this aspect include corresponding systems, circuitry, controllers, apparatus, and computer programs, configured to perform the actions of the methods, encoded on computer storage devices. In some implementations, the method includes shutting off an inverter of the wireless power transmitter, the inverter coupled to the tunable capacitor of the wireless power transmitter.

In a seventh general aspect, the disclosure features a method for protecting a bidirectional wireless power system during a load disconnect condition in which the load is disconnected from an output of a ground side inverter of a ground side wireless power transmitter, the bidirectional wireless power system comprising the wireless power transmitter and a wireless power receiver, and the wireless power transmitter configured to receive power from the bidirectional wireless power receiver. The method includes detecting, by a load disconnect sensor, a load disconnect condition. Shutting off, by a first controller, the ground-side inverter. Shorting, by a second controller, a first TMN-protection switch coupled to a first ground-side tunable capacitor, the at least one tunable capacitor coupled to an input of the ground-side inverter. Switching in, by the first controller, a first resistor parallel with the disconnected load. Transmitting an error signal from the wireless power transmitter to the wireless power receiver. Upon receipt of the error signal, shutting off, by a third controller, the vehicle-side inverter. Other implementations of this aspect include corresponding systems, circuitry, controllers, apparatus, and computer programs, configured to perform the actions of the methods, encoded on computer storage devices.

Particular implementations of the subject matter described in this specification can be implemented so as to realize one or more of the following advantages. Implementations may provide a modular sensor network that can be readily configured for use on either a wireless power transmitter or receiver. Implementations may provide a modular sensor network that can be readily configured for use on either a wireless power transmitter or receiver. Implementations may provide a sensor/protection network that can be used with either uni-directional or bidirectional wireless power transfer systems. Implementations provide a sensor network capable of making remote measurements of resonator coil current. For example, implementation can provide so the sensor network is capable of measuring the current through a transmitter resonator coil that is positioned remote (e.g., along a 8-10 foot cable) from the sensors and other control circuitry of the wireless power transmitter. In some implementations that use analog circuitry to implement sensors and protection circuitry may provide faster protection response to hazardous operating conditions. Some implementations provide protection without reliance on communication schemes. For example, implementations can initiate protective actions between a wireless power receiver and a wireless power transmitter without reliance on a wired or wireless communication link in a forward and reverse charging direction. Some implementations allow for modularity of non-redundant hardware, code, and memory. For example, assigning operating personalities to components in bidirectional systems can allow for greater modularity of hardware and software, which may allow for fast, safe, and on-the-fly for power reversals. In addition, the increased modularity may increase efficiency in product manufacturing.

Implementations of the devices, circuits, and systems disclosed can also include any of the other features disclosed herein, including features disclosed in combination with different implementations, and in any combination as appropriate.

The details of one or more implementations of the subject matter described in this specification are set forth in the accompanying drawings and the description below. Other features, aspects, and advantages of the subject matter will be apparent from the description, the drawings, and the claims.

BRIEF DESCRIPTION OF THE DRAWINGS

FIGS. 3A-3C are schematics of an exemplary voltage sensor across one or more capacitors in position C2 of the wireless power transmitter or receiver.

FIG. 3D is a plot of an exemplary waveform output of voltage sensor and exemplary waveform output of a direct measurement of $V_{C2}$ voltage (VC2+, VC2−) provided in FIGS. 1A-1B.

FIGS. 3E-3F are plots of exemplary waveforms of voltages VC2_diff, Vy, and VC2_sense.

FIG. 4B is a plot of an exemplary waveform output of current sensor and exemplary waveform output of a direct measurement of the current I1 at inductor Ls1.

FIG. 4C is a plot of an exemplary waveform of voltage Vc2_diff.

FIG. 4D is a plot of an exemplary waveform of voltage V1.

FIG. 22B illustrates logic truth tables associated with the exemplary protection logic shown in FIG. 22A.

Like reference numbers and designations in the various drawings indicate like elements.

DETAILED DESCRIPTION

In general, the disclosure features control and protection systems for uni-directional and bidirectional wireless power transfer systems. Implementations include sensor and protection networks to protect wireless power transfer systems from various hazardous conditions including overvoltage, overcurrent, over-temperature, and sudden changes to power that may cause damage to the system. Implementations include control systems for managing the shutdown of wireless power transmission system components (e.g., tunable matching networks, inverters, rectifiers, and inverter-rectifiers) in response to a protective action. Implementations include control systems and processes for managing the reversal of power flow in a bidirectional wireless power transfer system.

Figure 1A:
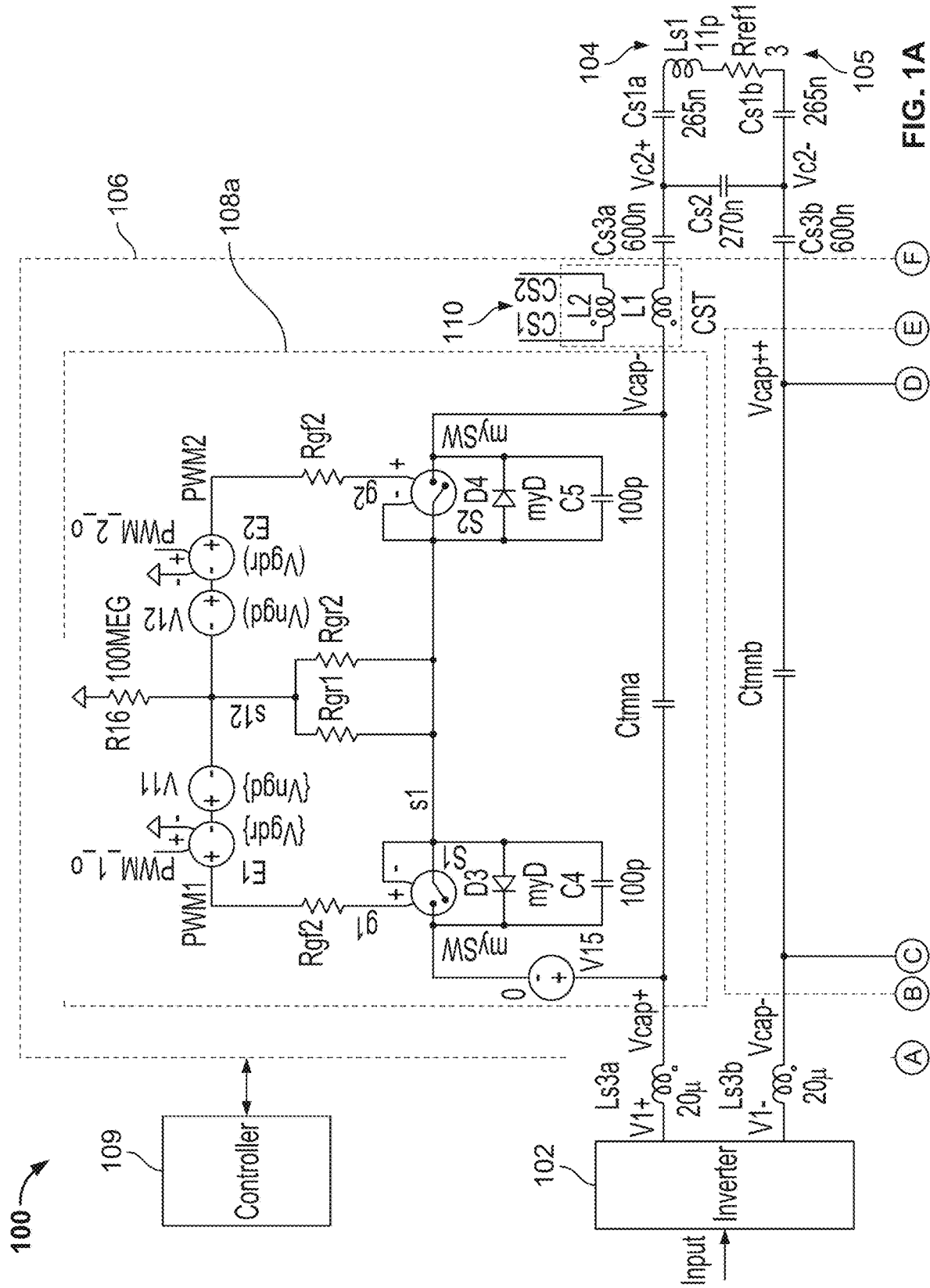
FIG. 1A is a diagram of a schematic model of an exemplary wireless power transmitter.
Figure 1A:
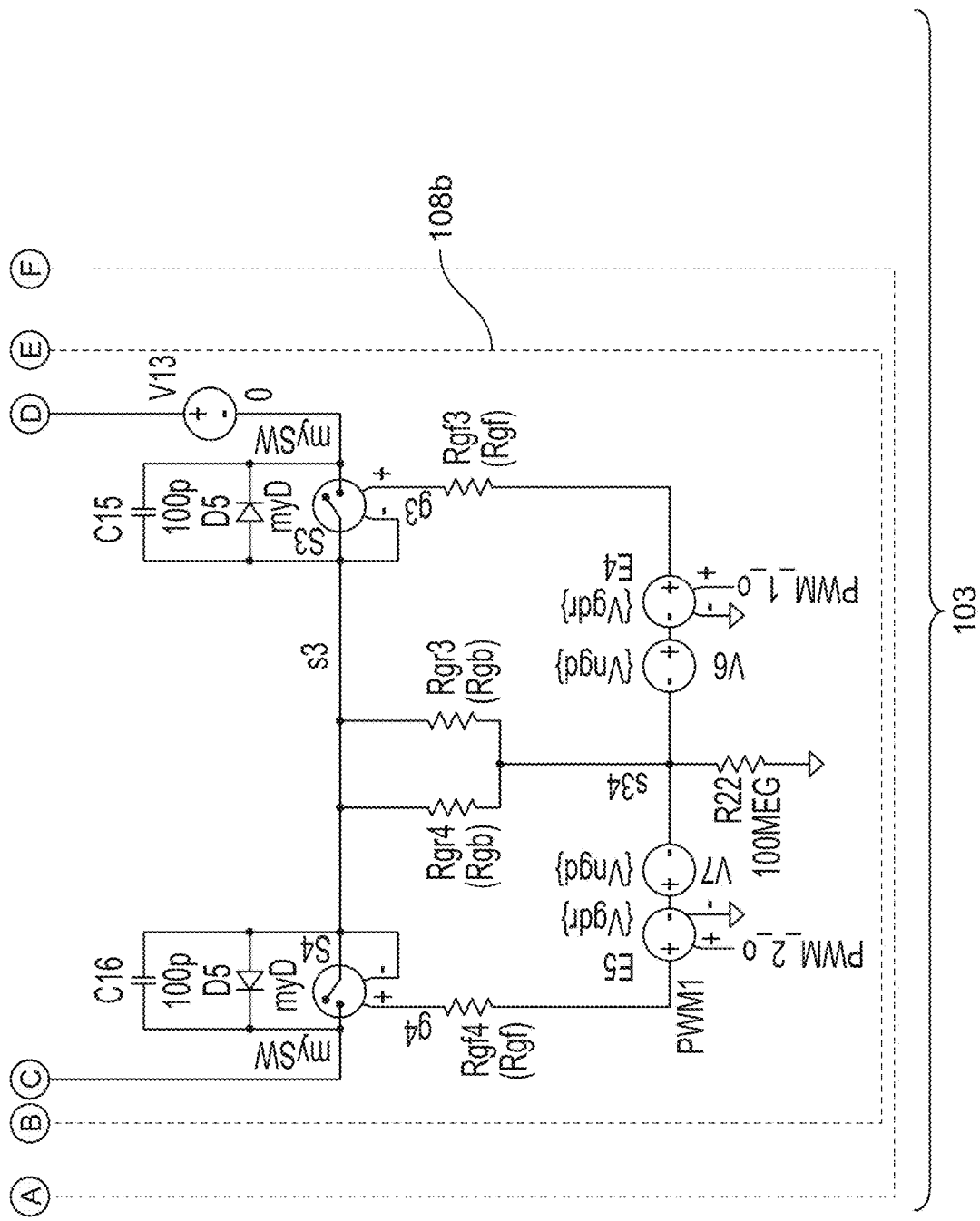

FIG. 1A is a diagram of an equivalent model of an exemplary wireless power transmitter 100 (also known as a wireless power source or ground assembly (GA)). The wireless power transmitter 100 is part of an overall wireless power system that further includes a wireless power receiver 112 (in FIG. 1B) that is configured to receive power transmitted by the wireless power transmitter 100. A wireless power transmitter 100 is generally coupled to a power supply such as a power grid, AC generator, etc. Furthermore, the wireless power transmitter 100 is generally used to transfer power from the power supply to power a load or charge a battery coupled to a wireless power receiver 112. This mode of operation is referred to herein as the normal operating mode and is used in reference to the normal power flow direction in a uni-directional wireless power transfer system. However, power flow can be reversed (e.g. a reverse power flow direction) in a bidirectional wireless power transfer system. Such operation would be considered a reverse operating mode. For example, in a bidirectional wireless power transfer system the transmitter 100 can operate as a "receiver" and the receiver 112 can operate as a "transmitter," for example, to transfer power from battery, or a stored power source, to a load coupled to the transmitter 100. For example, during a power outage, a battery of an electric vehicle could be used to provide emergency power to a home through a bidirectional wireless power system. Accordingly, the terms "transmitter" and "receiver" as used herein are in reference to respective components is in reference to their function in the normal operating mode, but is not intended to limit their function to either transmitter or receiving power alone.

The exemplary wireless power transmitter 100 includes an inverter 102, which receives an input voltage and is coupled to an impedance matching network 103 and a resonator coil 104. Note that the model takes into account the equivalent reflected impedance $R_{refl}$ 105 of the wireless power receiver and load that is reflected to the transmitter. Within the impedance matching network 103 is a tunable matching network (TMN) 106 having at least one first tunable capacitor. In this example, the TMN 106 includes a first tunable capacitor 108a and a second tunable capacitor 108b. In some implementations, the TMN 106 is coupled to one or more controllers 109, such as a microcontroller, configured to provide control signals such as tuning signals to tune the tunable capacitors 108a-108b, protection signals to protect the TMN 106 from damage, and the like. Examples and description of tunable matching networks can be found in commonly owned U.S. patent application Ser. No. 15/427,186 filed on Feb. 8, 2017 and titled "PWM capacitor control".

In the exemplary implementation shown in FIG. 1A, the inverter 102 provides a voltage (V1+, V1−) to the impedance matching circuit 103 having inductors Ls3a and Ls3b. These inductors Ls3a and Ls3b are coupled in series with a tunable capacitor 108a and 108b, respectively. Tunable capacitor 108a has a first end with positive voltage Vcap+ and a second end with negative voltage Vcap−. Tunable capacitor 108b has a first end with positive voltage Vcap++ and a second end with negative voltage Vcap−−. Tunable capacitor 108a is coupled in series with an optional current sense transformer 110. In some implementations, the tunable capacitors 108a, 108b can be coupled in series to fixed capacitors Cs3a, Cs3b respectively. Coupled to the right-hand ends of capacitors Cs3a, Cs3b is capacitor Cs2 having voltage (Vc2+, Vc2−). Coupled in parallel to capacitor Cs2 is capacitor Cs1a, inductor Ls1, and capacitor Cs1b. Inductor Ls1, when driven, is configured to generate an oscillating magnetic field to transfer energy to a wireless power receiver. Note that any of the electrical components discussed herein may represent one or more components coupled to each other. For example, a single capacitor in transmitter model 100 may represent two or more capacitors coupled in parallel or in series. Note also that any values of components indicated in any of the provided figures are exemplary values and can be adjusted for specific applications.

Figure 1B:
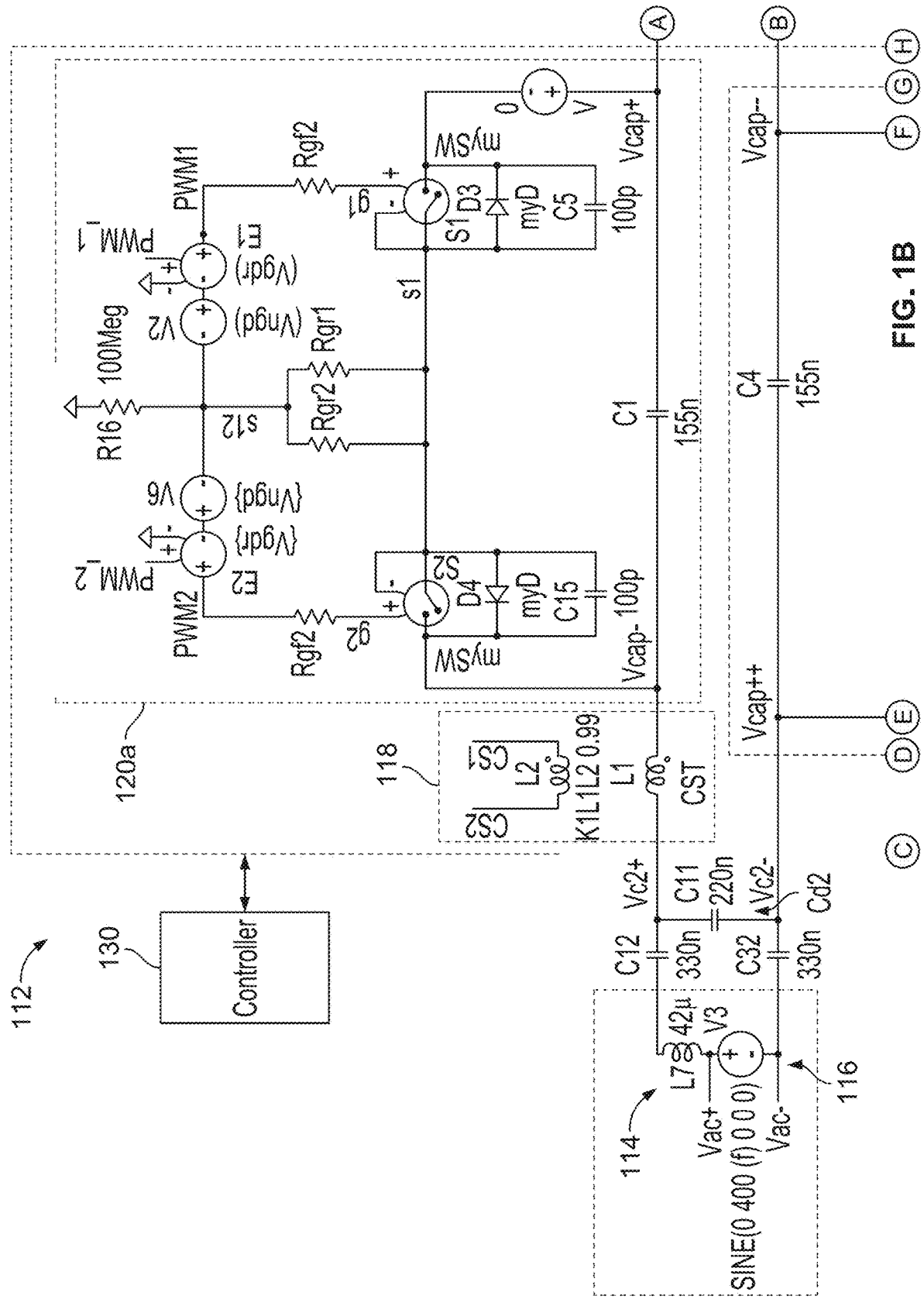
FIG. 1B is a diagram of a schematic model of an exemplary wireless power receiver.
Figure 1B:
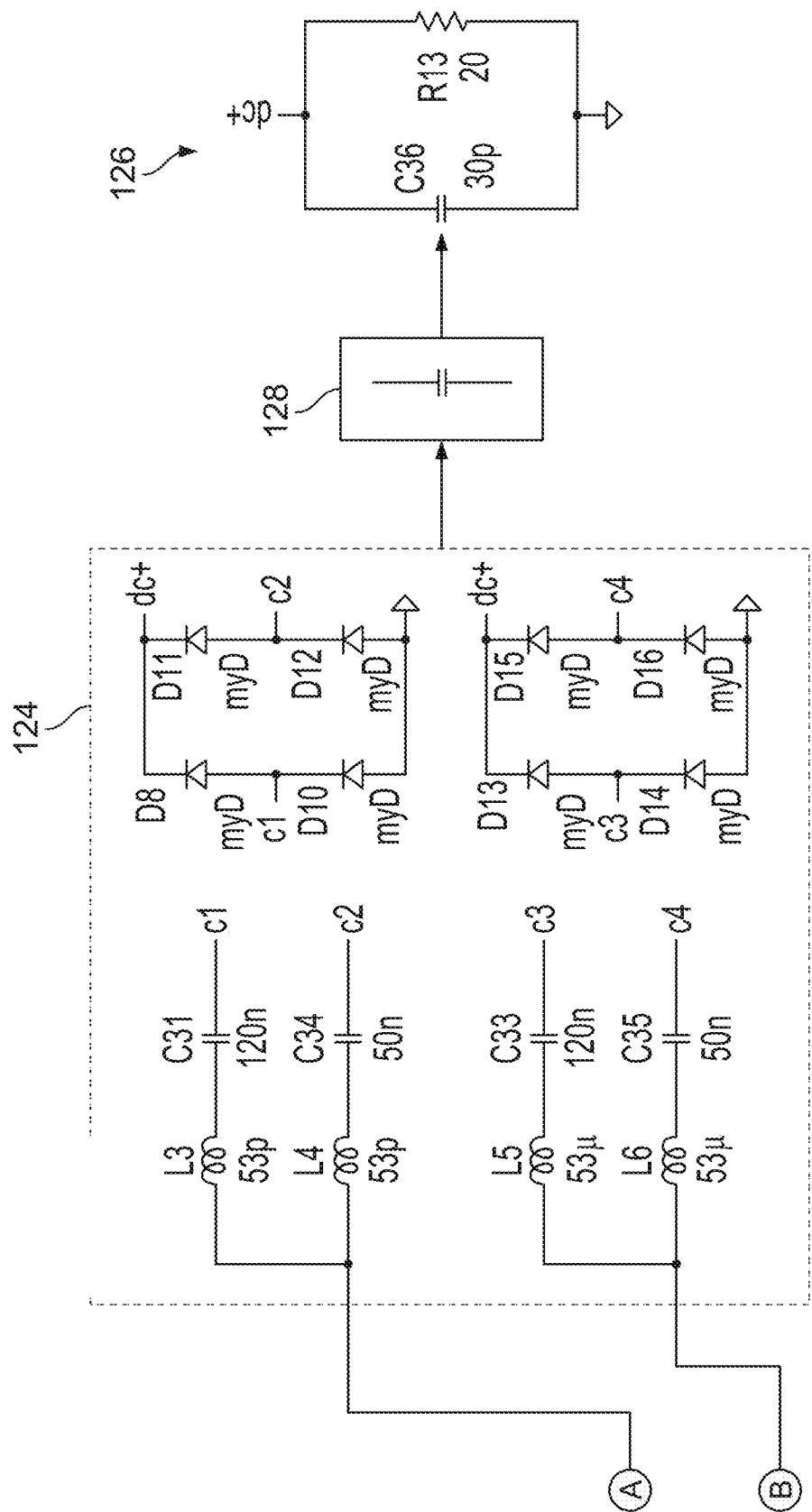
Figure 1B:
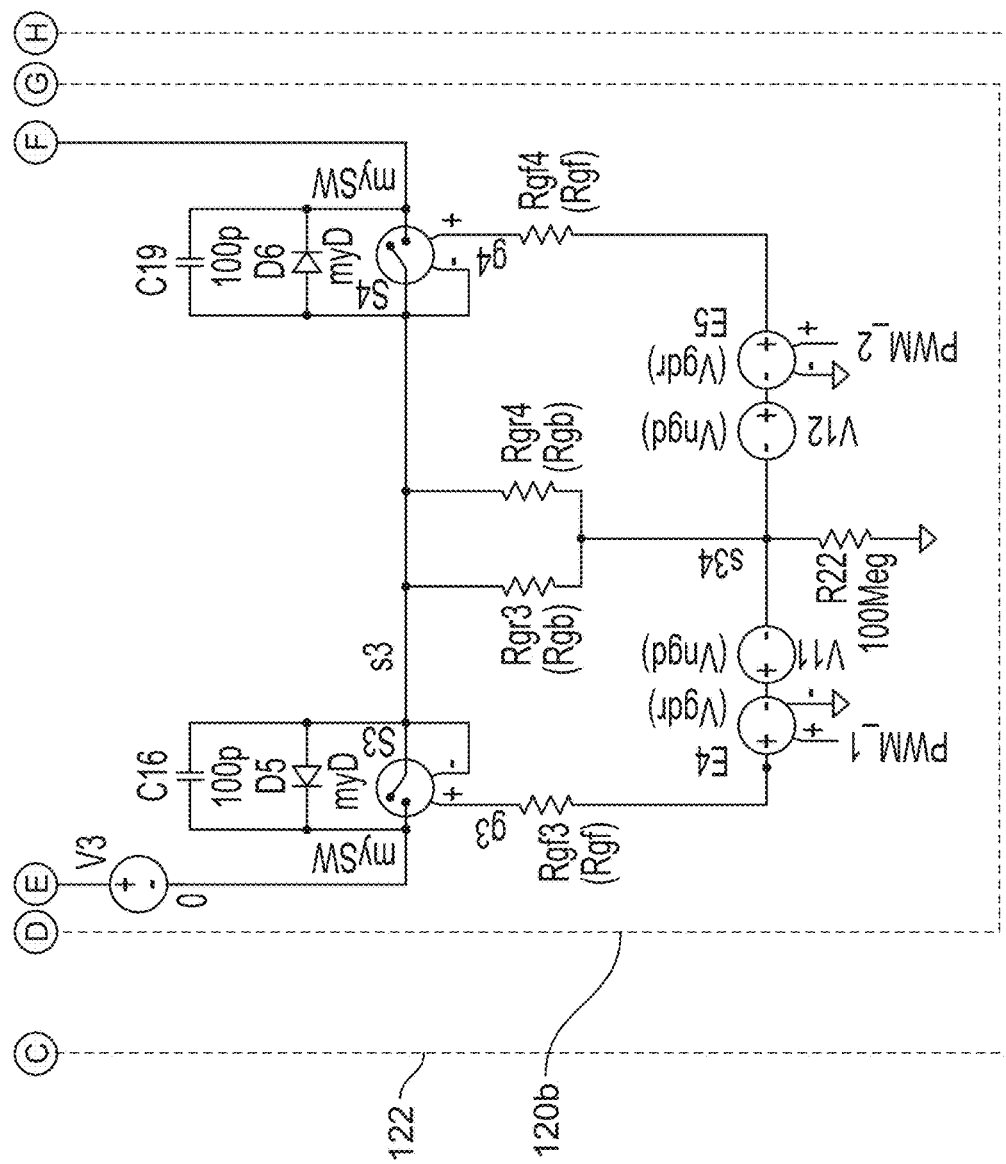

FIG. 1B is a diagram of an equivalent model of an exemplary wireless power receiver (also known as a wireless power device or vehicle assembly (VA)). The structure of the wireless power receiver largely mirrors the structure of the transmitter 100 with some important differences. In the receiver model 112, a voltage is induced in the receiver coil 114 when the transmitter 100 generates an oscillating magnetic field. The voltage source 116 in the receiver 112 models this induced voltage. The receiver coil 114 is coupled to a capacitor network, which includes capacitors C12 and C32 in series and capacitor C11 in parallel. Coupled in series to this network is a tunable matching network (TMN) 122 that includes a current sense transformer (CST) 118 and tunable capacitors 120a, 120b. Note that the CST 118 and/or tunable capacitors 120a, 120b may be packaged together in a module, such as an integrated circuit (IC). Ultimately, the matched voltage originating from the receiver coil is rectified at rectifier 124 and outputted to a load 126. In some implementations, the load 126 may be a battery manager coupled to a battery. In some implementations, the load 126 may be the battery itself. In an exemplary implementation, a smoothing capacitor 128 may couple the output of the rectifier 124 to the load 126 and serve to filter the rectified output. In some implementations, the TMN 122 is coupled to one or more controllers 130, such as a microcontroller, configured to provide control signals such as tuning signals to tune the tunable capacitors 120a-120b, protection signals to protect the TMN 122 from damage, and the like.

Note that many of the below implementations of sensors and protection mechanisms are discussed in the context of the wireless power transmitter. However, they can be applied to similar structures and functions of the wireless power receiver.

In some implementations, inverter 102 can be implemented as a bidirectional inverter-rectifier as discussed in more detail below. Similarly, in some implementations, rectifier 124 can be implemented as a bidirectional inverter-rectifier as discussed in more detail below.

Figure 1C:
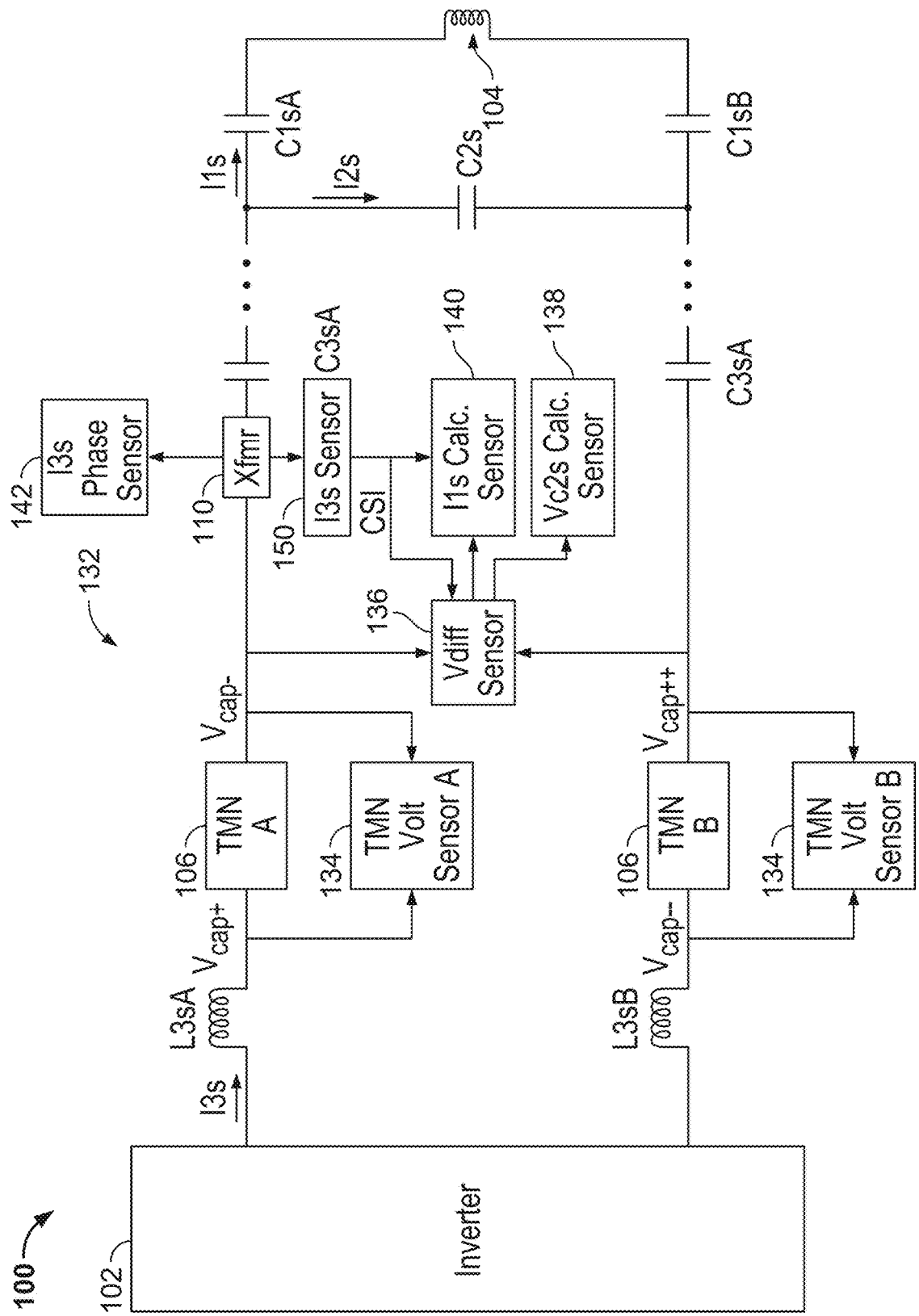
FIG. 1C is a block diagram of an exemplary sensor network for use in wireless power systems.

FIG. 1C is a block diagram of an example sensor network 132 for use in wireless power systems. For clarity, sensor network 132 is depicted in FIG. 1C as being implemented within a wireless power transmitter 100. It should be noted that, wireless power transmitter 100 is similar to the wireless power transmitter 100 illustrated in FIG. 1A, except that the wireless power transmitter 100 is represented as a block diagram rather than a schematic model. In addition, sensor network 132 can be implemented within a wireless power receiver (e.g., wireless power receiver 112 shown in FIG. 1B). For example, sensor network 132 can be arranged in a similar fashion within a wireless power receiver 112 to measure voltages and currents of wireless power receiver components that correspond to the wireless power transmitter components discussed below.

Sensor network 132 includes TMN voltage sensors 134, differential voltage sensor 136, voltage sensor 138, current sensor 140, current phase sensor 142, and current sensor 150. Each of sensors 134, 136, 138, 140, 142, and 150 can be implemented as analog circuits as shown, for example, in FIGS. 2A, 3A-3C, 4A, 5A, and 6A and described in more detail below. In some implementations, one or more of sensors 134, 136, 138, 140, 142, and 150, or portions thereof, can be implemented in software. For example, voltages or currents measured by sensors 134, 136, 138, 140, 142, and 150 can be converted from analog to digital and further processed by a microprocessor or microcontroller according to software instructions.

TMN voltage sensors 134 are arranged to measure the voltage across TMN 106. For example, TMN voltage sensor A is electrically connected on either side of TMN A to measure the voltage drop across TMN A. For example, voltage sensor 134 is connected at Vcap+ and Vcap−. In some implementations, the sensor network 132 can include one voltage sensor 134 for each TMN 106 in a wireless power transmitter 100. For example, a wireless power transmitter 100 may have only one TMN 106 and only one corresponding voltage sensor 134, while in another implementation a wireless power transmitter 100 may have multiple TMNs 106 with a corresponding voltage sensor 134 for each TMN 106. As described in more detail below in reference to FIG. 2A, Voltage sensor 134 is configured to generate an output voltage signal that represents the measured voltage across a TMN 106. In some examples, the output voltage signal is a single ended voltage signal, for example, a voltage signal that ranges between zero and a positive or negative bound (e.g., 0 to 3V or 0 to −3V).

Although illustrated as being in series with the resonator coil 104, in some implementations the TMN 106 is be arranged in parallel with the resonator coil 104. In such implementations, voltage sensor 134 can also be arranged in parallel with the TMN 106.

Differential voltage sensor 136 is arranged to measure the rate of change (e.g., the first derivative) of the voltage difference between portions of the impedance matching network. For example, differential voltage sensor 136 is arranged to measure the rate of change of the voltage difference between the respective output terminals of TMN A and TMN B. For example, the differential voltage sensor 136 can be connected at Vcap− and Vcap++. As described in more detail below in reference to FIGS. 3A and 3B, differential voltage sensor 136 is configured to generate an output signal that represents the measured rate of change of the voltage between the outputs of TMNs 106. In some examples, the output voltage signal is a single ended voltage signal. The output of the differential voltage sensor 136 also represents the rate of change of the voltage across capacitor C2$s$. Two different transmitter 100 parameters can be determined based on the differential voltage obtained at this location in the transmitter 100; the voltage across capacitor C2$s$ and the current through the resonator coil 104 (current I1$s$).

Voltage sensor 138 is configured to measure the voltage across capacitor C2$s$. As described in more detail below in reference to FIG. 3C, voltage sensor 136 is configured to generate an output signal that represents voltage across capacitor C2$s$. For example, voltage sensor 138 can be configured to integrate the output of differential voltage sensor 138 to provide an output signal that represents the voltage across capacitor C2$s$, or more generally any parallel components of matching network. In some examples, the output signal is a single ended voltage signal.

Current sensor 140 is configured to measure the current through the resonator coil 104 (e.g., current I1$s$). As described in more detail below in reference to FIG. 4A, current sensor 140 is configured to generate an output signal that represents current through the resonator coil 104. For example, current sensor 140 is configured to calculate the current I2$s$ through capacitor C2$s$ based on the differential voltage measured by differential voltage sensor 136 and obtain the current through the coil 104 by subtracting the calculated current I2$s$ from the current I3$s$ through the impedance matching network as measured by current sensor 150. In some examples, the output signal of current sensor 140 is a single ended voltage signal.

Current sensor 150 is coupled to transformer 110, e.g., in a transmitter 100. Similarly, currents sensor 150 can be coupled to a corresponding transformer, e.g., CST 118 in a receiver 112. Current sensor 150 is configured to measure the current through the impedance matching network (e.g., current I3$s$). As described in more detail below in reference to FIG. 6A, current sensor 150 is configured to generate an output signal (CSI) that represents current I3$s$ through the impedance matching network (e.g., TMN 106, inductor L3$s$A, and capacitor C3$s$A).

Current phase sensor 142 is configured to measure the phase of the current I3$s$ through the impedance matching network. As described in more detail below in reference to FIG. 5A, current phase sensor 142 is configured to generate an output signal that represents phase of current I3$s$.

In some implementation of a wireless power transmitter 100 it is not practical to directly measure the current through the resonator coil 104 because the coil may be located at the end of a cable that is at a distance from the transmitter's control circuitry. In such situations, the indirect measurements provided by the sensor network 132 may provide accurate and efficient current measurements to effectively maintain safe operations of the wireless power transmitter 100. In some implementations, the sensors in sensor network 132 can be implemented in analog circuitry. Such implementations may provide faster detection and response to hazardous conditions than digital circuitry or software based sensors.

In some implementations, differential voltage sensor 136 is configured to scale its output signal based the current measurement obtained by current sensor 150. For example, the differential voltage sensor 136 can scale its output signal to account for a voltage drop across capacitors C3$s$A and C3$s$B (when present in a transmitter 100) based on the output (CSI) of current sensor 150.

Figure 1D:
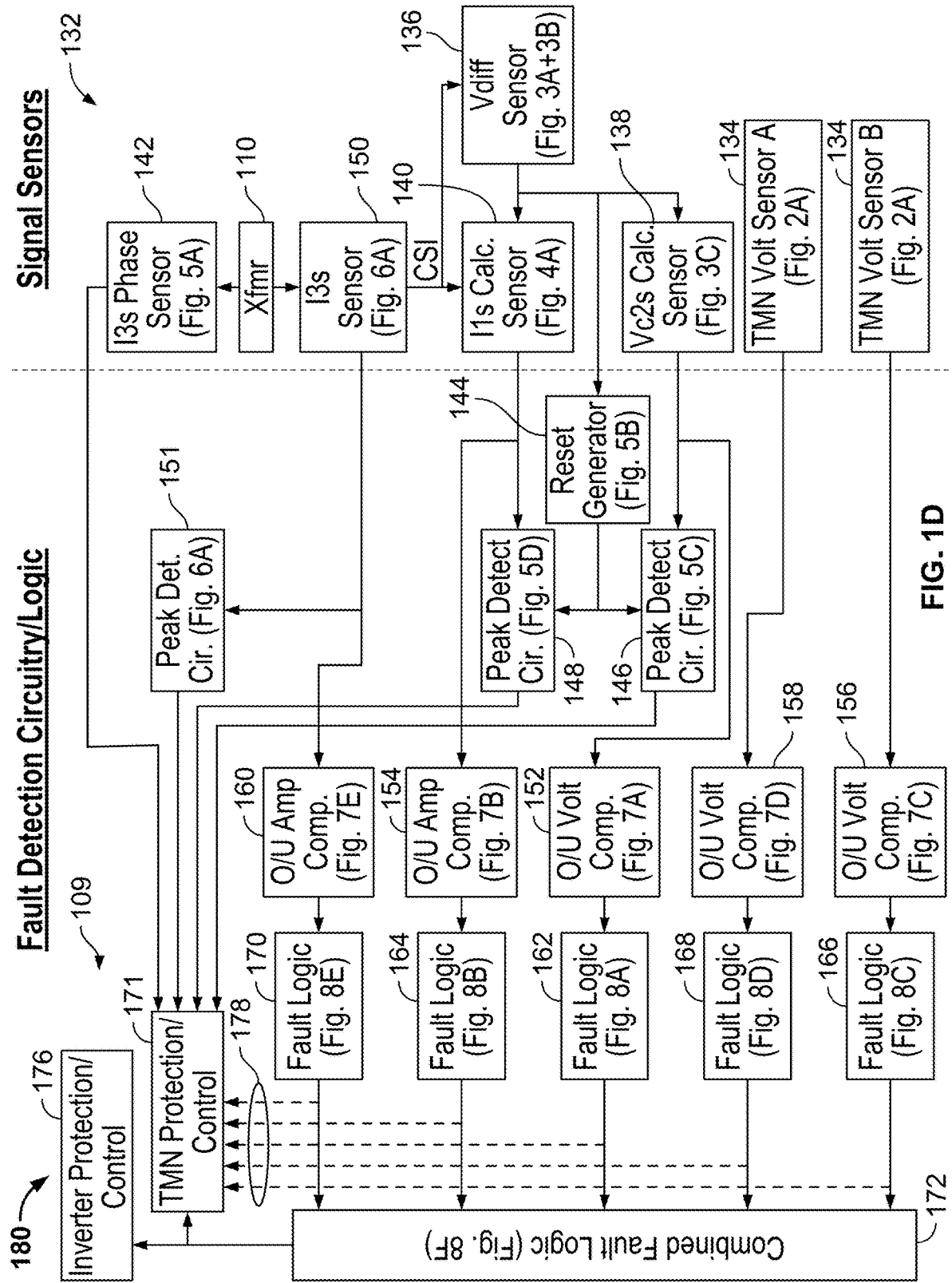
FIG. 1D is a block diagram of an exemplary protection network for use in wireless power transfer systems.

FIG. 1D is a block diagram of an exemplary protection network 180 for use in wireless power transfer systems. Protection network 180 incorporates sensor network 132. Protection network 180 is configured to generate faults in response to detecting a hazardous operating condition in the wireless power transmitter 100 (or receiver 112). Protection network 180 can also be configured to perform protective actions for a wireless power transmitter 100 (or receiver 112) in response to detecting a hazardous operating condition. Hazardous operating conditions can include, but are not limited to, over/under voltage/current conditions in the impedance matching network and/or TMN, over/under voltage/current conditions at the resonator coil, over/under voltage conditions at capacitor C2. These or other hazardous operation conditions can be indicative of one or more operational faults within the wireless power transfer system including, but not limited to, a load short, a load disconnect, the presence of foreign object debris (FOD) too close to the resonator coil 104, or a failure of one or more components of the transmitter 100 or receiver 112.

Protection network 180 includes sensor network 132, peak detectors 146, 148, 151, reset signal generator 144, comparator circuits 152-160, fault logic 162-170, optional combined fault logic 172, and protection/control circuitry 109. Each of the components of protection network 180 can be implemented as analog circuits as shown, for example, in FIGS. 2A, 3A-3C, 4A, 5A, 6A, 6B, 7A-7E, and 8A-8F and described in more detail below. In some implementations, one or more of sensors 134, 136, 138, 140, 142, and 150, or portions thereof, can be implemented can be implemented in software. For example, voltages or currents measured by sensors 134, 136, 138, 140, 142, and 150 can be converted from analog to digital and further processed by a microprocessor or microcontroller according to software instructions.

Protection/control circuitry can include separate protection and control circuitry for the TMN (e.g., TMN protection/control circuitry 174) and for the inverter (or rectifier in a receiver) (e.g., inverter protection/control circuitry 176). Furthermore, the protection and control functions of the protection/control circuitry 109 can be integrated (e.g., into a signal a common processor or set of processors) or segmented (e.g., in which separate protection circuitry functions separately to override normal control signals from control circuitry during in response to a fault condition). The protection/control circuitry 109 can be implemented in hardware, software, or a combination thereof. For example, the protection/control circuitry 109 can be implemented as one or more software programs executed by one or more processors. The protection/control circuitry 109 can be implemented in analog or digital circuits. For example, the protection/control circuitry 109 can be implemented as analog circuitry, as an ASIC, or as an FPGA.

The current phase sensor 142, and the peak detectors 146, 148, 151, provide output signals to the TMN protection/control circuitry 174 which can be used to control the operations of the TMN 106. The details of the current phase sensor 142 and the peak detectors 146, 148, and 151 are described below in reference to FIGS. 5A, 5D, 5C, and 6A. Generally, peak detector 146 generates an output signal that indicates the timing, magnitude, or both of voltage peaks (e.g., positive and negative peaks) across capacitor C2s based on the output of voltage sensor 138. Peak detector 148 generates an output signal that indicates the timing, magnitude, or both of current peaks (e.g., positive and negative peaks) through the resonator coil 104 based on the output of current sensor 140. Peak detector 151 generates an output signal that indicates the timing, magnitude, or both of current peaks (e.g., positive and negative peaks) through the impedance matching network (e.g., I3s) based on the output of current sensor 150. Reset signal generator 144 generates a reset signal that is used to reset the circuitry in peak detectors 148 and 146. Reset signal generator 144 is configured to generate the reset signal based on the output of differential voltage sensor 136.

The comparator circuits 152-160 and fault logic 162-170 detect abnormal output values from respective sensors in sensor network 132 and generate corresponding fault signals. The details of the comparator circuits 152-160 and fault logic 162-170 are described below in reference to FIGS. 7A-7E and 8A-8E. Generally, the comparator circuits 152-160 detect abnormal conditions in the transmitter 100 by comparing an output of a respective sensor to one or more threshold values. The fault logic 162-170 receives an output from a respective one of the comparator circuits 152-160 and generates a fault detection signal if an abnormal condition is detected. For example, the fault logic 162-170 can include a latch circuit that latches (e.g., temporarily or permanently stores) the output of a comparator circuit when a fault is indicated. In response, the fault logic passes a fault signal to either the combined fault logic 172 (if available) or to one or both of the TMN and inverter protection/control circuitry 174, 176. If the combined fault logic 172 is not implemented, each fault logic 162-170 passes its output along signal paths 178 to the protection/control circuitry 109.

TMN protection/control circuitry 174 is configured to shutdown or bypass the TMN 106 (or TMNs 106) in response to the detection of a fault in the wireless power transmission system. As described in more detail below in reference to FIGS. 9A-10B, TMN protection/control circuitry 174 is configured to bypass the TMN in response to a fault. For example, the TMN protection/control circuitry 174 can be configured to bypass the TMN 106 by routing current around the TMN (e.g., shorting the TMN). In some implementations, TMN protection/control circuitry 174 is configured to bypass the TMN 106 by retaining (e.g., latching) one or more control signals (such as a pulse width modulation (PWM) signal) in an asserted state. An asserted state refers to a signal value that holds a bypass transistor in an "on" state. For example, an asserted state for a P-type transistor may be a negative drive signal whereas an asserted state for an N-type transistor may be a positive drive signal. In some implementations, TMN protection/control circuitry 174 can delay latching the control signal until the voltage across the TMN is below a threshold value (e.g., 50 V), for example, to minimize current transients.

Inverter (or rectifier) protection/control circuitry 176 is configured to shutdown the inverter 102 (or rectifier 124) in response to the detection of a fault in the wireless power transmission system. As described in more detail below in reference to FIGS. 14, and 20-23, inverter protection/control circuitry 176 is configured to shutdown the inverter in response to a fault by isolating the inverter (rectifier) from a power source to stop current flow through the transmitter 100 (receiver 112).

Figure 2A:
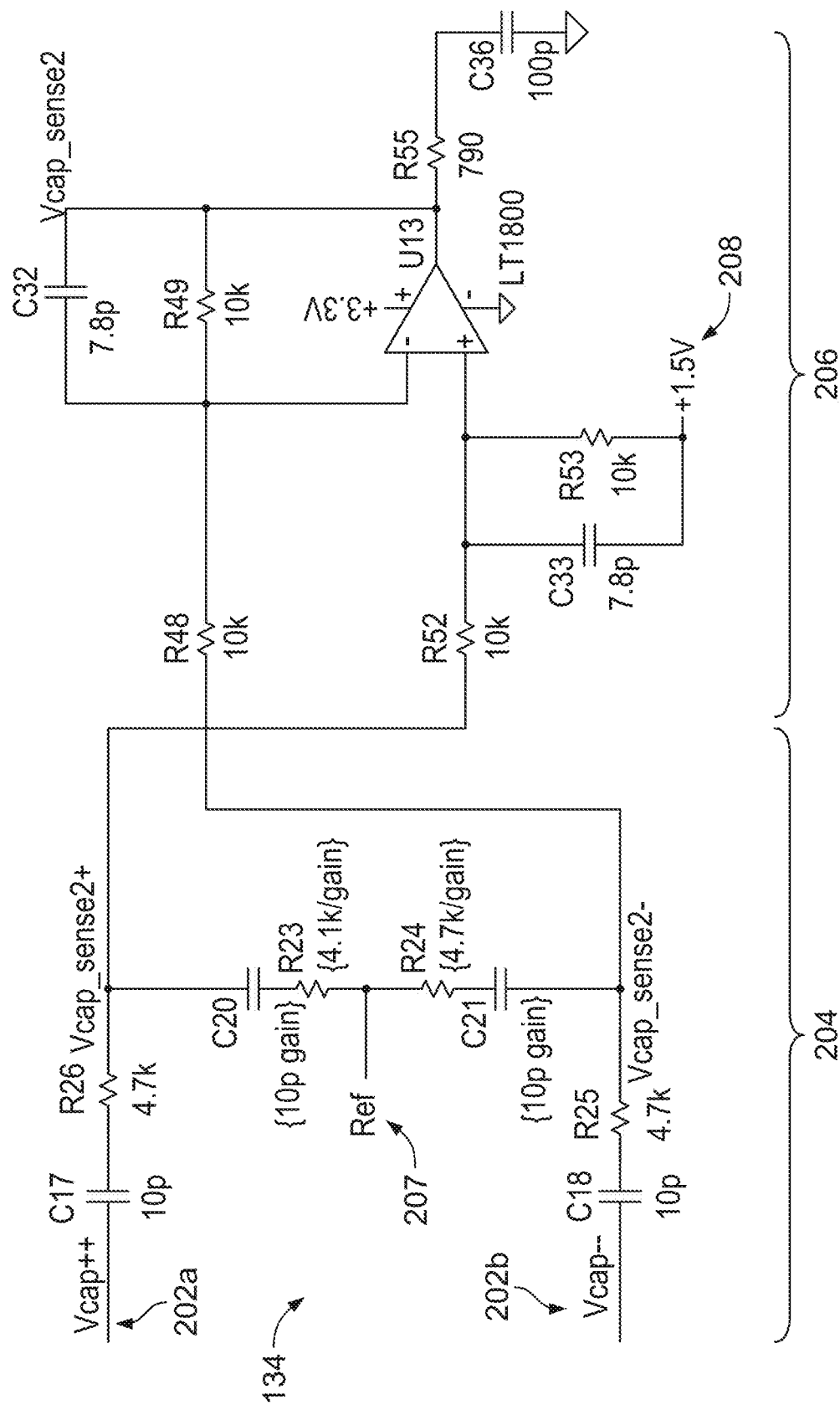
FIG. 2A is a schematic of an exemplary voltage sensor for the tunable matching networks (TMNs).

FIG. 2A is a schematic of an exemplary voltage sensor 134 for the tunable matching networks (TMNs) 106 and 122. An instance of the voltage sensor 134 can be coupled to each of the tunable capacitors 108a, 108b of the TMN 106 or to each of the tunable capacitors 120a, 120b of the TMN 122. For example, in TMN 106, lead 202a of a first instance of voltage sensor 134 is configured to be coupled to voltage node Vcap+ of tunable capacitor 108a and lead 202b of the first instance of voltage sensor 134 is configured to be coupled to voltage node Vcap- of tunable capacitor 108a. Similarly, lead 202a of a second instance of voltage sensor 134 is configured to be coupled to voltage node Vcap++ of tunable capacitor 108b and lead 202b of the second instance of voltage sensor 134 is configured to be coupled to voltage node Vcap-- of tunable capacitor 108b. Thus, in an exemplary tunable matching network having two tunable capacitors, there are two voltage sensors, each coupled to a tunable capacitor.

The exemplary voltage sensor 134 is a two-stage sensor having a first or passive stage 204 and a second or amplification stage 206. The exemplary passive stage 204 includes a capacitive coupler (made up of capacitors C17 and C18) that couples the voltage at leads 202a, 202b to the rest of the sensor circuit. In some implementations, the passive stage 204 may include a capacitive coupler, resistive divider, magnetic coupler, optical coupler, or any combination of these. Coupled to the capacitive coupler is a capacitive divider made up of capacitors C20 and C21. The capacitor divider divides the voltage coupled into the sensor for passing to the amplification stage 206. The capacitor divider includes a bias voltage 207. The bias voltage can be set in a range between 0 and 2 volts, or, in some implementations between 1 and 1.5 volts. The amplification stage 206 is a unity gain amplifier U13 that converts the differential voltage from the passive stage 204 to a single-ended voltage output Vcap_sense2. Note the bias voltage 208 on the positive input to the amplifier U13. The bias voltage 208 may be, for this sensor configuration, between 0 V and 3 V. In other implementations, the bias voltage 208 is tailored for the specific sensor configuration and can have a different value. In some implementations, the amplifier may be implemented using a single positive or dual voltage power supply. Although a capacitive divider is shown in the figure as part of the voltage sensor, a resistive divider may be used as the voltage sensor. In some implementations, the unity gain amplifier serves as a filter. For example, the amplification stage 206 can be configured as a low pass filter (e.g., with a bandwidth of approximately 0-2 MHz).

Figure 2B:
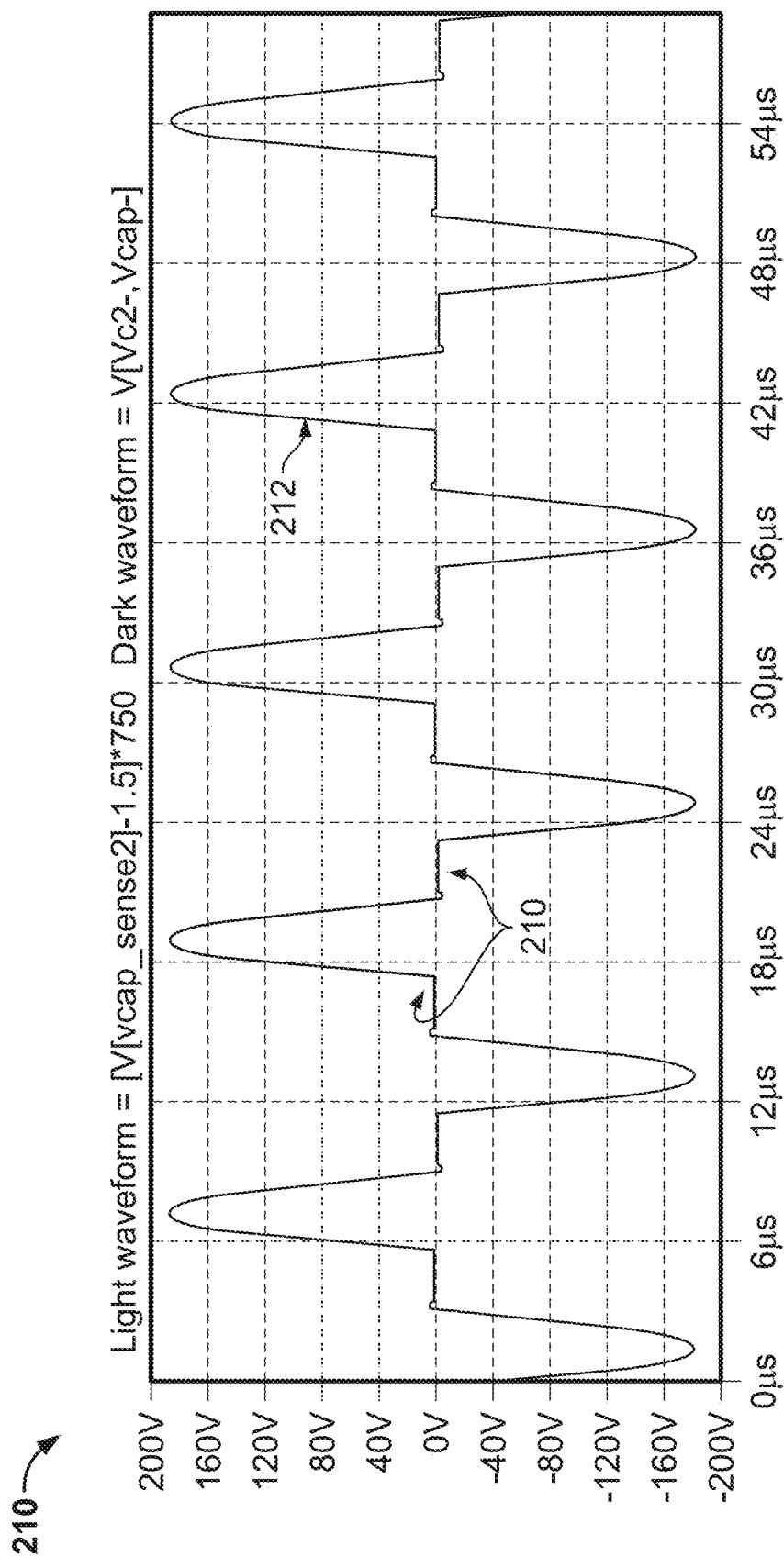
FIG. 2B is a plot showing an exemplary waveform output of the voltage sensor as compared to a waveform output of a direct voltage measurement at the tunable capacitor.

FIG. 2B is a plot showing an exemplary waveform 210 of the output of voltage sensor 134 as compared to a waveform 212 of a direct voltage measurement at the tunable capacitor 108a or 108b. The two waveforms, 210 and 212, overlay one another. Due to the high degree of accuracy, the difference between the sensor waveform 210 (light waveform) is nearly imperceptible from the waveform 212 (dark waveform) of the direct measurement. In some implementations, the accuracy of the voltage sensor can be within +/−10%, +/−5%, or less of the direct voltage measurement. To produce waveform 210, the bias voltage is subtracted from the single-ended voltage output Vcap_sense2 and the difference is scaled by the sensor gain. Thus, the waveform 210 is defined by the following relationship: waveform 210= (Vcap_sense2−bias voltage 208)*sensor gain. In the plot shown in FIG. 2B, the bias voltage 208 is 1.5 V which can be modified for the needs of a specific wireless power transmitter or receiver. In the plot an artificial sensor gain of 750 is applied to show correspondence of the sensor waveform 210 and the measured voltage waveform 212.

In some implementations, the output Vcap_sense2 of the voltage sensor is passed to one or more protection mechanisms. For example, the output Vcap_sense2 can be passed to a window comparator to determine the existence of an overvoltage condition in TMN 106 or 122. For example, if a desirable voltage level for this particular system is 500-550 V, then an error signal may be produced if the output of the sensor reads over 550 V. This error signal can be used to prevent any potential damage due to an overvoltage condition in TMN 106 or 122. In another implementation, the output Vcap_sense2 is passed to a controller 109 coupled to TMN 106 or 122. The controller 109 can digitize the output Vcap_sense2 for use in controlling the tunable capacitor(s) within TMN 106 or 122. In yet another implementation, the output Vcap_sense2 of the voltage sensor is passed to both protection mechanism(s) and to controller(s).

FIG. 3A is a schematic of an exemplary first stage 300 of a differential voltage sensor 136 across one or more capacitors in position C2 of the wireless power transmitter (capacitor Cs2) or receiver (capacitor Cd2). The operational amplifier U5 in the first stage 300 of the differential voltage sensor 136 acts as a differentiator. The output of the first stage 300 is a single-ended voltage Vy that is passed to the second stage 302 in FIG. 3B. The second stage 302 includes an amplifier U10 that is a unity gain amplifier with inputs Vy and 304. For a voltage sensor implemented in a transmitter, input 304 is equal to the bias voltage if the impedance matching network 103 of transmitter 100 does not include the fixed capacitors Cs3a, Cs3b. If, however, network 103 includes the fixed capacitors Cs3a, Cs3b, then V1 is used for input 304. V1 is the TMN input current information. The output of the second stage 302 is the differential voltage at position C2, VC2_cliff. The implementation in the receiver mirrors that of the transmitter.

FIG. 3C is a schematic of voltage sensor 138 which includes an amplifier U7 in an integrator configuration. The differential voltage Vc2_diff is passed to the negative input of the amplifier U7 with a bias voltage at the positive input. The output of the third stage 306 is voltage signal VC2_sense.

FIG. 3D is a plot of an exemplary waveform output 310 of voltage sensor 138 and exemplary waveform output 312 of a direct measurement of $V_{C2}$ voltage (VC2+, VC2−) (provided in FIGS. 1A-1B). The waveform output 310 is attained by the following relationship: output 310= −((VC2_sense2)−bias voltage)*sensor gain, where the bias voltage equals 1.5 V and sensor gain is 1000. Note that phase of VC2_sense is negative (see a plot of the original VC2_sense waveform in FIG. 3F). FIG. 3E is a plot of exemplary waveforms of voltages VC2_diff and Vy. Note that these waveforms were produced with fixed capacitors Cs3a=Cs3b=300 nF.

Figure 4A:
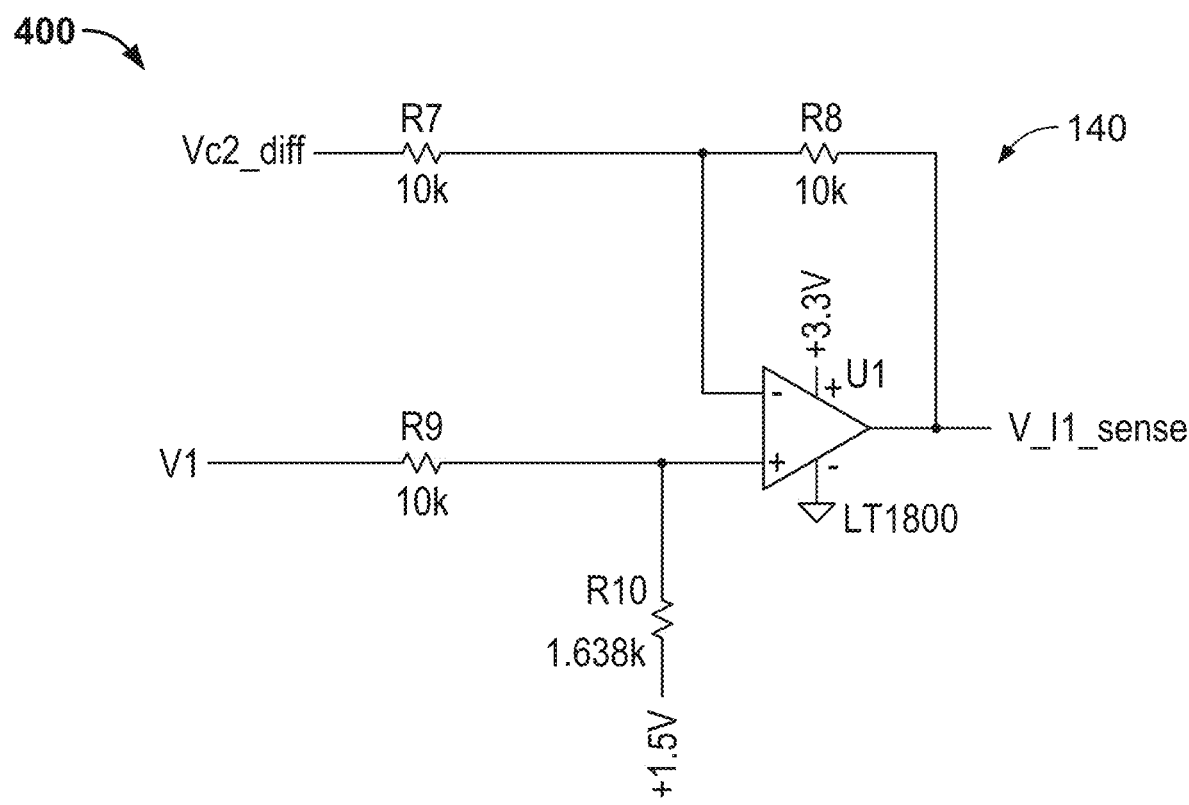
FIG. 4A is a schematic of an exemplary current sensor to compute current I1 at inductor Ls1.

FIG. 4A is a schematic of an exemplary current sensor 140 to compute current I1 in the transmitter 100. The differentiator circuit 400 uses measurements VC2_diff, which contains current information through capacitor Cs2 or C2d (see waveform in FIG. 4C), and V1, which is the current information through portion 111 of the impedance matching network 103 (see waveform in FIG. 4D) to output the differential signal, V_I1_sense, which has coil current information. The differential current signal is attained by subtracting the current through capacitor Cs2 from the current from the TMN 106.

FIG. 4B is a plot of an exemplary waveform output 402 of current sensor 140 and exemplary waveform output 404 of a direct measurement of the current I1 in the transmitter 100. The waveform output 402 is attained by the following relationship: output 402=((V_I1_sense)−bias voltage)*sensor gain, where the bias voltage equals 1.5 V and sensor gain is 142.5. Note that it is difficult to perceive the difference between the waveforms of current sensor 140 output and the direct measurement I(Ls1) due to the high accuracy of current sensor 140. FIG. 4C is a plot of an exemplary waveform of voltage Vc2_diff and FIG. 4D is a plot of an exemplary waveform of voltage V1.

Figure 5A:
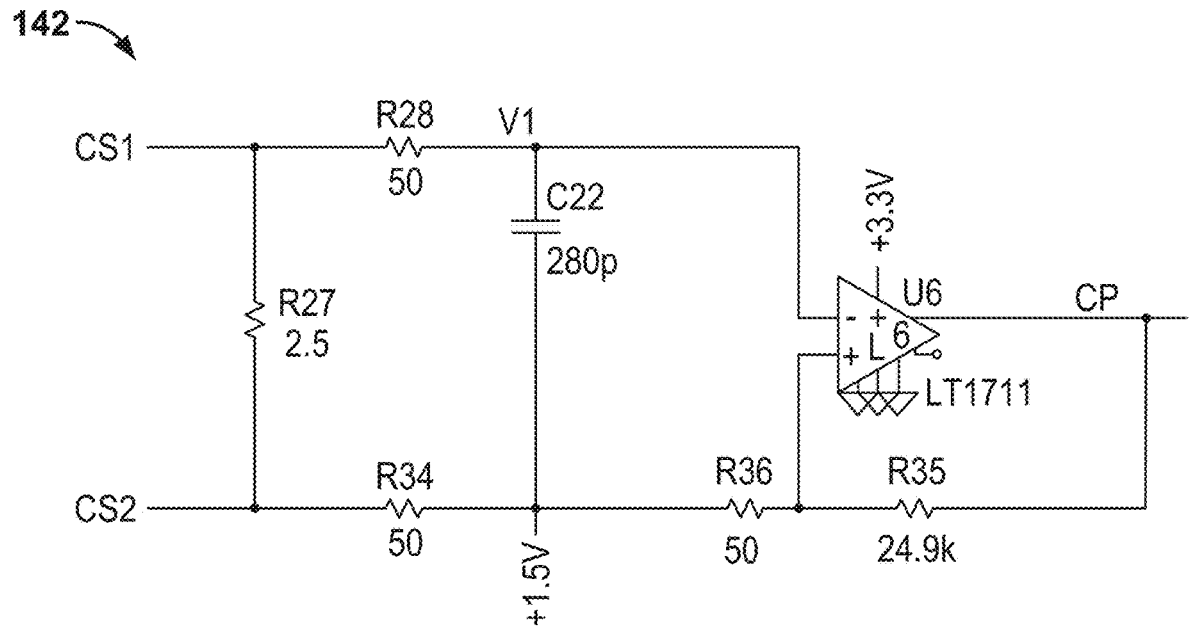
FIG. 5A is a schematic of an exemplary current phase detect circuit having inputs CS1 and CS2 from a current sense transformer (CST).

FIG. 5A is a schematic of an exemplary current phase detector 142 having inputs CS1 and CS2 from CST 110 or 118. In some implementations, the sensor 142 is configured to detect the phase of the current signal (I3 current) from tunable capacitor 108a or tunable capacitor 120a. In some implementations, sensor 142 is configured to detect rising or falling current phase (CP) or both. FIG. 5E is a plot of an exemplary waveform output 502 (in dashed line) of sensor 142. The waveform 502 is a square wave representing output CP of sensor 142. In an implementation, an analog-to-digital converter of the controller samples on the positive transition (of a rising edge) and/or negative transition (of a falling edge) of waveform 502. The current phase sensor can include filters to filter out harmonics. The filters can be after the current sense transformer. For example, the filter can include a low pass filter, a high pass filter, a bandpass filter, and/or a band-stop filter.

Figure 5B:
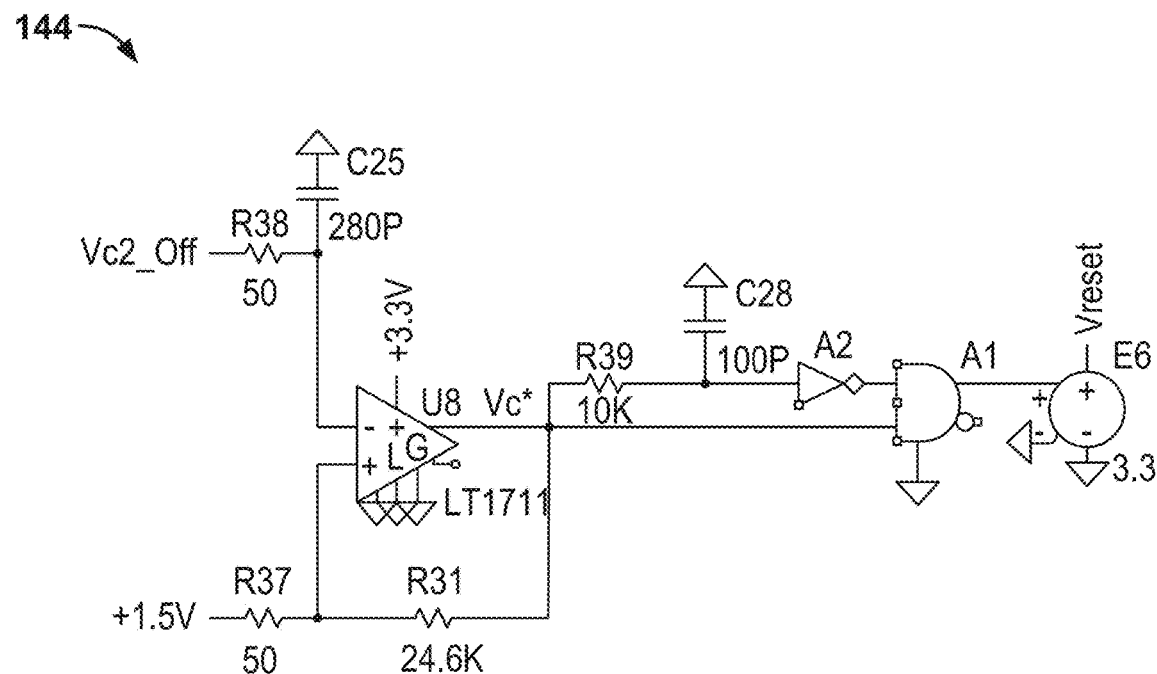
FIG. 5B is a schematic of an exemplary circuit configured to generate a reset signal for the peak detect circuits.

FIG. 5B is a schematic of an exemplary reset generator 144 configured to generate a reset signal for the peak detect circuits 506, 508. The inputs of reset generator 144 are differential voltage signal VC2_diff and bias voltage (1.5 V in this example). The circuit 144 outputs a voltage reset signal Vreset. FIG. 5H is a plot of an exemplary waveform output 510 of the reset voltage signal Vreset. The reset signal Vreset 510 is generated once a cycle of differential voltage signal VC2_diff and placed on the rising edge of the voltage signal VC2_sense.

Figure 5C:
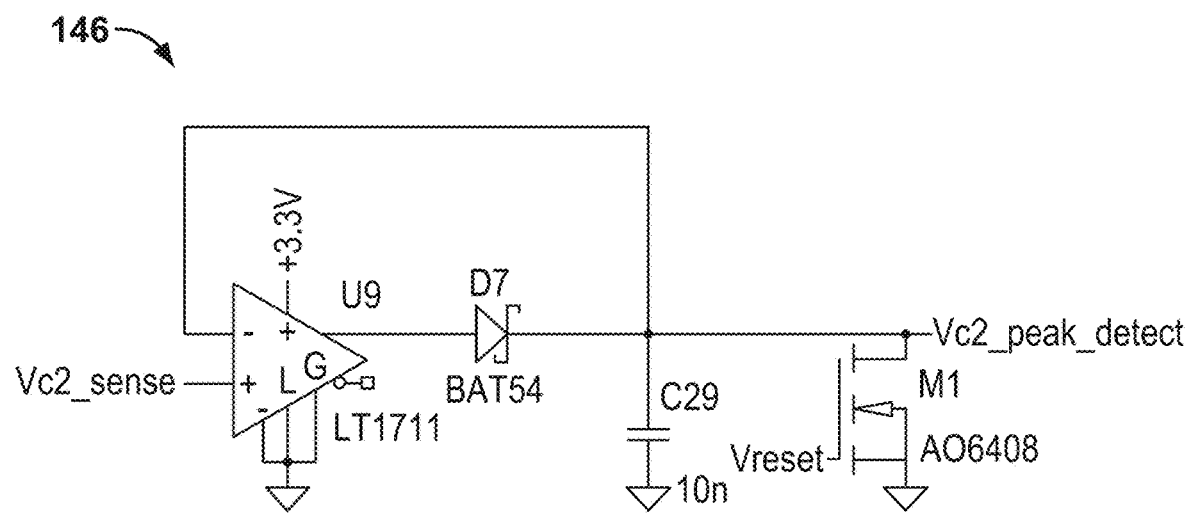
FIG. 5C is an exemplary peak detector circuit configured to detect the peak(s) of voltage signal VC2_sense.

FIG. 5C is an exemplary peak detector 146 configured to detect the peak(s) of voltage signal VC2_sense. Thus, circuit 146 uses voltage signals VC2_sense and Vreset to output peak detection signal VC2_peak detect. FIG. 5F is a plot of an exemplary waveform of input voltage signal VC2_sense 512 and an exemplary waveform of output VC2_peak detect 514. Note that the peak detect signal 514 sustains the peak of voltage signal VC2_sense 512 until the reset signal Vreset 510 triggers.

Figure 5D:
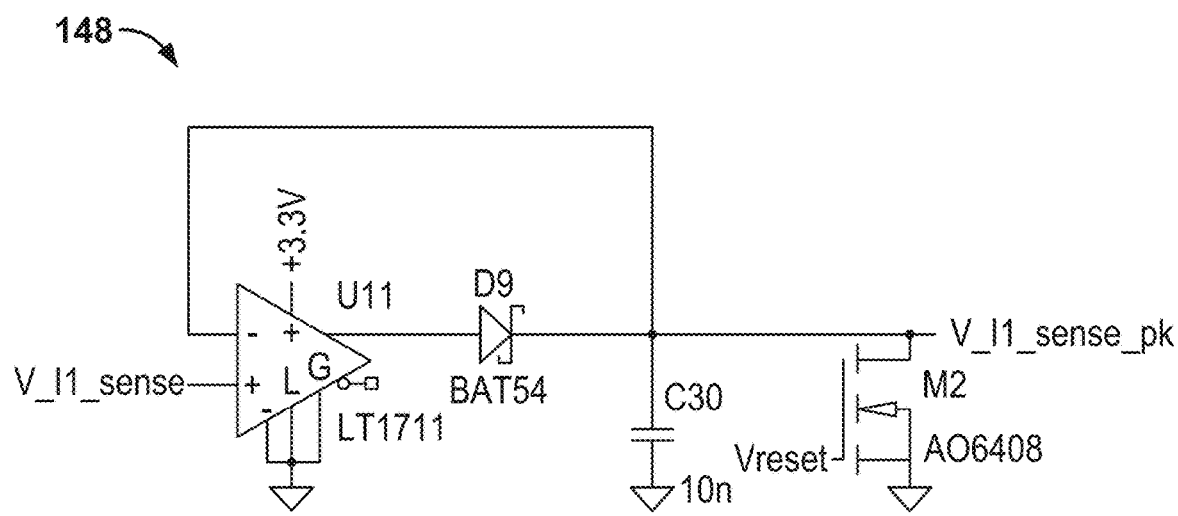
FIG. 5D is an exemplary peak detect circuit configured to detect the peak(s) of the signal representing coil current V_I1_sense.
Figure 5E:
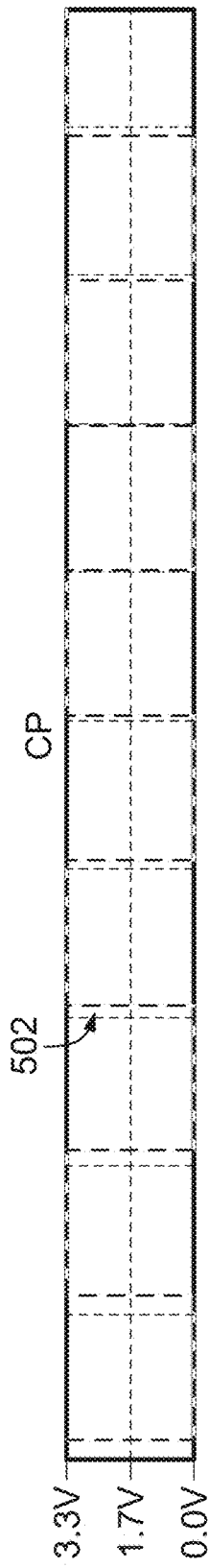
FIG. 5E is a plot of an exemplary waveform output of the circuit in FIG. 5A.
Figure 5F:
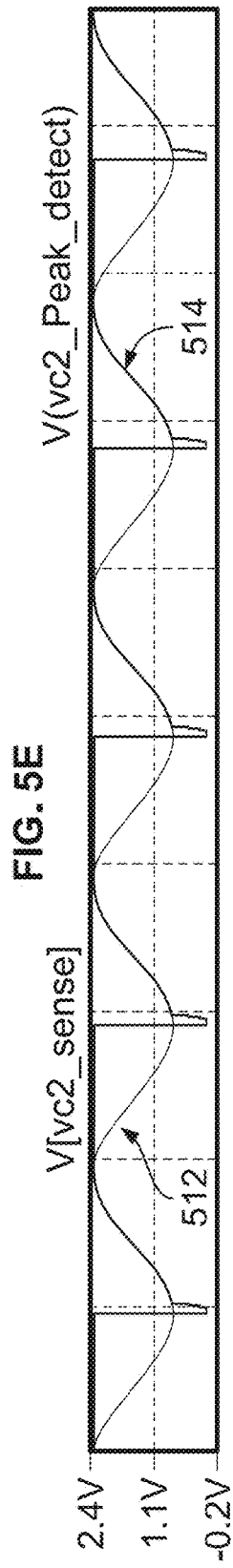
FIG. 5F is a plot of an exemplary waveform of input voltage signal VC2_sense and an exemplary waveform of output VC2_peak detect.
Figure 5G:
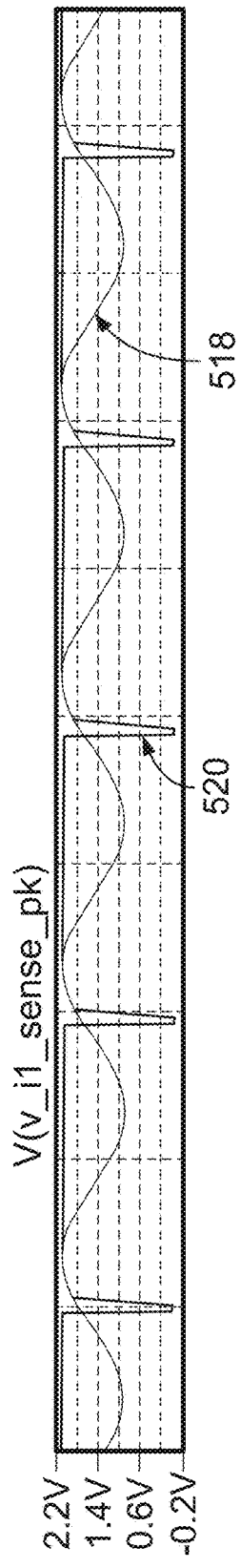
FIG. 5G is a plot of an exemplary waveform of input signal V_I1_sense and an exemplary waveform of output V_I1_sense_pk.
Figure 5H:
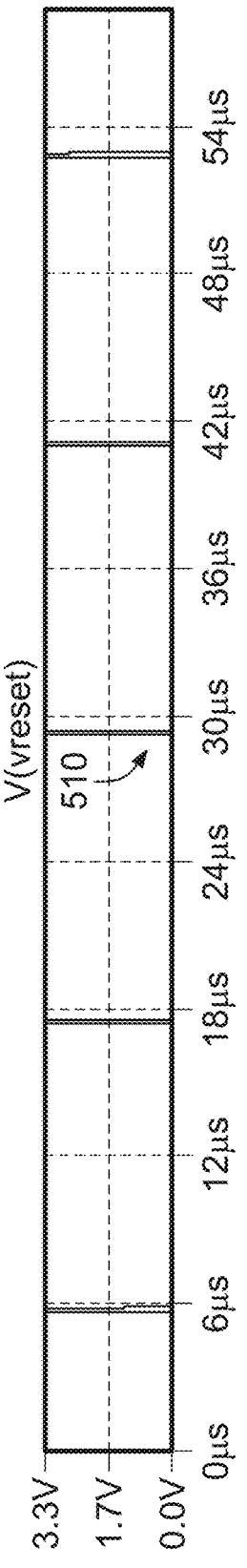
FIG. 5H is a plot of an exemplary waveform output of the reset voltage signal Vreset.

FIG. 5D is an exemplary peak detector 148 configured to detect the peak(s) of the signal representing coil current V_I1_sense. Thus, circuit 148 uses voltage signals V_I1_sense and Vreset to output peak detection signal V_I1_sense_pk. FIG. 5G is a plot of an exemplary waveform of input signal V_I1_sense 518 and an exemplary waveform of output V_I1_sense_pk 520. Note that the peak detect signal 520 sustains the peak of voltage signal V_I1_sense 518 until the reset signal Vreset 510 triggers.

Figure 6A:
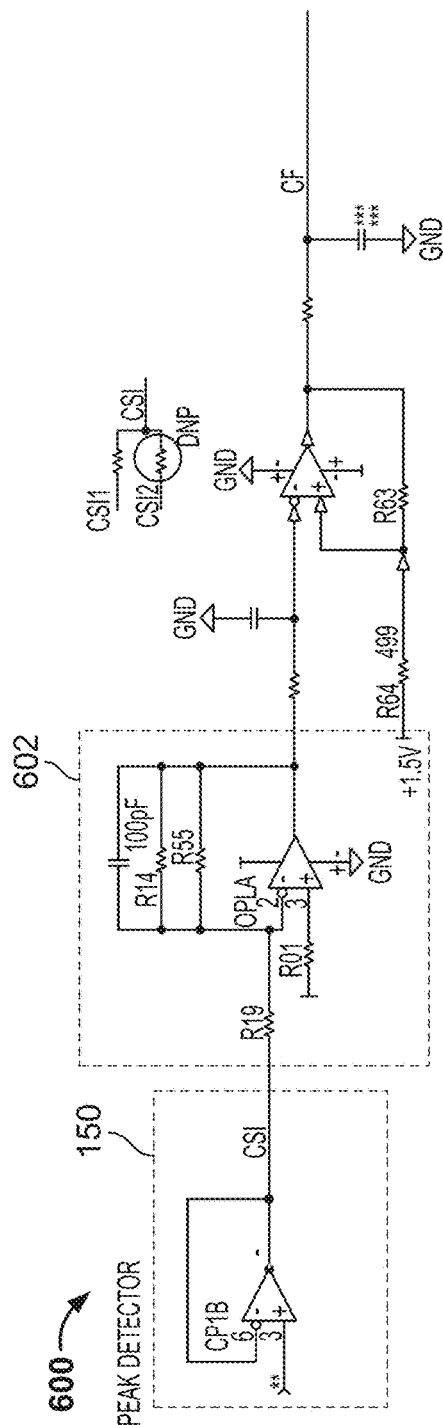
FIG. 6A is an exemplary peak detector circuit configured to sample the current in the TMN of the transmitter or receiver.
Figure 6B:
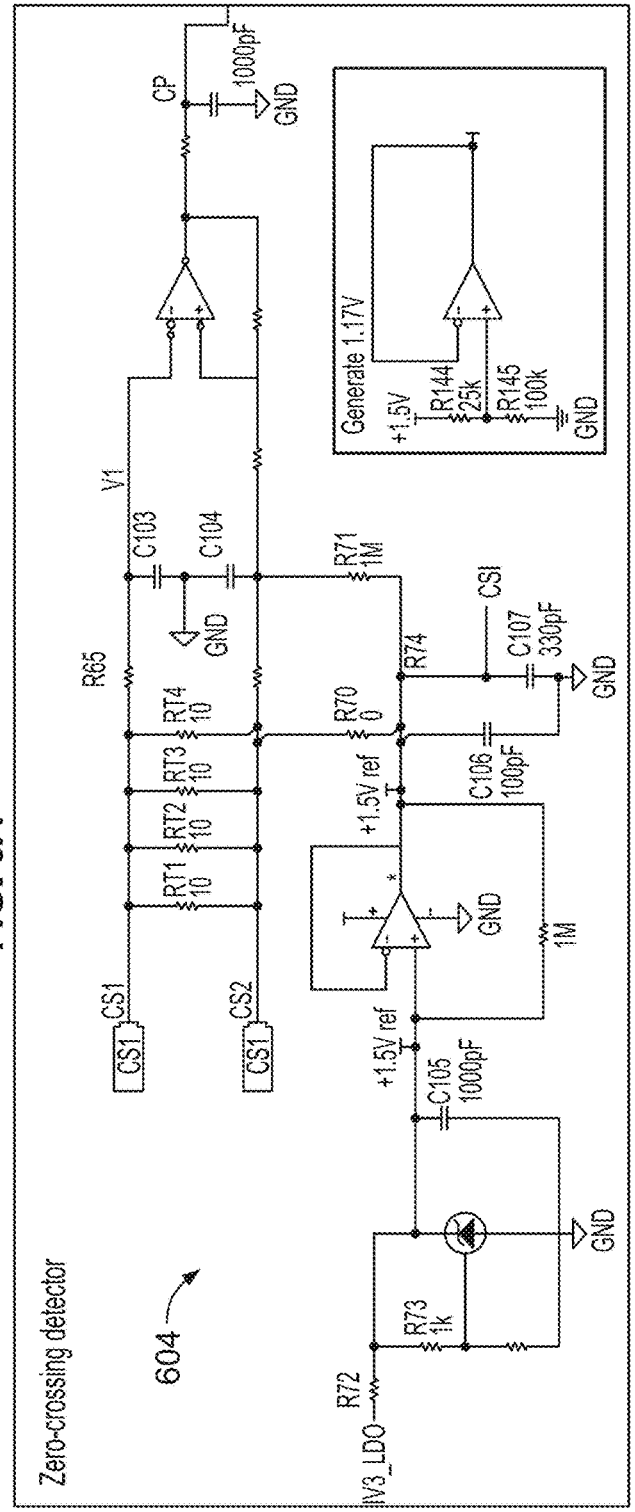
FIG. 6B is an exemplary zero-crossing detector circuit.

FIG. 6A is a schematic of an exemplary current sensor 150 and peak detector 151. Peak detector 151 is configured to sample the current in TMN 106 or 122. Note that, in an exemplary implementation, an integrator 602 is included in the peak detector 151. This configuration has an advantage over, for example, a differentiator, in that integrator 602 can attenuate noise at frequencies above the operating frequency of the wireless power system. An exemplary operating frequency is 85 kHz. To obtain information about the current in the TMN, the output CSI2 of the integrator 602 is sampled by the current phase signal 502. This implementation avoids being affected by switching noise associated with the inverter 102. FIG. 6B is an exemplary zero-crossing detector (ZCD) circuit 604. Zero crossing detector circuit outputs the digital CP signal, which is high when the current in the TMN is negative and low when the current is positive.

FIGS. 7A-7E show schematics of exemplary comparator circuits 152-160. Comparator circuits 152-160 are window comparator circuits configured to detect overvoltage or undervoltage conditions for signals within the system. In some implementations, the window comparator circuit can be coupled to the various measurement circuits described herein. For example, comparator circuits 156 or 158 can be coupled to the output of the voltage sensor 134 to detect an overvoltage condition of any of tunable capacitors 108*a*, 108*b*, 120*a*, or 120*b*. In some implementations, the window comparator circuits each produce a count for each time the input value is outside a preset window defined by an upper limit and a lower limit. For example, the window comparator circuit 700 produces a count signal nVtmnB_HIGH when the TMN voltage signal VtmnB is greater than 550 V and count signal nVtmnB_LOW when the TMN voltage signal VtmnB is less than –550 V. Each TMN voltage signals VtmnA, VtmnB are measured by voltage sensor 134. In other words, VtmnA equals output signal Vcap_sense2 for a voltage sensor 134 on tunable capacitor 108*a* (transmitter) or 120*a* (receiver). VtmnB equals output signal Vcap_sense2 for a voltage sensor 134 on tunable capacitor 108*b* (transmitter) or 120*b* (receiver).

Figure 7B:
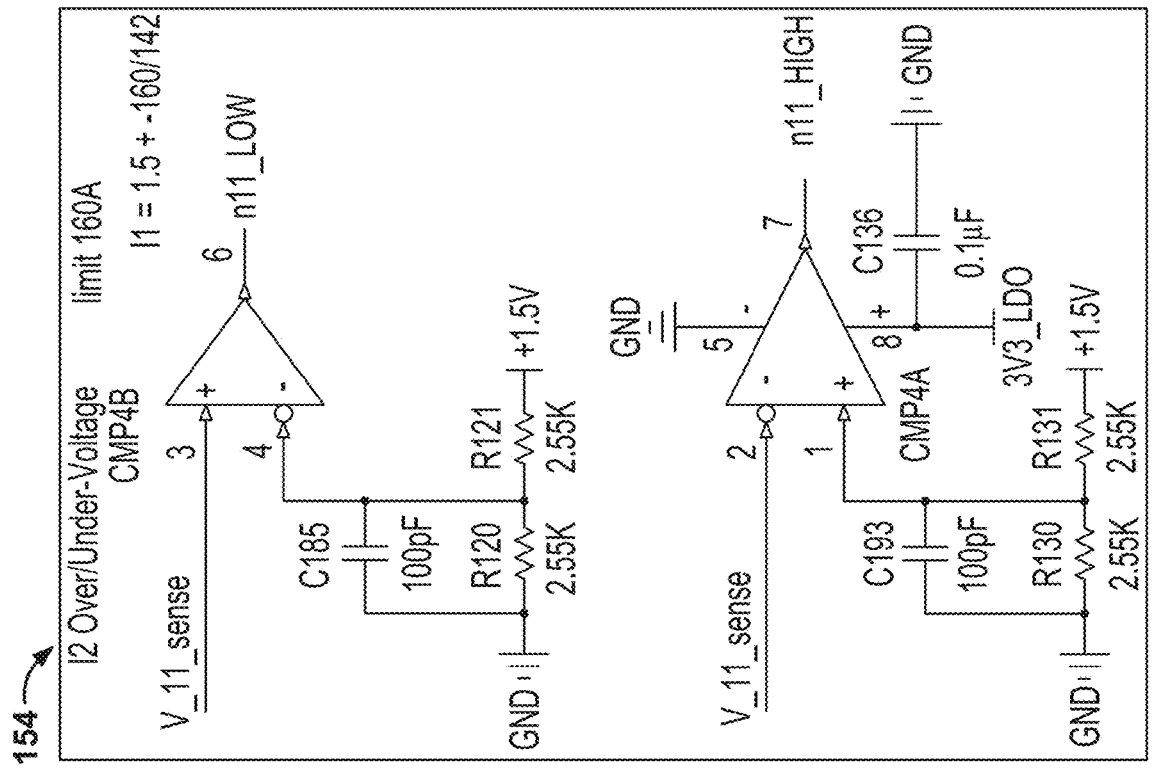
FIGS. 7A-7E are schematics of exemplary window comparator circuits configured to detect overvoltage or undervoltage conditions for signals within the system.

Note that an overcurrent or undercurrent condition can be derived from the detected overvoltage or undervoltage conditions. For example, FIG. 7B is a window comparator circuit 154 with input voltage input V_I1_sense that is converted into a current reading. The below table lists the exemplary window comparator circuits shown in FIGS. 7A-7E and their respective inputs and outputs.

TABLE 1

Input and output signals for window comparators.

Figure 7A:
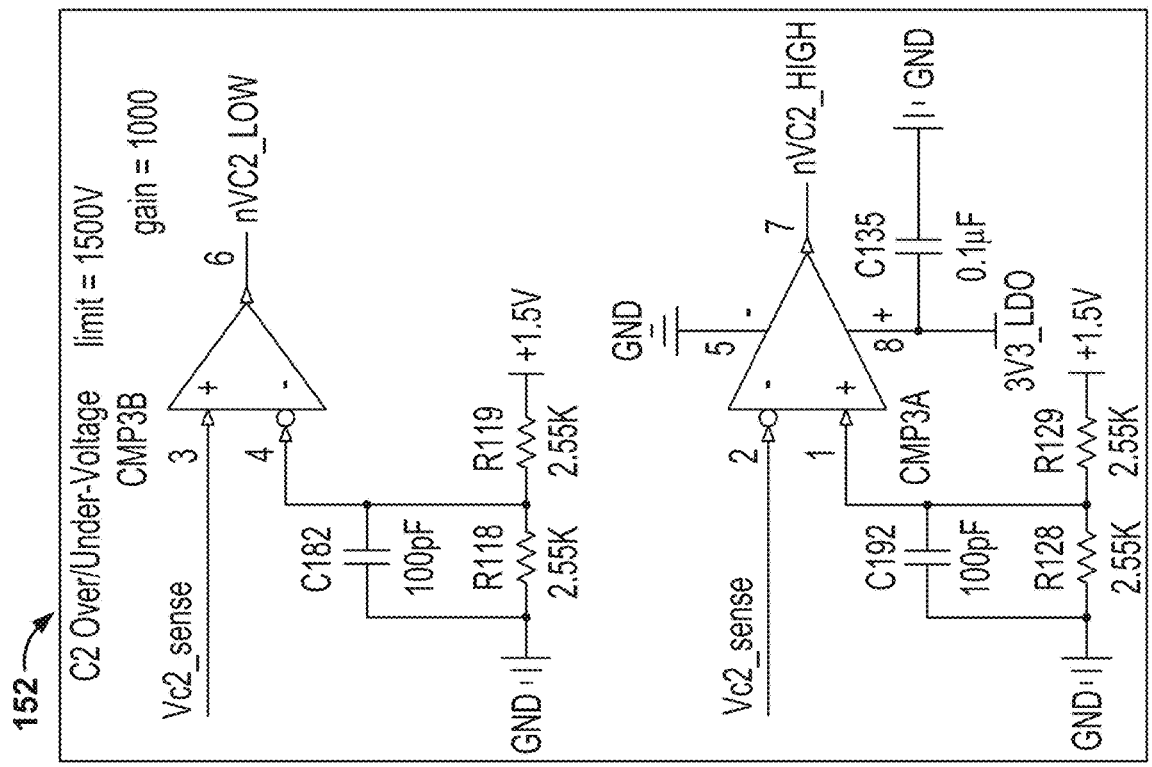
Figures 7C, 7D:
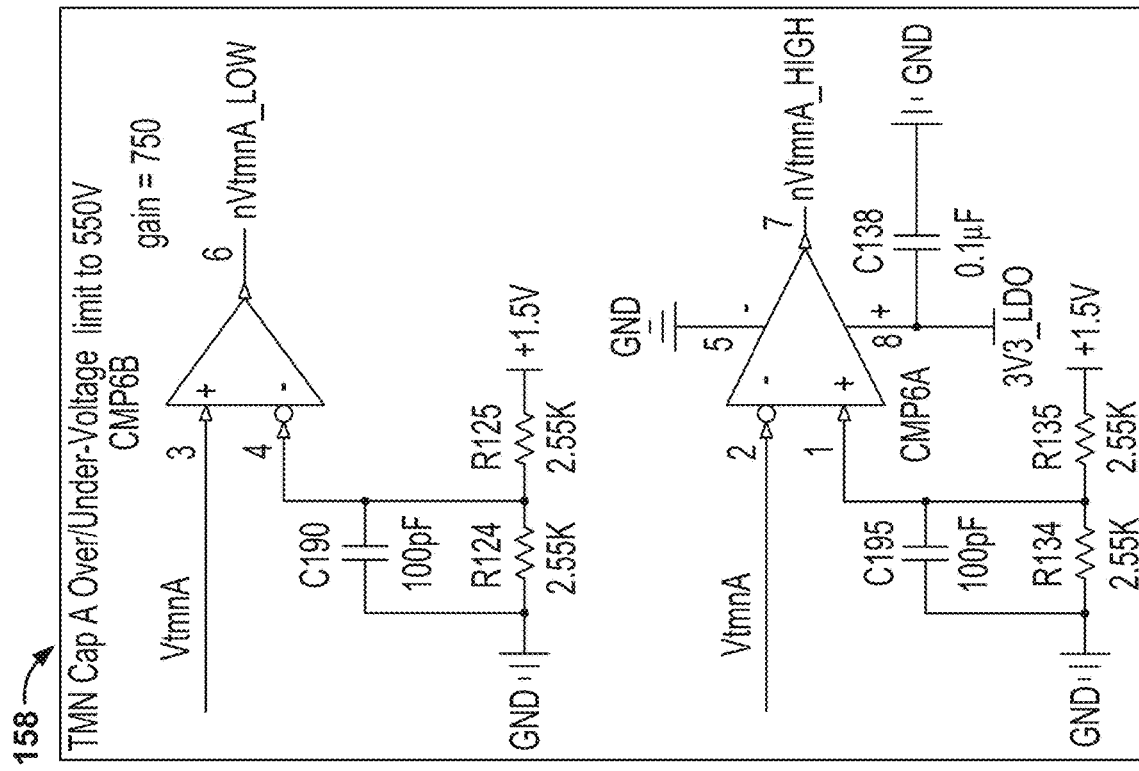
Figure 7E:
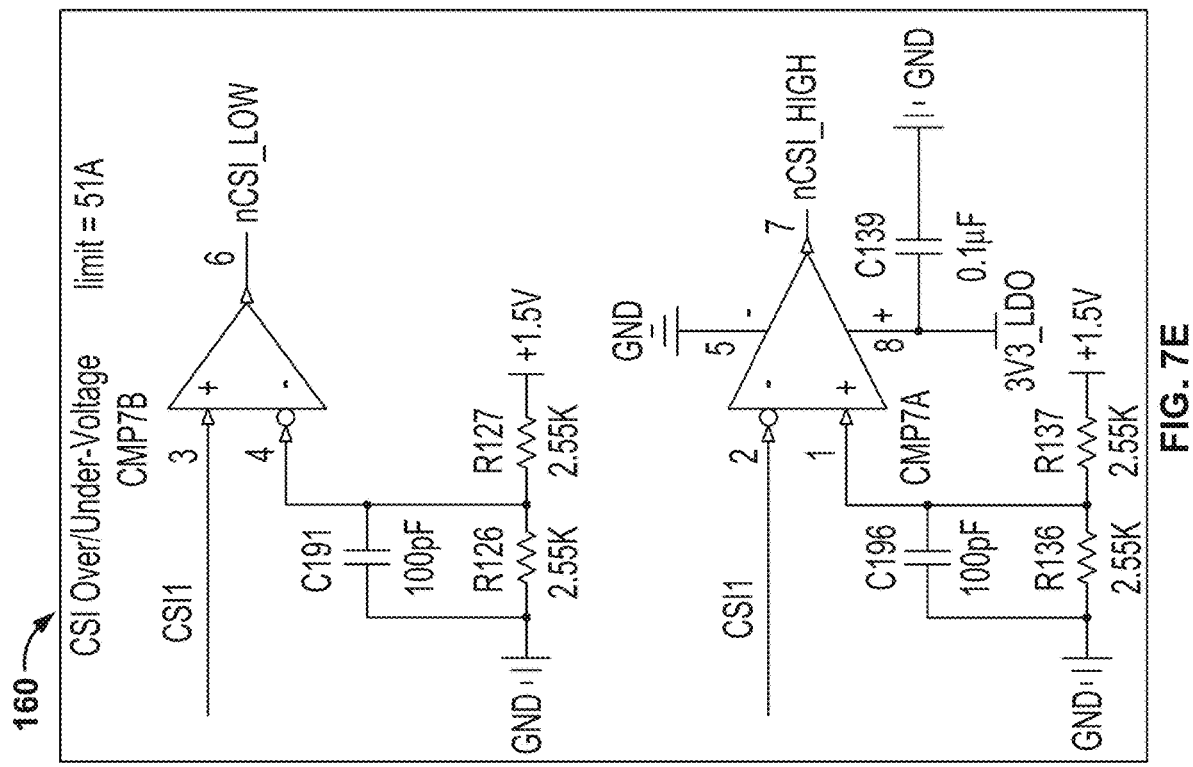

| Figure Designation | Input Signals | Output Signals |
| --- | --- | --- |
| FIG. 7A | VC2_sense | nVC2_LOW, nVC2_HIGH |
| FIG. 7B | V_I1 sense | nI1_LOW, nI1_HIGH |
| FIG. 7C | VtmnB | nVtmnB_LOW, nVtmnB_HIGH |
| FIG. 7D | VtmnA | nVtmnA_LOW, nVtmn_HIGH |
| FIG. 7E | CSI1 | nCSI_LOW, nCSI_HIGH |

FIGS. 8A-8E are schematics of exemplary fault logic circuits 162-170 configured to latch when a fault is detected. The output signals from the window comparators 152-160 are fed into the logic circuits which are configured to latch or turn off a circuit in case of a value outside of predetermined thresholds. For example, the count signals nVtmnB_LOW, nVtmnB_HIGH from window comparator 156 are input into fault logic 166. The exemplary fault logic 166 includes a NAND gate 802 which provides an output to a flip-flop circuit 804, producing fault signal VtmnB_FAULT.

Below is a table of exemplary latch circuits and their respective inputs and outputs.

TABLE 2

Input and output signals for window comparators.

Figure 8A:
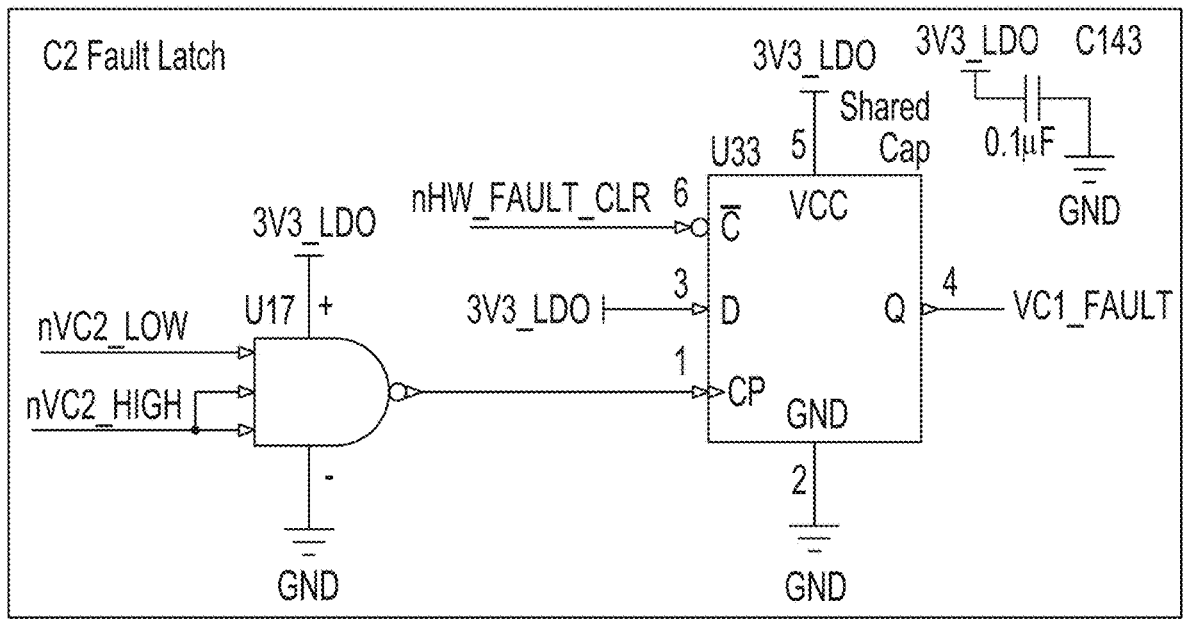
FIGS. 8A-8E are schematics of exemplary fault latch circuits configured to latch when a fault is detected.
Figure 8B:
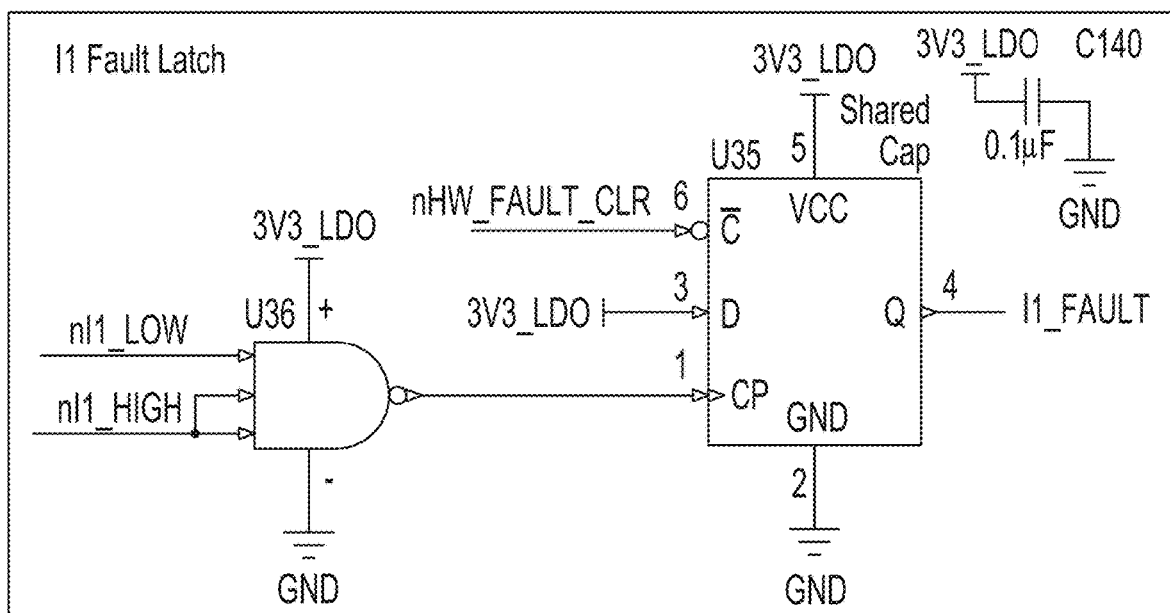
Figure 8C:
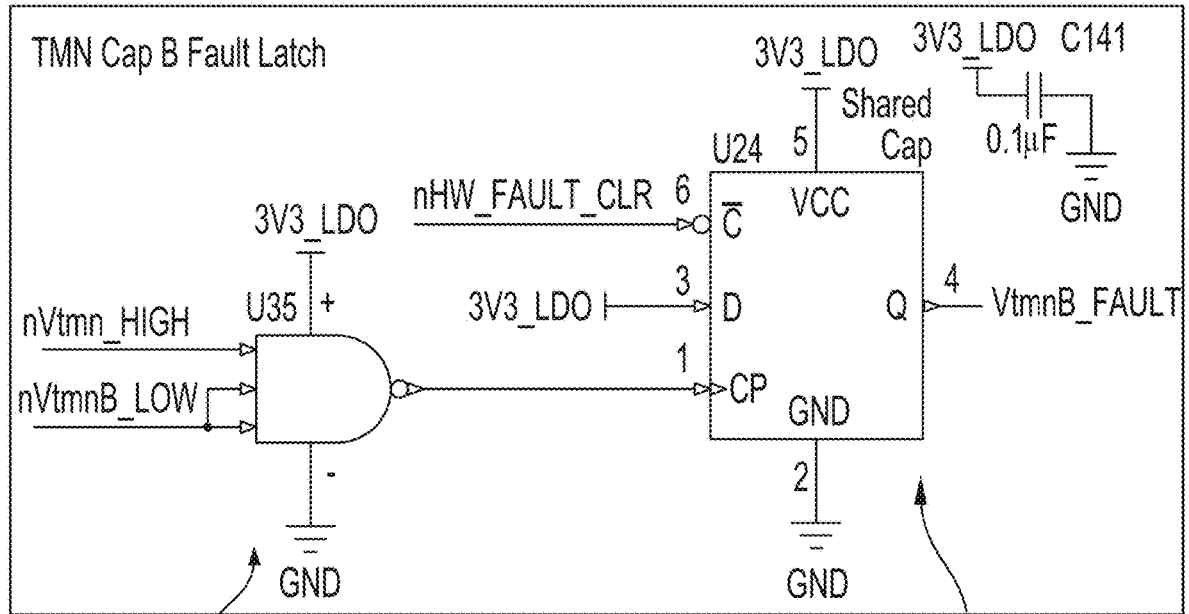
Figure 8D:
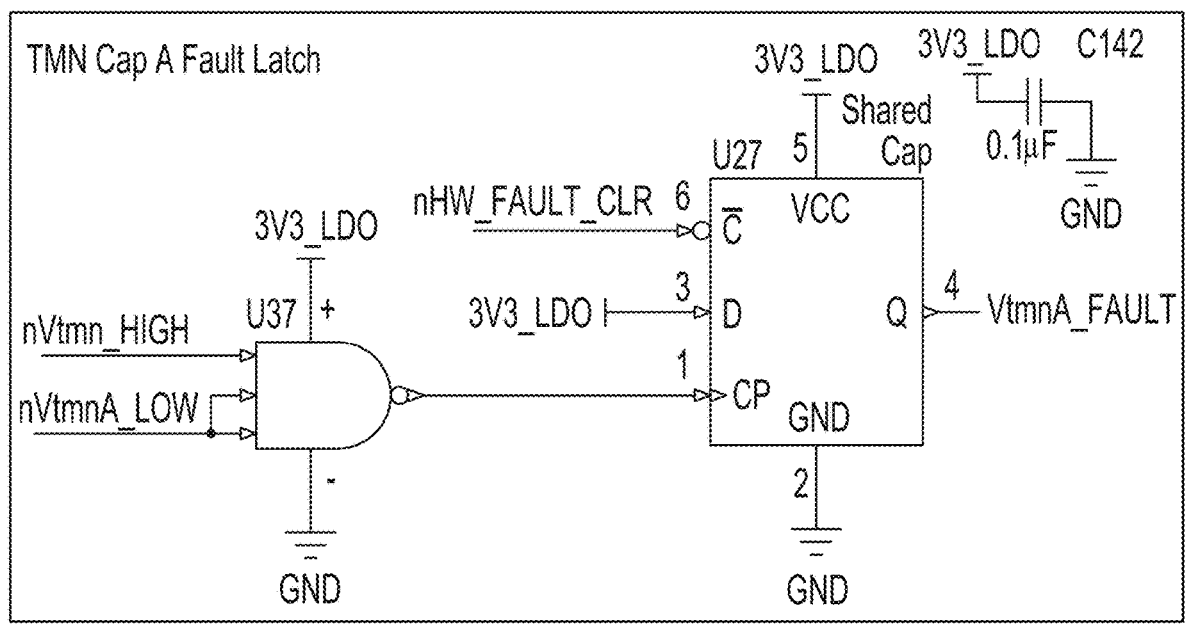
Figure 8E:
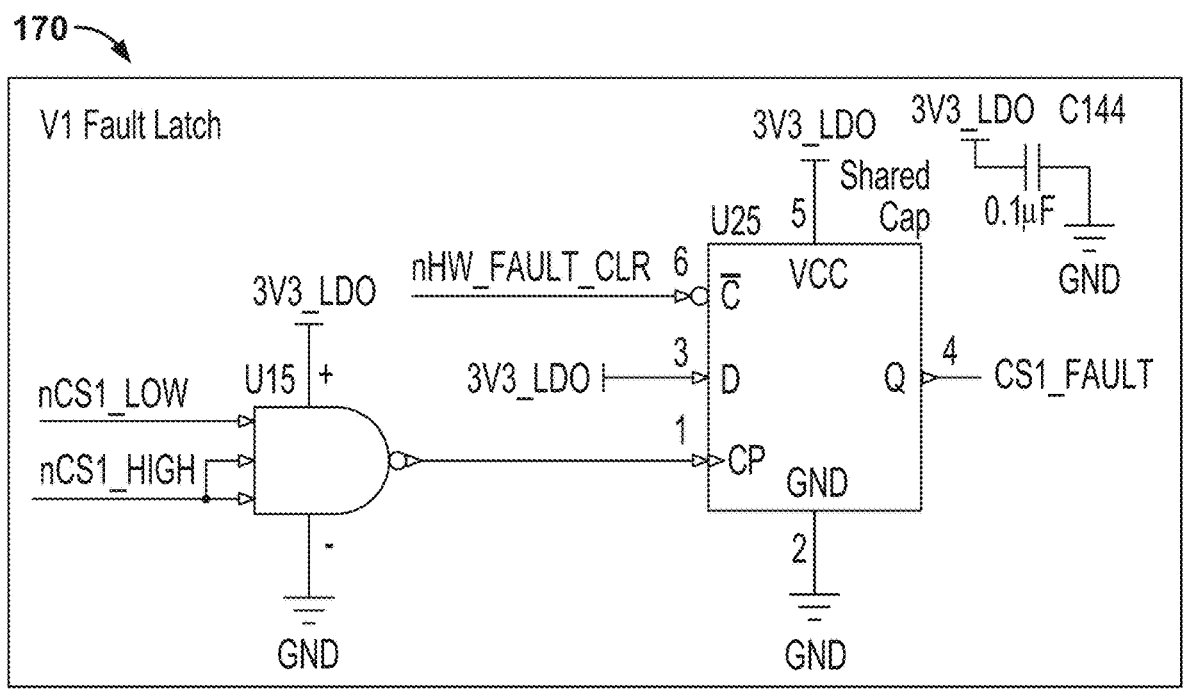

| Figure Designation | Input Signals | Output Signals |
| --- | --- | --- |
| FIG. 8A | nVC2_LOW, nVC2_HIGH | VC2_FAULT |
| FIG. 8B | nI1_LOW, nI1_HIGH | V_I1_FAULT |
| FIG. 8C | nVtmnB_LOW, nVtmnB_HIGH | VtmnB_FAULT |
| FIG. 8D | nVtmnA_LOW, nVtmn_HIGH | VtmnA_FAULT |
| FIG. 8E | nCSI_LOW, nCSI_HIGH | CSI1_FAULT |

Figure 8F:
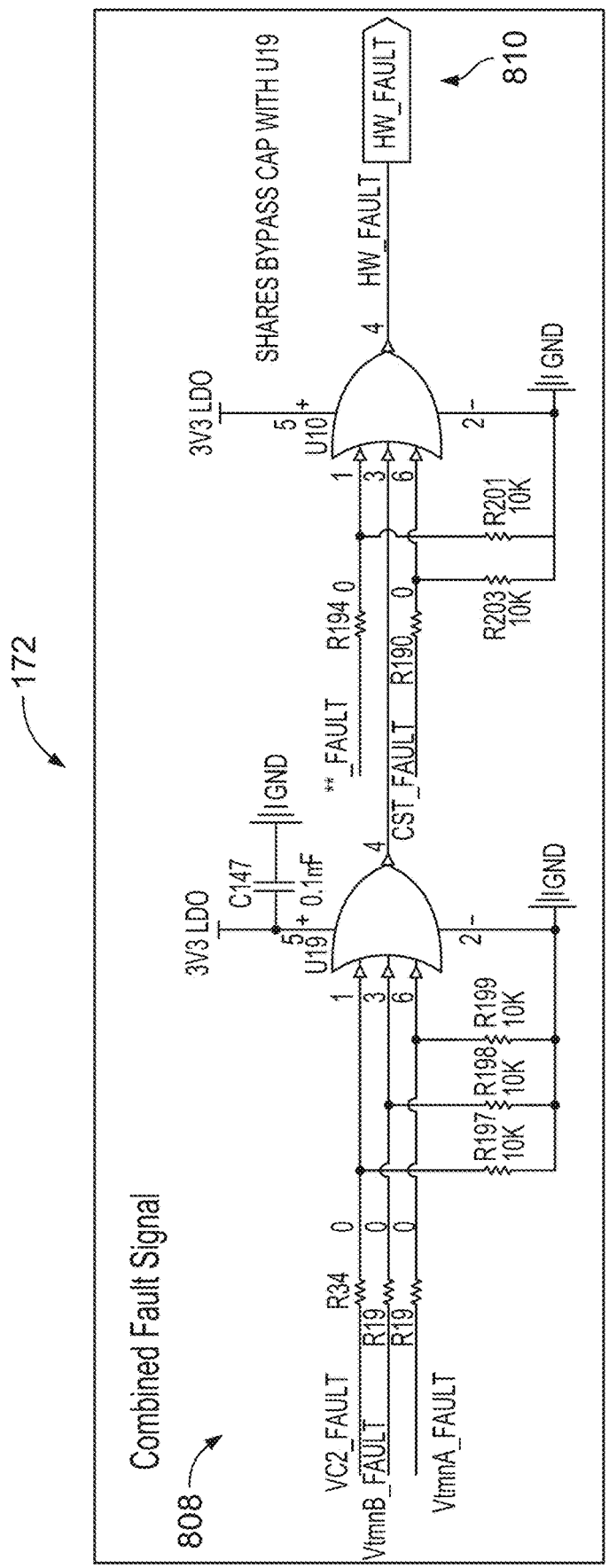
FIG. 8F is a schematic of an exemplary latch circuit that combines two or more of the faults from the latch circuits in FIGS. 8A-8E.

FIG. 8F is a schematic of an exemplary combined fault logic 172 and includes logic circuit 808 that combines fault output signals from two or more of the fault logic circuits in FIGS. 8A-8E. For example, as illustrated, the combined fault logic 172 combines fault output signals from two or more of the fault logic circuits in FIGS. 8A-8E using logic OR gates. In some implementations, the controller 109 and/or 130 is configured to read each of the fault signals independently. In other implementations, the controller 109 and/or 130 is configured to read the output of the logic circuit 808, which produces an overall hardware fault signal HW_FAULT. In some implementations, the controller can read any combination of the fault signals described herein.

Figure 9A:
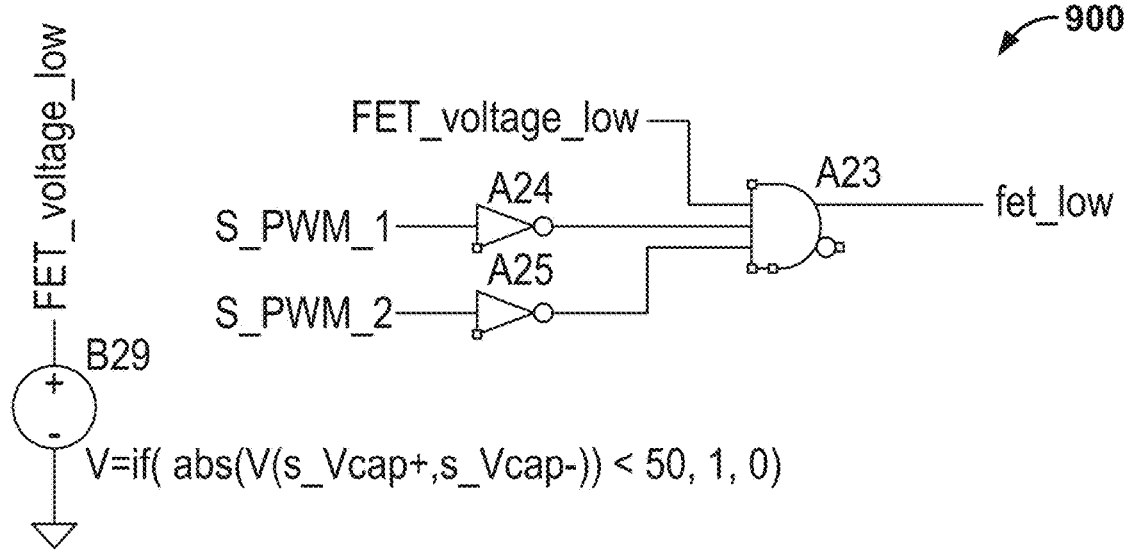
FIGS. 9A and 9B are schematics of an exemplary protection circuit for a TMN.
Figure 9B:
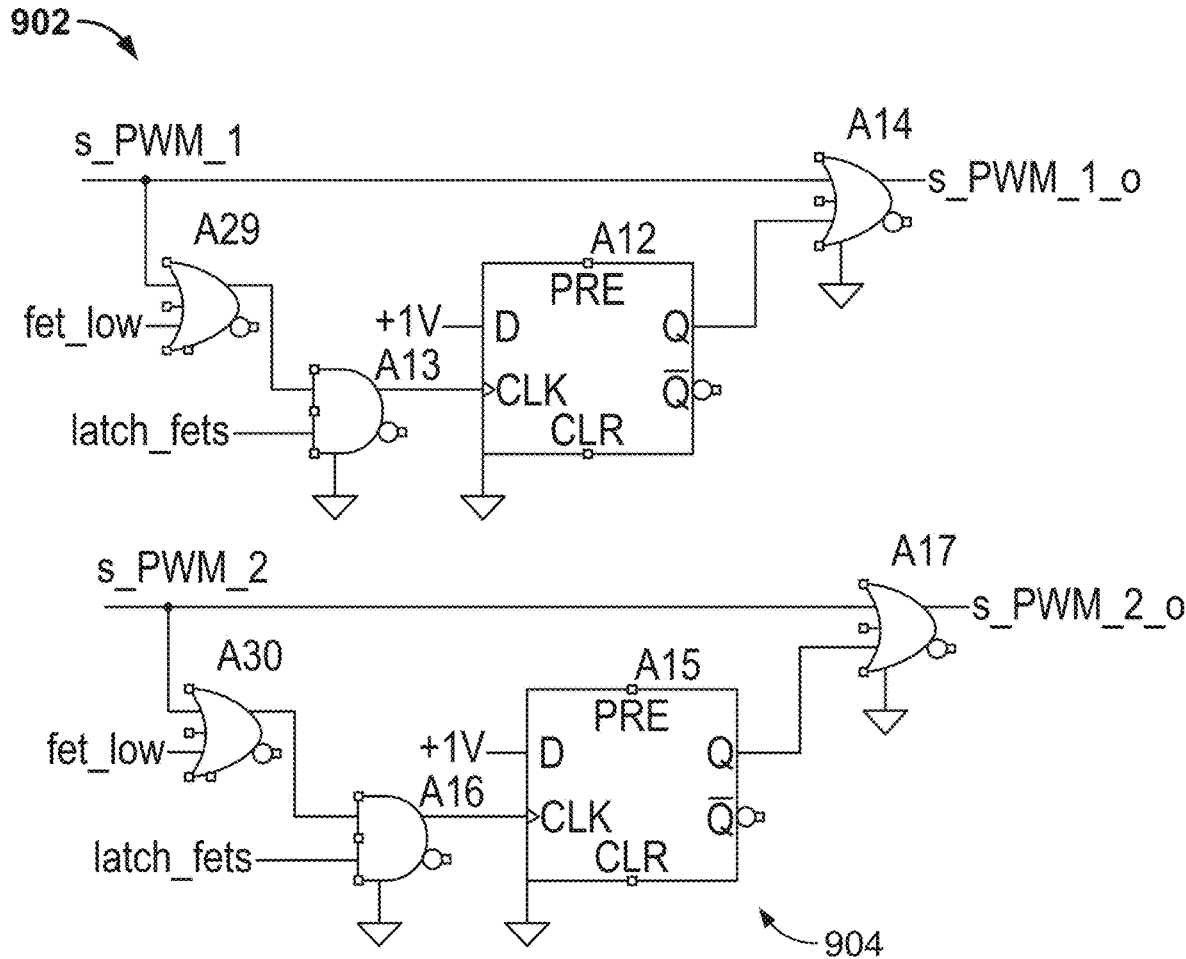

FIG. 9A is an exemplary detection circuit configured to detect if the TMN voltage is low voltage while TMN duty cycle is zero. The detection circuit takes in PWM signals, s_PWM_1 and s_PWM_2, which are generated by the controller 109 or 130 to control the switches (e.g., FETs) of the TMN 106 or 122, respectively, and outputs detection signal fet_low. These PWM signals and the detection signal fet_low is input to circuits 902 and 904 (as shown in FIG. 9B) to produce the control signals, s_PWM_1_o and s_PWM_2_o, which are configured to control the switches of the TMN. Fault signal latch_fets short the switches of the TMN to protect the switches from damage.

Figure 10A:
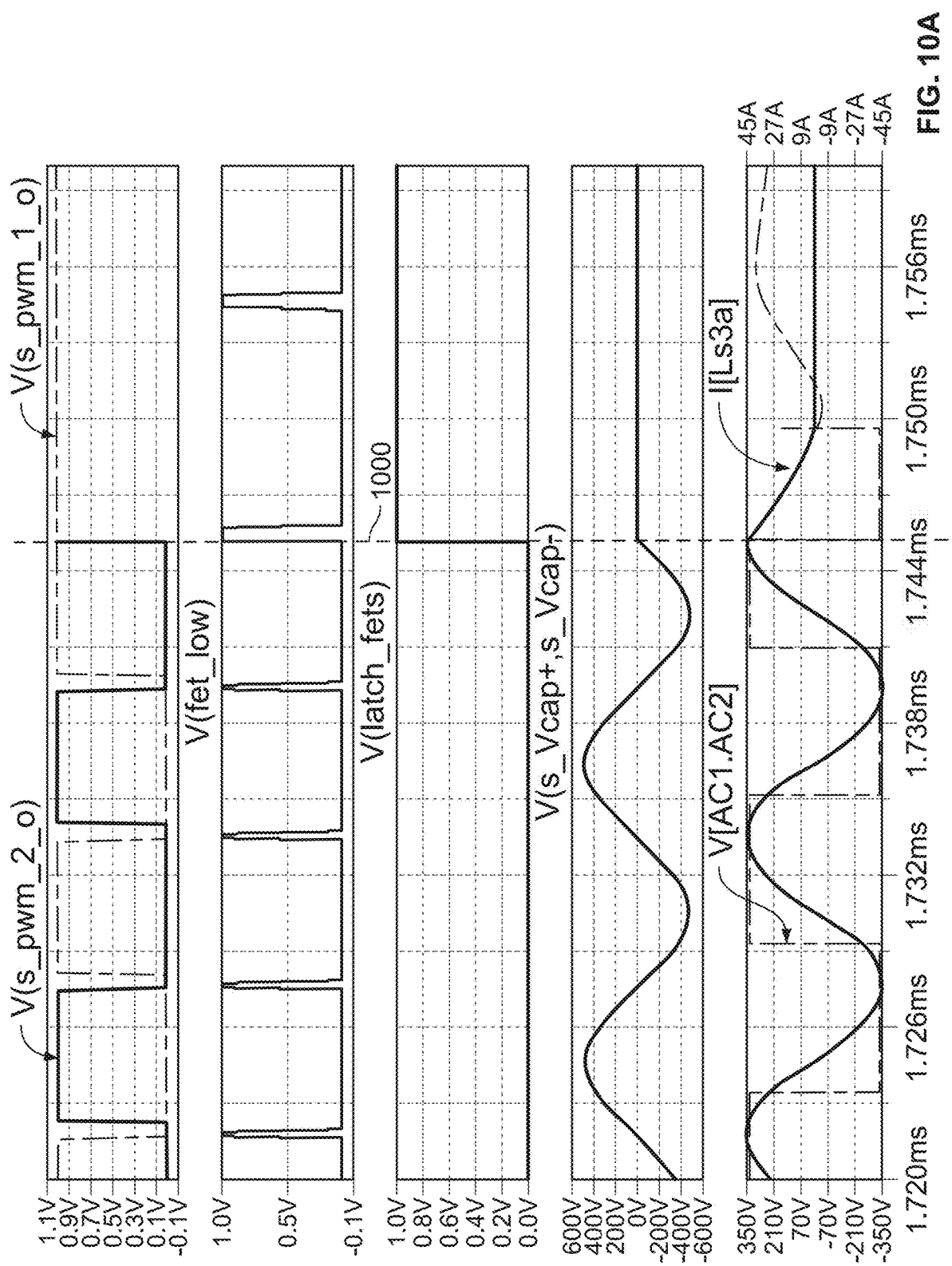
FIG. 10A illustrates the effect of a latched fault in an exemplary transmitter at time when the duty cycle is great than zero.

In a first implementation, when the duty cycle of a TMN is greater than zero and a fault is detected, the TMN voltage is allowed to decrease to zero before the switches of the TMN are shorted. This prevents any damage from occurring from the short. FIG. 10A illustrates the effect of a latched fault in an exemplary transmitter at time 1000 when the duty cycle is great than zero. The signal V(latch_fets) goes to 1 V and the voltage V(s_Vcap+, s_Vcap–) at tunable capacitor 108*a* goes to zero.

Figure 10B:
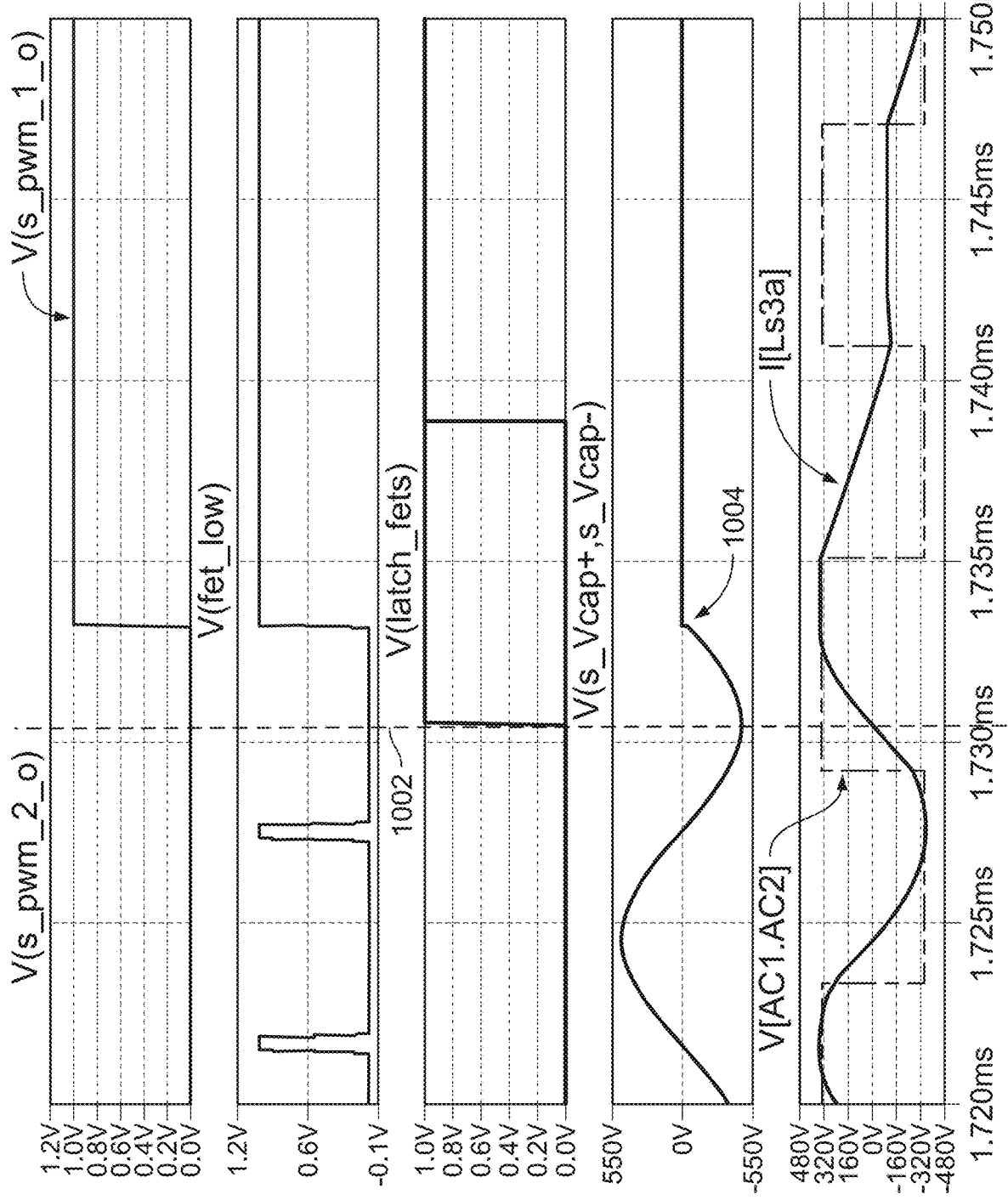
FIG. 10B illustrates the effect of a latched fault when the duty cycle equals zero.

In a second implementation, when the duty cycle of a TMN is zero and a fault is detected, shut down occurs when the voltage in the TMN reaches a particular low range, such as within +/–50 V. FIG. 10B illustrates the effect of a latched fault when the duty cycle=0. At time 1002, the latch signal goes to 1 V. The voltage V(s_Vcap+, s_Vcap–) at the tunable capacitor 108*a* has some magnitude and is allowed to approach 50 V before going to zero at time 1004. The FIG. 10B graph illustrates the operation of the TMN protection/control circuitry 174 to delay latching the control signal until the voltage across the TMN is below a threshold value (e.g., 50 V), for example, to minimize current transients.

Figure 11A:
FIG. 11A is a digital logic circuit to enable or disable switching in the TMN if there is a hardware fault (HW_FAULT) or external fault (EXT_FAULT).
Figure 11B:
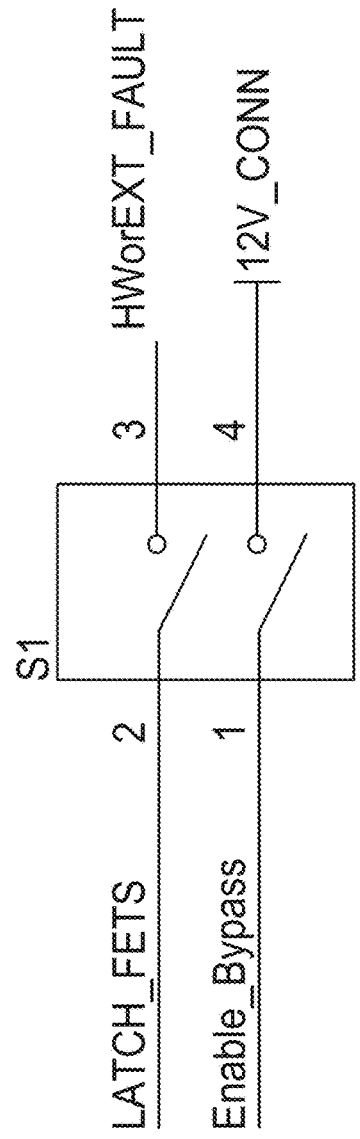
FIG. 11B is a switch to enable or disable the hardware protection.

FIG. 11A is a digital logic circuit to enable or disable switching in of the TMN if there is a hardware fault (HW_FAULT) or external fault (EXT_FAULT). FIG. 11B is a switch to enable or disable the hardware protection. Note that if pins 2 and 3 are switched on, the hardware is enabled to latch the TMN switches on. If pins 1 and 4 are switched on, the enable signal is bypassed. In some implementations, if a fault is detected, the TMN is configured to be shut down within one switching cycle of the TMN switches.

Figure 12:
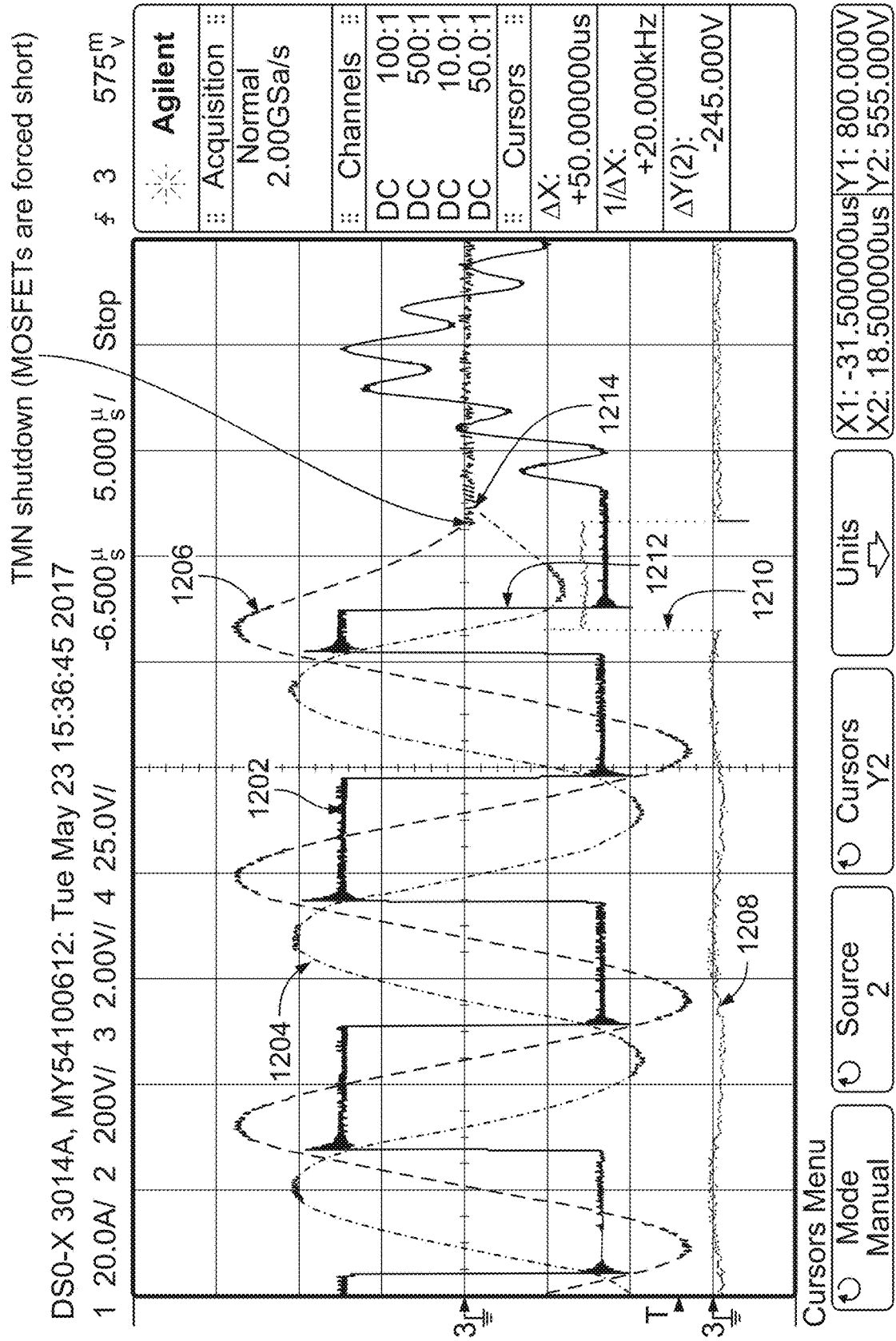
FIG. 12 is an exemplary plot of waveforms during a hardware test of a TMN overvoltage fault condition.

FIG. 12 is an exemplary plot of waveforms during a hardware test of a TMN overvoltage fault condition. Output voltage 1202 and output current 1204 are from the exemplary inverter 102. Waveform 1206 represents the voltage at the TMN while waveform 1208 represents the TMN overvoltage fault signal. At time 1210, a fault is detected as shown in waveform 1208. A short time after, at time 1212, the inverter shuts down. At time 1214, the switches of the TMN are forced short. This creates a bypass at the TMN by routing current around the TMN. Note that when the voltage at the TMN (e.g. at the tunable capacitor) is high, as it is in this example, the circuit waits for the voltage to decrease before shorting the switches of the TMN.

Figure 13:
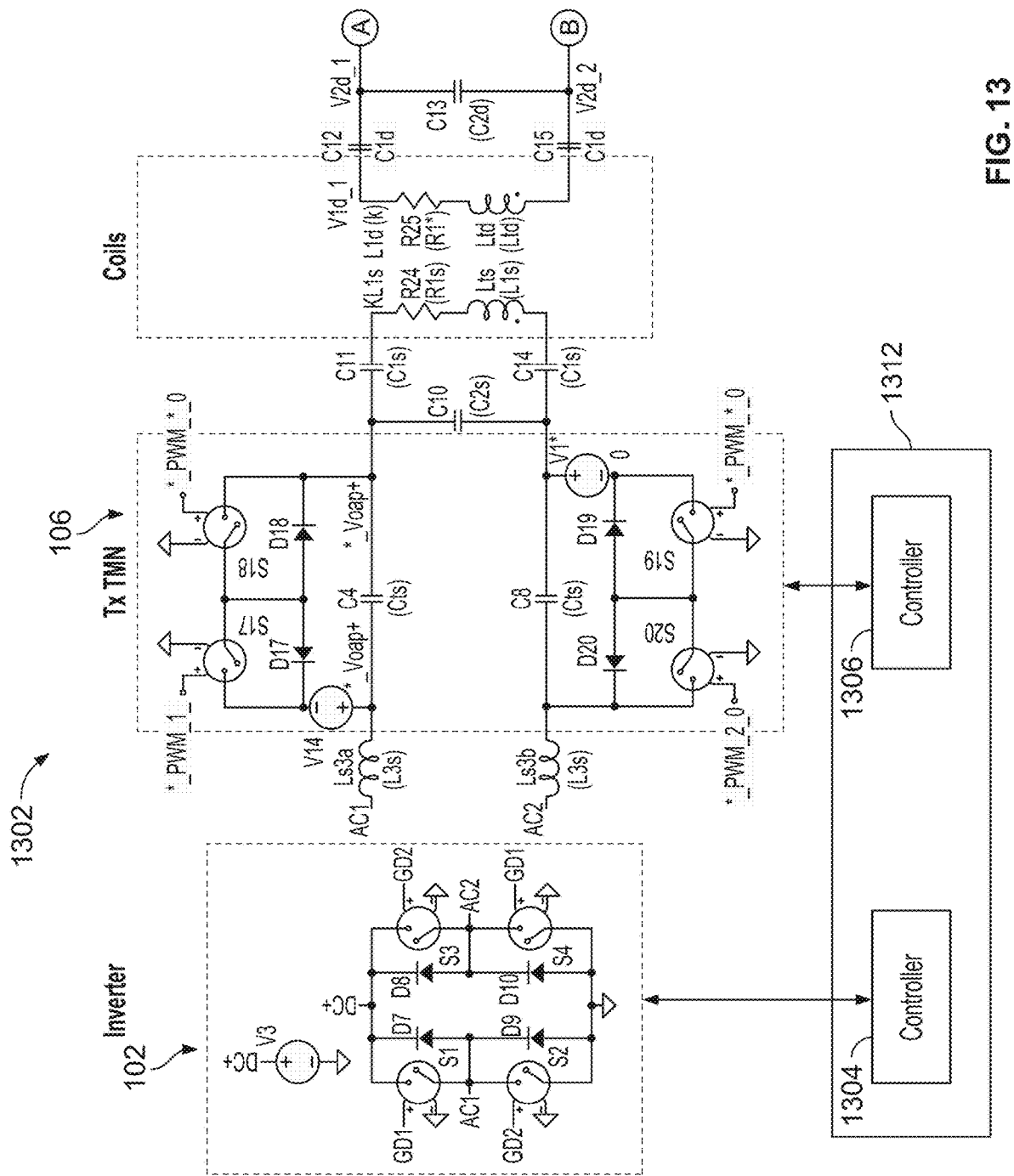
FIG. 13 is an exemplary wireless power system having one or more protection mechanisms.
Figure 13:
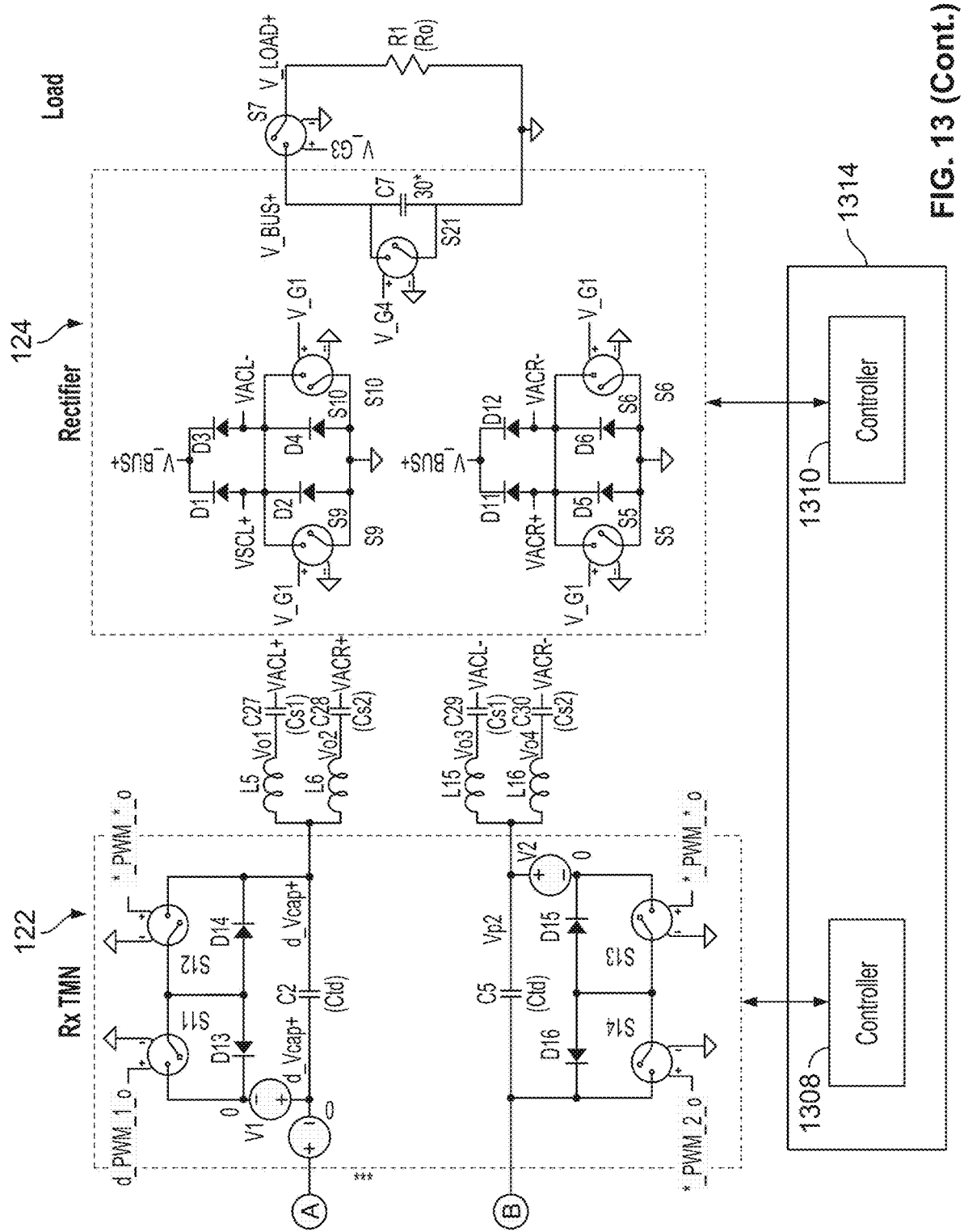

FIG. 13 is an exemplary wireless power system 1302 having one or more protection mechanisms from various fault conditions. Exemplary fault conditions that can occur in system 1302 include, but are not limited to: load disconnect (e.g., in which the load disconnects from the wireless power receiver); load short (e.g., in which the load is shorted); load overvoltage (e.g., in which a battery overcharges or a load disconnect occurs); coil overcurrent (e.g., in which overcurrent condition is detected in resonator coil L1$d$ and/or L1$s$); TMN overvoltage (e.g., in which an overvoltage condition occurs in TMN 122 or 106); or a combination thereof. These fault conditions can cause large transients in the system which can lead to the damage of various components. Note that one or more controllers coupled to one more sensors described herein may protect the system and the system's components from damage. These controllers include controller 1304 coupled to the inverter, controller 1306 coupled to the transmitter-side TMN (Tx-TMN), controller 1308 coupled to the receiver-side TMN (Tx-TMN), and controller 1310 coupled to the rectifier. In some implementations, controller 1304 and 1306 may be one controller 1312. In some implementations, controller 1308 and 1310 may be one controller 1314. Described below are scenarios in which the sensors discussed herein mitigate these fault conditions.

Figure 14:
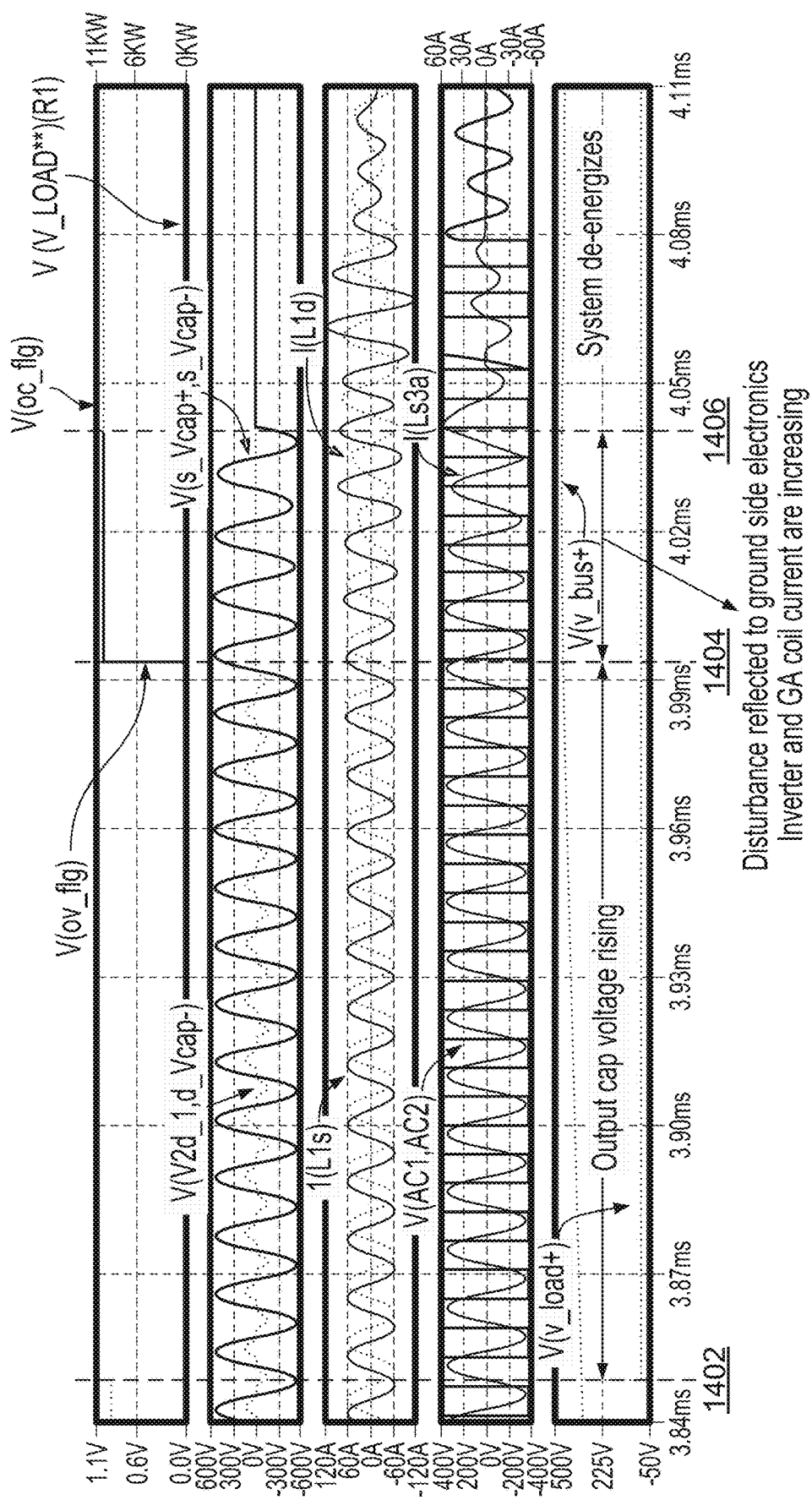
FIG. 14 is a plot of exemplary waveforms in exemplary wireless power system during a load disconnect condition.

FIG. 14 is a plot of exemplary waveforms in exemplary wireless power system 1302 during a load disconnect condition. At time 1402, the load disconnects due to various reasons. For example, a battery manager coupled to the battery may sense an unfavorable condition and disconnect the battery from the wireless power receiver. The load disconnect causes the charging current to go through the decoupling capacitor C7 at the output of the rectifier. Subsequently, voltage V(v_bus+) in the output capacitor C7 starts rising from time 1402 to time 1404. At time 1404, an overvoltage condition at the output capacitor C7 is detected. An overvoltage fault signal (signal V(ov_flg)) may be generated. At or near time 1404, protection switches S5, S6, S9, and S10 of FIG. 13 short the rectifier 124. In some implementations, the rectifier 124 can be shorted by closing one set of switches, e.g., either the switches on the high side of the rectifier bridge S9 and S10 or the switches on the low side of the rectifier bridge S5 and S6. This causes the voltage at the output capacitor C7 to stop rising. This may cause distorted current through the TMN 122; thus, at or near time 1404, protection switches short the receiver-side TMN 122.

From time 1404 to 1406, the distorted reflected impedance in the transmitter electronics causes the current in the inverter (current signal I(Ls3$a$) at the output of the inverter) and resonator coil (current signal I(L1$s$)) to rise. At time 1406, an overcurrent condition at the inverter is detected and the inverter shuts off. At or near time 1406, the switches of transmitter-side TMN 106 are shorted such that the current through the TMN is diverted through the closed switches instead of the capacitor. This prevents damage to the TMN. Note that many of the current signals become distorted from time 1404 to time 1406. These signals include the current at the output of the inverter I(Ls3$a$), the current in the transmitter resonator coil I(L1$s$), the current in the receiver resonator coil I(L1$d$). These distortions can cause the various sensors described herein to trigger. The overcurrent flag signal V(oc_flag) is generated when the peak of the current signal I(Ls3$a$) goes above a threshold. After time 1406, the energy in the system decreases. In some implementations, the receiver may be able to communicate with the transmitter fast enough for the transmitter to protect itself.

In some implementations, normally open voltage blocking switches can be provided in parallel with the parallel capacitors C10 or C13 shown in FIG. 13. For example, if the over current condition is detected at the inverter, the normally open switch in parallel with the capacitor C10 can be closed, thus reducing any excess coil current in the coil L1$s$.

In some implementations, a load disconnect may be initiated by the system itself. For example, a VA-side wireless power transfer system can include a sensor coupled to the controller. A value or range of values from the sensor may be read by the controller. For example, a collision sensor (e.g. an accelerometer), may be coupled to the controller (1314, and/or 1310 on the vehicle side). A reading from the collision sensor signifying another vehicle crashing into the charging vehicle can cause the load to disconnect. The controller can open at least one switch (e.g., relay, MOSFET, IGBT) coupled between an output of the rectifier and the load (on the positive and/or ground side) in response to detecting a fault value from the sensor. The system further protects itself and the systems turns off and/or de-energizes via the response as shown in FIG. 14.

In some implementations, instead of (or in addition to) detecting a rising voltage on the output capacitor C7, a current sensor can be coupled to the output to the load. If the current sensor reads a zero (or approximately zero) current, then the system can detect a load disconnect condition.

Figure 15:
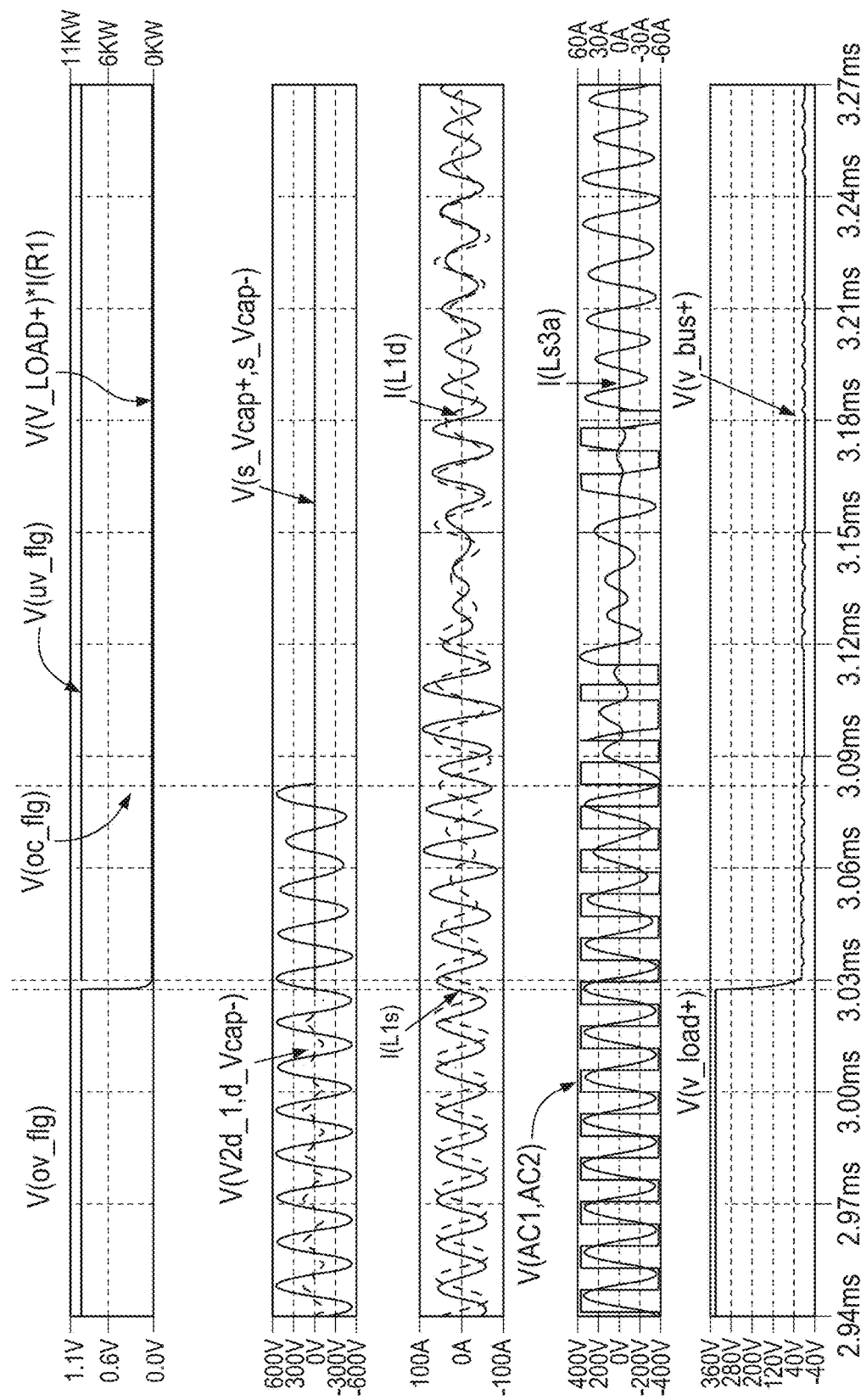
FIG. 15 is a plot of exemplary waveforms in exemplary wireless power system during a load short condition.

FIG. 15 is a plot of exemplary waveforms in exemplary wireless power system 1302 during a load short condition. There are multiple reasons a load short condition may occur. For example, if the output capacitor C7 fails, it can cause a short. If an output filter (such as for electromagnetic interference (EMI) reduction purposes) fails, it can cause a short. If the rectifier fails, it too can cause a short. In the example provided in FIG. 15, a load short occurs at time 1502, illustrated by signal V(V_LOAD+). Shortly thereafter, at time 1504, the short is detected. At this time, an undervoltage fault signal is generated (signal V(uv_flg)). To protect itself, the TMN switches also short, as shown by voltage signal V(V2$d$_1, d_Vcap−). After time 1504, an overcurrent condition is detected in the transmitter-side TMN 106 and, subsequently, the switches of transmitter-side TMN 106 are shorted. At time 1506, an overcurrent condition is detected in the inverter (flag V(oc_flg)) and the inverter shuts off, causing the system to de-energize.

Figure 16:
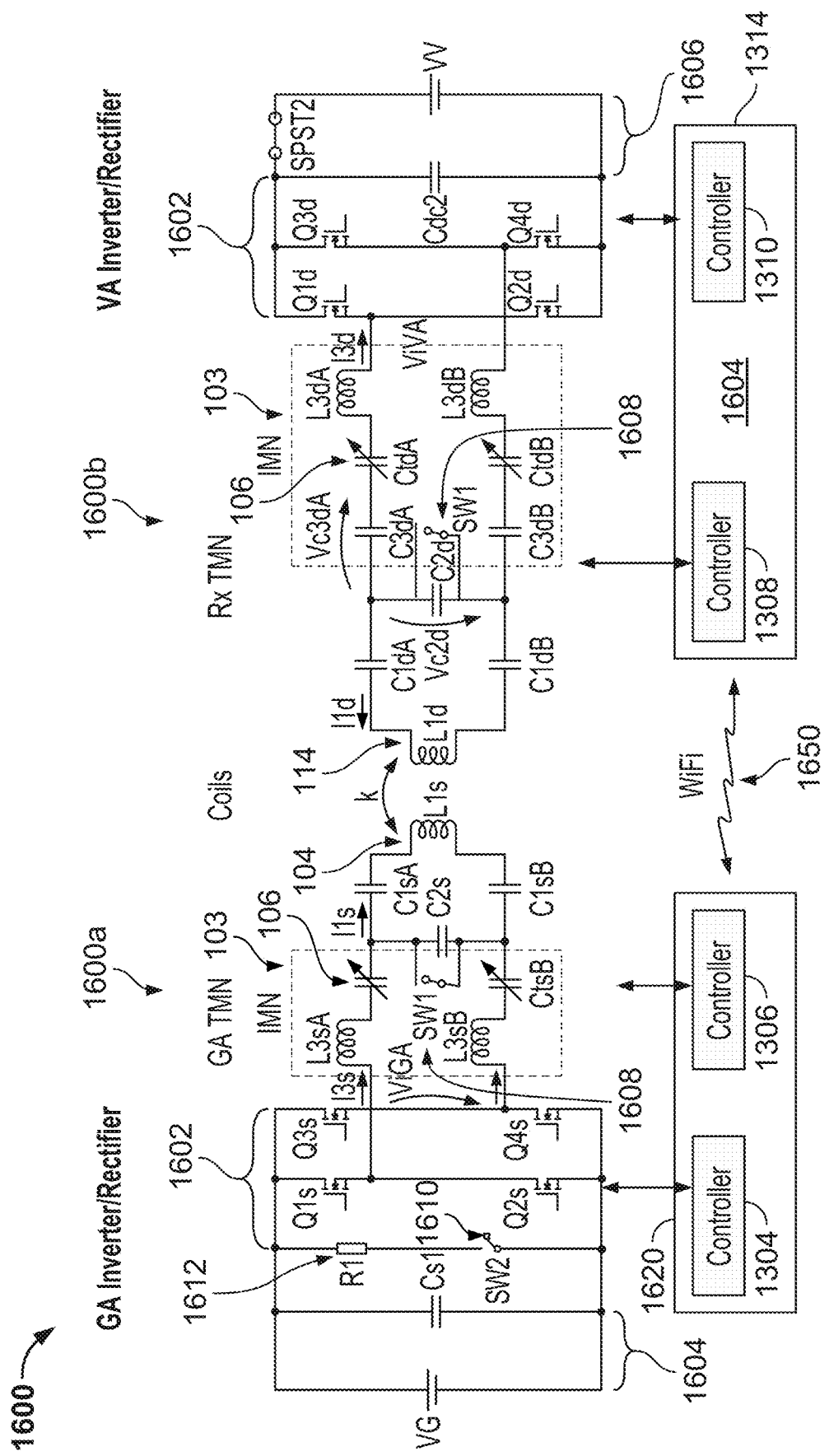
FIG. 16 is a schematic of an exemplary bidirectional wireless power transfer system.

FIG. 16 shows schematic of an exemplary bidirectional wireless power system 1600. The schematic depicts both a ground assembly (GA) side wireless power transfer device 1600a and a device side wireless power transfer device 1600b. As noted above, the GA side wireless power transfer device 1600a generally operates as a wireless power transmitter for the case of a similar uni-directional wireless power transfer system. As discussed below, however, in the bidirectional system the GA side refers generally to a wireless power transfer device that is coupled to or configured to be coupled to a stationary power supply or load such as a power grid, AC generator, etc. Furthermore, the GA side system is generally capable of handling higher power, voltage, or current transients than the device side wireless power transfer device 1600b. On the other hand, the device side wireless power transfer device 1600b generally operates as a wireless power receiver for the case of a similar uni-directional wireless power transfer system. As discussed below, however, in the bidirectional system the device side refers generally to a wireless power transfer device that is coupled to or configured to be coupled to a mobile (or generally more limited) power supply or load such as a battery or a battery powered device (e.g., a computing device or an electric vehicle). The device side wireless power transfer device 1600b can also be referred to as a vehicle assembly (VA) or VA side device when used in the context of a wireless power transfer device coupled to an electric vehicle or other mobile vehicle.

Both the GA wireless power transfer device 1600a and the VA wireless power transfer device 1600b include an inverter-rectifier 1602. The inverter rectifier 1602 includes a bridge configuration of switching elements. For example, the inverter-rectifier 1602 can include active switching elements, such as MOSFETs, which permit the inverter-rectifier 1602 to operate as either an inverter or a rectifier in a bidirectional system. As discussed in more detail below, the operating mode (also referred to herein as an "operating personality) of the inverter-rectifier 1602 can be controlled based on the pattern of PWM control signals supplied to the switching elements.

The system 1600 is able to power a load with power transfer in a first direction (e.g., a normal power flow direction), such as a battery of a vehicle, off of power input to the ground side (GA). Alternatively, the system 1600 can supply power in a second direction (e.g., a reverse power flow direction), such as suppling power to a power grid coupled to the GA side device 1600a from a battery of an electric vehicle coupled to the VA side device 1600b. As another example, the bidirectional system 1600 can be used to power a home during a power outage from a battery of an electric vehicle battery parked in a garage. Note that any or all of the sensors and protection mechanisms discussed above can be implemented in the bidirectional system 1600 that uses the inverter-rectifier 1602. Where single components are shown, including resistors, inductors, and capacitors, banks of components, including in series and/or parallel can be utilized. Where tunable components are shown, fixed components can be included in series and/or parallel with the tunable components. In some implementations, the controller 1304 and 1306 can be combined in a single controller 1620. Likewise, in some implementations, the controller 1308 and 1310 can be combined in a single controller 1640. Furthermore controllers 1304, 1306, 1620, 1308, 1310, and 1640 can be implemented in a configuration similar to control and protection circuitry 176 and 178 discussed above.

In some implementations, the controllers 1620 and 1640 include a bidirectional manager. The bidirectional manager coordinates the configuration of different hardware and software components wireless power transfer device (e.g., either 1600a/1600b) according to the direction of power flow as indicated by an operating personality assigned to the device. For example, an operating personality of INV indicates that the inverter-rectifier is operating as an inverter and therefore the wireless power transfer device 1600a/1600b is operating as a transmitter. Similarly, for example, an operating personality of REC indicates that the inverter-rectifier is operating as a rectifier and therefore the wireless power transfer device 1600a/1600b is operating as a receiver. The bidirectional manager also coordinates transitions from one direction of power flow to the opposite direction of power flow. For example, the bidirectional manager of the VA side device 1600b can communicate with the bidirectional manager of the GA side device 1600a through a wireless communication link 1650 (e.g., a WiFi link) to coordinate a power reversal. The bidirectional manger can be can be implemented as separate controller within each device 1600a/1600b or in software.

More specifically, various hardware and software components of the system can have different operating setpoints, modes and/or ranges of operations depending on the direction of flow of power, and by extension, the operating personality of the wireless power transfer device 1600a/1600b. The various operating set points, modes and/or ranges of operation can be stored in memory or in hardware. Each component of the system (e.g. the inverter-rectifier 1602, TMN 106, and other components) including various controllers, filters, communication systems, and/or protection systems can assume a different "operating personality" depending on the direction of power flow.

The wireless power transfer device's bidirectional manager can assign an appropriate personality at system startup and/or during a power flow transition based on the expected direction of power flow through the wireless power transfer system 1600 as a whole. For example, upon receipt of a command to switch from one mode of operation for the system to another, (for example, by an operator interface, and/or user interface connected to either or all of the controllers, on either or both sides of the system or off system, such as on a network, the grid, or a mobile device), the bidirectional manager can assign the various component controllers (e.g., 1304, 1306, 1308, and 1310) a respective operating personality. Each controller can use the assigned operating personality to identify and load appropriate operating processes or software code to control associated components of the wireless power transfer device 1600a/1600b. For instance, when an inverter-rectifier controller is assigned an operating personality of an inverter (e.g., INV), the controller will load software code to generate PWM control signal patterns to operate the inverter-rectifier switching elements to generate AC output signals from a DC input signal. On the other hand, when an inverter-rectifier controller is assigned an operating personality of a rectifier (e.g., REC), the controller will load software code to generate PWM control signal patterns to operate the inverter-rectifier switching elements to rectify an AC input signal into a DC output signal.

Furthermore, the bidirectional manager can provide the power demand, the power flow direction, choose the appropriate software code blocks, and assign personalities to sub-controllers or other controller(s). The bidirectional manager can determine the errors that are recoverable or not recoverable, depending on the side the system the controller is located on, and the operating personality it assumes for components of the system. The operational personalities can be assigned based on the expected power flow direction, e.g. V2G—vehicle-to-grid power flow, or G2V—grid-to-vehicle power flow. Moreover, the bidirectional manager can determine the time and/or mode for recovery for those errors and/or clear errors when they are recovered so no user intervention is needed. The bidirectional manager can communicate with the user, the controller(s) of the other side of the system (e.g., the bidirectional manager on the other side of the system).

The bidirectional manager can receive notification of an error from a component of the wireless power transfer system and the error messages can be allocated to other components of the wireless power transfer system, either directly by the bidirectional manager or after a callback request from the components.

The bidirectional manager can receive communication from components of the wireless power transfer system (e.g., via WiFi from components from the other side of the system). The bidirectional manager can fulfill callback requests from components for messages related to the component, or can allocate the message to the relevant components. The bidirectional manager can control, including dynamically, the privileges of the components of the wireless power system to receive and send error and communication messages. The bidirectional manager can be responsible for controlling the components of the wireless power transfer system during the transition phases, including handling any error conduction arising from the change of power transfer direction (both V2G and G2V transitions). For example, the bidirectional manager can oversee turning down of power, confirm power has fully or partially turned off, and sequence the components of the system to turn on (while assigning personalities to the components).

As an example, the bidirectional manager on the GA controller receives a command to turn on power from idle, the bidirectional manager may assign G2V personality to the various controllers and hardware in the system. Upon receipt of a communication to change the power transfer direction, the bidirectional manager communicates between the GA and VA to change power transfer direction. The bidirectional manager can be responsible for handling any error arising from the change of power transfer direction, including during the power down of the first direction and the power up of the second direction. When the error is cleared, the bidirectional manager can assign personality to the controller(s), for example by selecting a subset of instructions from a non-transitory computer readable medium, or causing the controller(s) to select the subset of instructions.

In some implementations, each controller of the system (e.g., a dedicated inverter-rectifier processor, or a dedicated TMN processor, or a dedicated transmitter or receiver processor) can contain a bidirectional manager. The bidirectional manager can operate as a top-level manager.

Generally, assigning a personality to components/controllers can allow for modularity, non-redundant parts, code, and memory, allows for faster and on-the-fly switchover from G2V (grid-to-vehicle power flow) to V2G (vehicle-to-grid power flow) and back.

Figure 17:
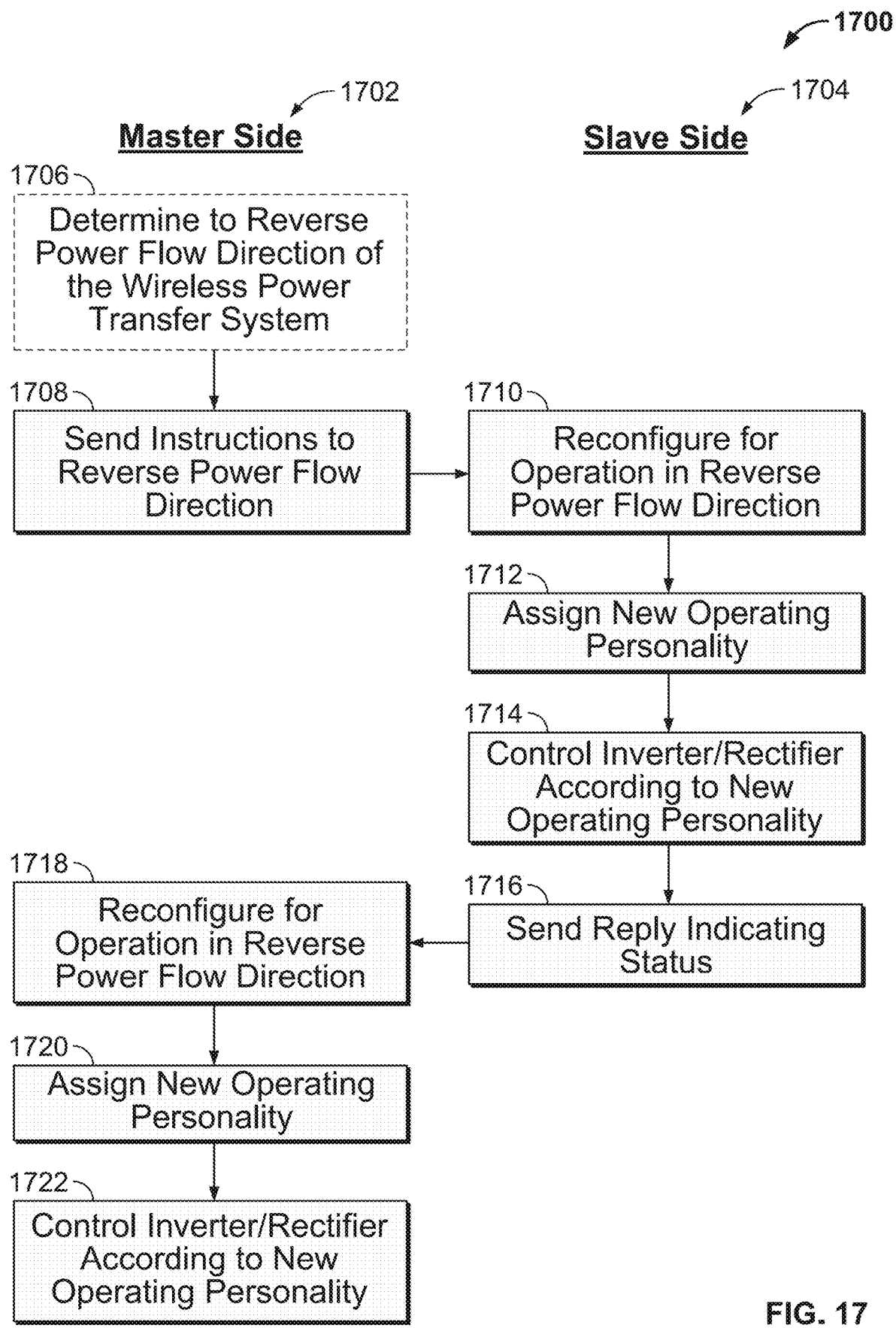
FIG. 17 depicts flowchart of an exemplary bidirectional control process that can be executed in accordance with implementations of the present disclosure.

FIG. 17 depicts flowchart of an exemplary bidirectional control process 1700 that can be executed in accordance with implementations of the present disclosure. The example process 1700 can be implemented, for example, by the example wireless power transfer systems disclosed herein. For example, the process 1700 can be executed between a bidirectional manager of a GA wireless power transfer device 1600a and a bidirectional manager of a VA wireless power transfer device 1600b. Process 1700 shows divided master side operations 1702 and slave side 1704 operations. Generally, the master side operations 1702 are performed by a VA wireless power transfer device 1600b while the slave side operations 1704 are performed by a GA wireless power transfer device 1600a. For example, the VA (or device-side) wireless power transfer device 1600b may generally be coupled to a smaller capacity or more limited power source or load. Implementing the VA wireless power transfer device 1600b as a master device may provide more precise control of the bidirectional control process 1700 to prevent exceeding possible lower operating limits of the VA side system or its load/source. In some examples, the example process 1700 can be provided by one or more computer-executable programs executed using one or more computing devices, processors, or microcontrollers. For example, the example process 1700, or portions thereof, can be provided by one or more programs executed by control circuitry of wireless power transfer devices 1600a, 1600b.

The master device initiates a power flow transition within the wireless power system. The initiation may be prompted by a user input, or in some implementations by an automatic power transition determination performed by the master device (1706). For example, the master device can determine to shift power flow based on various criteria including, but not limited to, state of charge of a battery, time of day, and availability and/or demand of grid-power. For example, a VA wireless power transfer device 1600b can be configured to initiate a power flow reversal process when a connected battery is above a threshold charge level and a loss of grid power occurs. As another example, a VA wireless power transfer device 1600b can be configured to initiate a power flow reversal process when a connected battery is above a threshold charge level and during a preset time of day. For instance, the VA wireless power transfer device 1600b can be configured reverse power flow in order to provide supplemental power to a home during peak load periods of a power grid (e.g., periods of high demand and/or high energy prices such as evenings). In some implementations, the slave device can determine when to initiate a power flow transition, but would perform an additional step of requesting initiation of the power flow transition from the master device.

The master device sends instructions to the slave device to reverse the direction of power flow (1708). In response to the instructions, the slave device reconfigures for operating in the opposite power flow direction from its current operations (1710). For example, if the slave device was operating as a transmitter it will reconfigure for operation as a receiver. If the slave device was operating as a receiver it will reconfigure for operation as a transmitter. For example, the slave device's bidirectional manager can coordinate controller operations within the slave device to shut down power flow in the present direction by, for example, securing operation of the inverter-rectifier, shifting switches to disconnect a load/power supply (as appropriate), toggling bypass switches to dissipate residual currents within the slave device, or a combination thereof.

The slave device assigns a new operating personality in accordance with the new power flow direction (1712). For example, the slave device's bidirectional manager assigns a new operating personality to respective controllers within the slave device as appropriate to the new direction of power flow. The bidirectional power manager can assign the new operating personality by toggling a flag bit (e.g., TMN_SIDE discussed in more detail below) to indicate operation as a transmitter/inverter or operation as a receiver/rectifier.

In response to the new operating personality assignment, the various slave device controllers can reconfigure their respective operations. For example, the controllers can load control algorithms (e.g., software code blocks) to perform operations according to the new power flow direction. For example, a TMN controller can reset a TMN and load control code for generating appropriate TMN control signals for operation in according to the new power flow direction. The TMN may need to adjust set points (e.g., impedance values, impedance adjustment step sizes, and/or protection schemes) to accommodate power transfer in the new direction or to prepare for power ramp up in the new direction or both. For example, power flow in a V2G mode may generally be lower than in a G2V mode, e.g., due to asymmetries between GA and VA side resonator coils and/or discharge constraints on a battery. Consequently, TMN and/or inverter-rectifier set points may be different for operating in a V2G mode vice a G2V mode.

The slave device (e.g., the slave device's inverter controller) can control the inverter-rectifier operation according to the new operating personality (1714). For example, an inverter-rectifier controller can load appropriate algorithms for generating PWM control signals for operating as an inverter when the slave device is a transmitter and operating as a rectifier when the slave device is a receiver. The specific inverter and rectifier operations are described in more detail below in reference to FIGS. 18 and 19.

The slave device sends a reply to the master device indicating its reconfiguration status (1716). When the slave device indicates that its reconfiguration is still in progress or is stalled, the master device waits and/or resends an instruction 1708. By the master device waiting for confirmation that the slave device has completed updating its operating personality the process 1700 may provide for safer and more robust operations. For example, it may prevent the power flow from commencing or reversing with mismatched personalities assigned to either the slave or master device. When the slave device indicates that its reconfiguration is complete, the master device reconfigures for operating in the opposite power flow direction from its current operations (1718). For example, if the master device was operating as a transmitter it will reconfigure for operation as a receiver. If the master device was operating as a receiver it will reconfigure for operation as a transmitter. For example, the master device's bidirectional manager can coordinate controller operations within the slave device to shut down power flow in the present direction by, for example, securing operation of the inverter-rectifier, shifting switches to disconnect a load/power supply (as appropriate), toggling bypass switches to dissipate residual currents within the slave device, or a combination thereof.

The master device assigns a new operating personality in accordance with the new power flow direction (1720). For example, the master device's bidirectional manager assigns a new operating personality to respective controllers within the master device as appropriate to the new direction of power flow. The bidirectional (power) manager can assign the new operating personality by toggling a flag bit (e.g., TMN_SIDE discussed in more detail below) to indicate operation as a transmitter/inverter or operation as a receiver/rectifier.

In response to the new operating personality assignment, the various master device controllers can reconfigure their respective operations. For example, the controllers can load control algorithms (e.g., software code blocks) to perform operations according to the new power flow direction. For example, a TMN controller can reset a TMN and load control code for generating appropriate TMN control signals for operation in according to the new power flow direction. The TMN may need to adjust set points (e.g., impedance values and/or protection schemes) to accommodate power transfer in the new direction or to prepare for power ramp up in the new direction or both.

The master device (e.g., the master device's inverter controller) can control the inverter-rectifier operation according to the new operating personality (1722). For example, an inverter-rectifier controller can load appropriate algorithms for generating PWM control signals for operating as an inverter when the slave device is a transmitter and operating as a rectifier when the slave device is a receiver. In some implementations, a TMN controller in the master device can control the TMN according to the new operating personality. For example, a TMN controller on the master device can load appropriate control algorithms for generating TMN adjustment signals for operating as a load coupled TMN in a first direction, or a power supply coupled TMN in a second direction.

Figure 18:
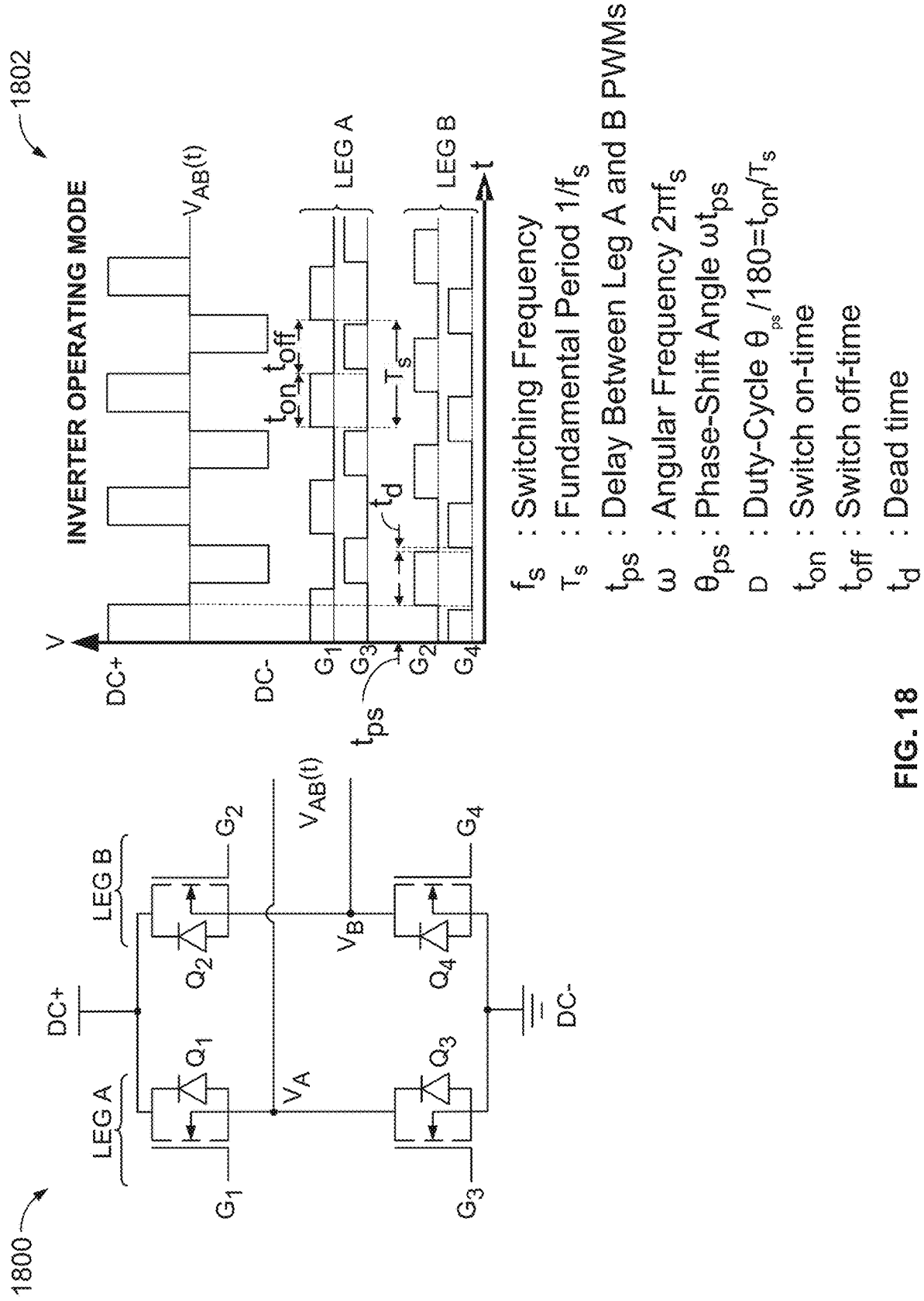
FIG. 18 depicts a schematic of an exemplary inverter-rectifier and a timing diagram illustrating operation of the inverter-rectifier in an inverter operating mode.

FIG. 18 depicts a schematic 1800 of an exemplary inverter-rectifier 1602 and a timing diagram 1802 illustrating operation of the inverter-rectifier in an inverter operating mode. The schematic 1800 shows a phase shifted full-bridge inverter. The inverter bridge circuit uses active switching elements Q1, Q2, Q3, and Q4, which can be, for example, MOSFETSs, transistors, FETs, IGBTs, etc.

The timing diagram 1802 illustrates the driving signal pattern for the switches Q1, Q2, Q3, and Q4. The switches are grouped into two legs; Leg A (Q1, Q3) and Leg B (Q2, Q4). The corresponding switches in each leg are alternately switched on and off by respective PWM control signals. On time and off time, for each gate drive signal G1, G2, G3, and G4 are shown. The dead time to shown is when both gate drivers of the same leg are off. The off time may be larger than the on time for each driving signal in a period Ts.

The delay time tps between Leg A (Q1 and Q3) and Leg B (Q2 and Q4), when expressed in degrees, is known as the phase-shift angle and is a means for adjusting the overall power sourced by the inverter-rectifier when operating as an inverter. At start-up, output power $V_{AB}(t)$ from inverter-rectifier terminals $V_A$ and $V_B$, can have an 11% duty cycle (leg phase-shift angle θps=20 degrees). At max power, VAB(t) can be at a 100% duty cycle (leg phase θps=180 degrees). Total power output is controlled by adjusting the delay time $t_{PS}$ between the Leg A and Leg B PWM signals.

Although a full bridge inverter is shown, in some implementations the inverter-rectifier switches can be arranged in a half-bridge configuration. In some implementations, the inverter-rectifier can implement zero-voltage switching operations to ensure the switches are operated when the voltage across them is zero or near-zero.

Figure 19:
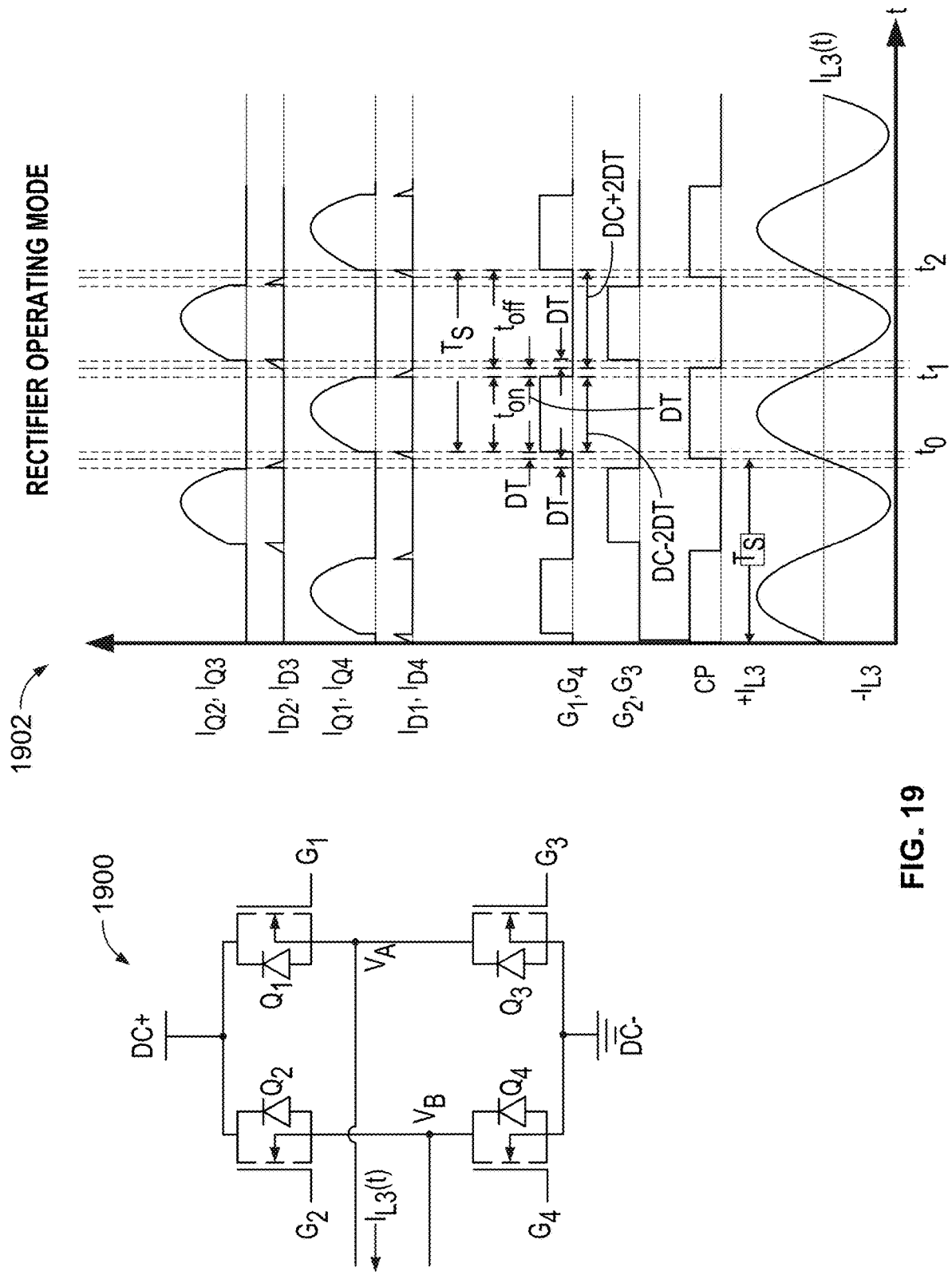
FIG. 19 depicts a schematic of an exemplary inverter-rectifier and a timing diagram illustrating operation of the inverter-rectifier in a rectifier operating mode.

FIG. 19 depicts a schematic 1900 of an exemplary inverter-rectifier and a timing diagram 1902 illustrating operation of the inverter-rectifier 1602 in a rectifier operating mode. FIG. 19 illustrates a synchronous rectifier operation utilizing the same switches as shown in FIG. 18. The gate drive signals (G1, G2, G3, G4) corresponding to respective switches (Q1, Q2, Q3, Q4) are shown in the timing diagram 1902. Although zero current switching operation is shown, zero-voltage switching (ZVS) naturally follows the operation and can be used in some implementations. However, ZVS switching in active rectification mode is not shown in figures.

The synchronous rectifier can receive the zero-crossing of the I3s current (shown as I3d or I3s in FIG. 16) and creates the timing of the synchronous rectification (zero current switching) as shown in timing diagram 1902. In the rectifier mode, the inverter-rectifier 1602 rectifies an AC input signal into a DC output signal by alternately switching on corresponding pairs of switches (Q1/Q4 and Q2/Q3). For example, the inverter-rectifier controller (e.g., inverter/protection and control circuitry 176) can receive I3d or I3s current and/or phase measurements from a current or phase sensor such as phase sensor 142 or current sensor 150 illustrated in FIGS. 1C, 1D, 5A, and 6A. The switches Q1, Q2, Q3, and Q4 can be turned off at the zero current (or near zero current) of the input to the inverter-rectifier 1602, and an appropriate time delay $t_d$ may be permitted to lapse before operating the next pair of switches (e.g., Q1 and Q4 or Q2 and Q3). This can prevent power losses within the switch. In some implementations, the time delay may be adjusted by the system as needed.

In some implementations, during a startup, the inverter-rectifier does not begin does not begin switching until the measured input power is above a threshold value that ensures continuous conduction of the I3 current. The threshold value can be, e.g., between 2 kW and 4 kW, and/or between 20-40% of a target power. During the low power operations below the threshold input power value, the input AC signal may be noisy, potentially resulting in inaccurate zero-crossing detections and possibly large transients for imprecise switching. For example, the I3 current that is used to generate the PWM synchronization may be discontinuous and noisy resulting in inaccurate zero-crossing detections and possibly large transients or even in a destructive shorting of the power stage. Instead, rectification can be performed passively when power is below the threshold value by conduction through the body-diodes of the switches. In such implementations, the switching operations performed above the threshold input power value can be considered an active rectification mode and the body-diode conduction below the threshold input power value can be considered a passive rectification mode.

Figure 20:
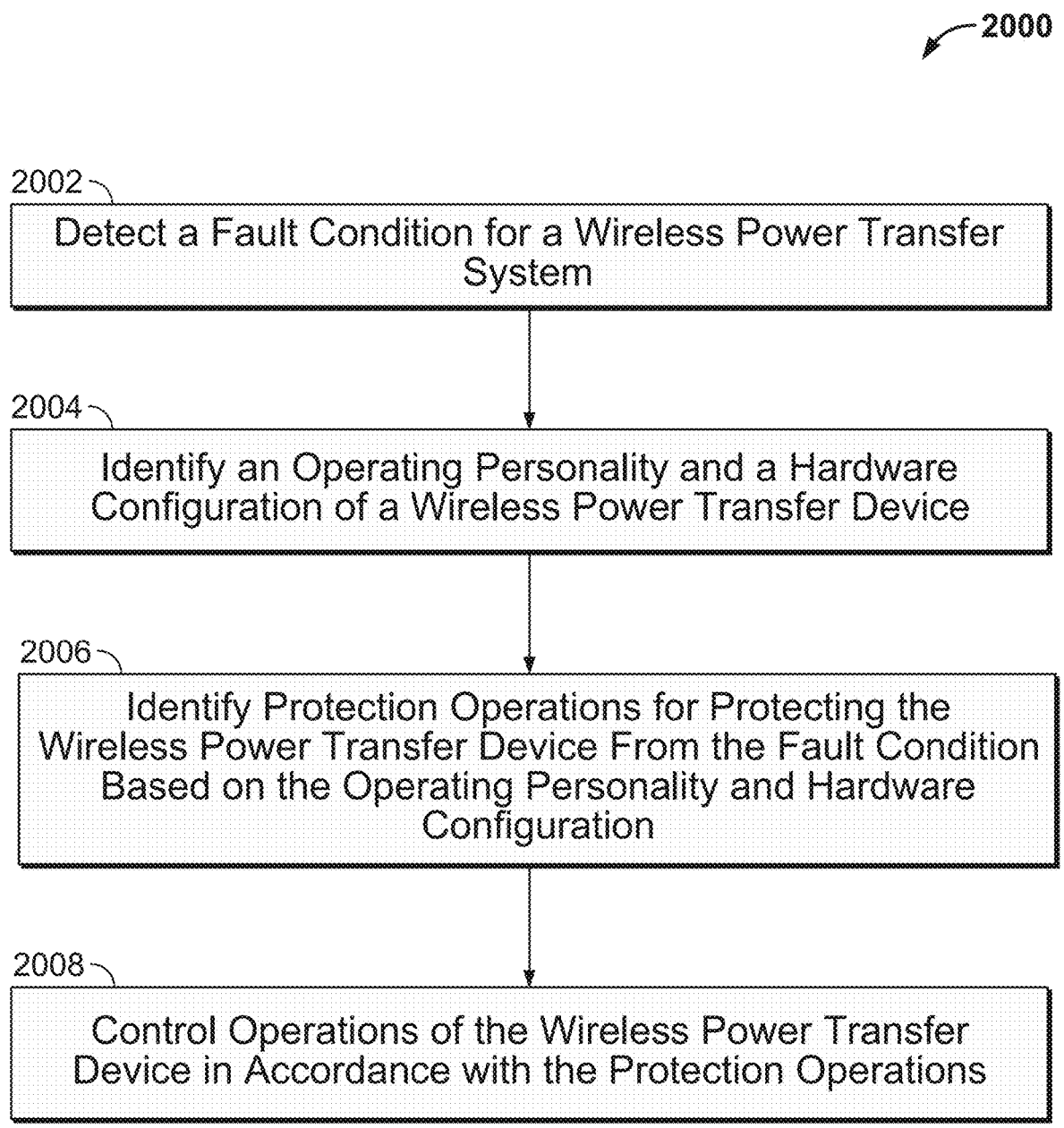
FIG. 20 depicts a flowchart of exemplary protection operations that can be executed in accordance with implementations of the present disclosure

FIG. 20 depicts a flowchart of exemplary protection operations 2000 that can be executed in accordance with implementations of the present disclosure. The example operations 2000 can be implemented, for example, by the example wireless power transfer devices (e.g., 1600a, 1600b) disclosed herein. For example, the operations 2000 can be executed by control circuitry of a wireless power transfer device. For example, the operations 2000 can be executed by an inverter-rectifier controller and inverter protection circuitry such as the logic circuits shown in FIG. 22A. In some implementations, the operations 2000 can be executed in a different order than that shown in FIG. 20. Furthermore, the protection operations 2000 will be described in reference to FIGS. 20-22B.

Figure 21:
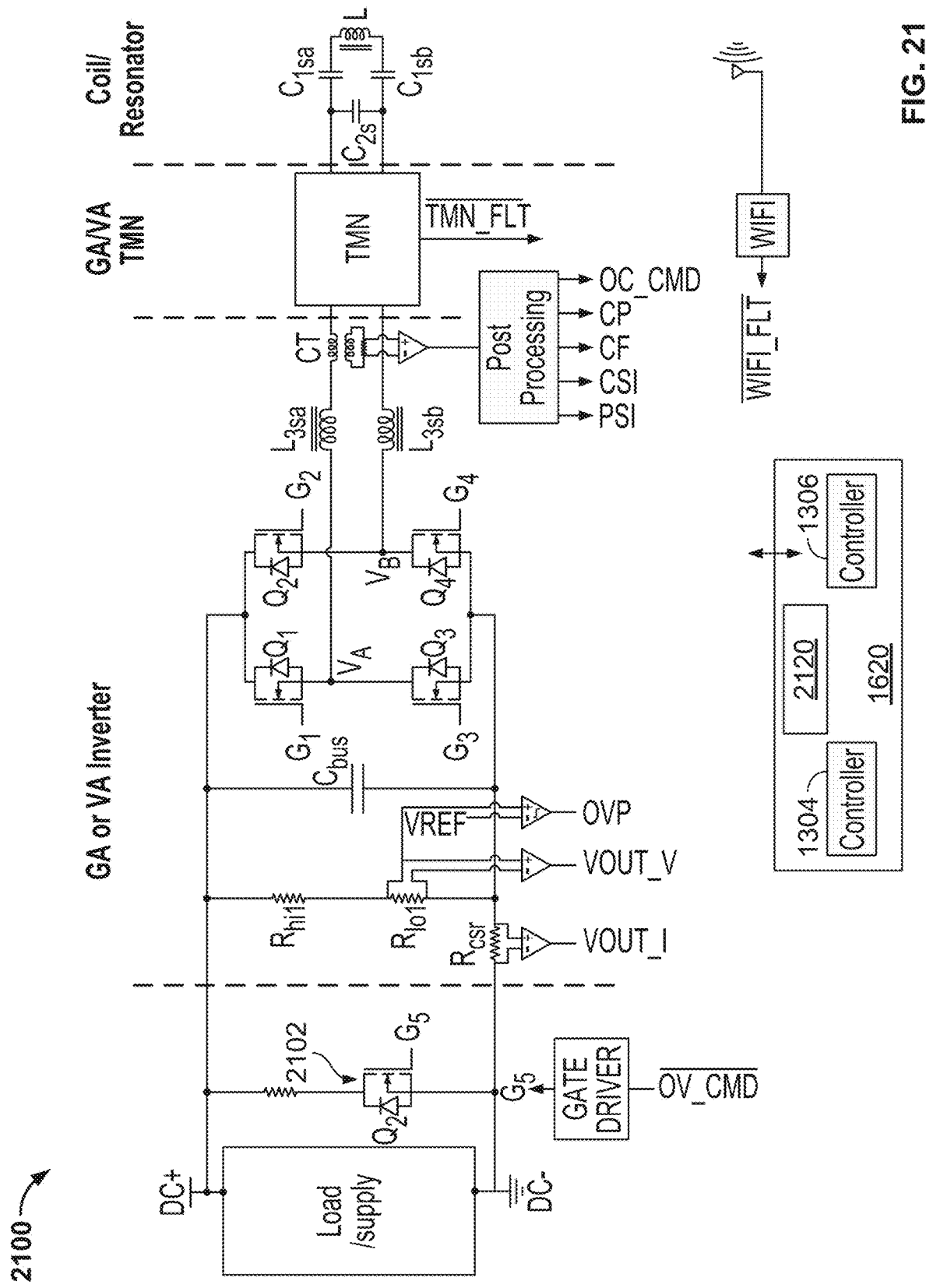
FIG. 21 is a diagram of a bidirectional wireless power transfer device that illustrates an arrangement of fault sensing circuits.
Figure 22A:
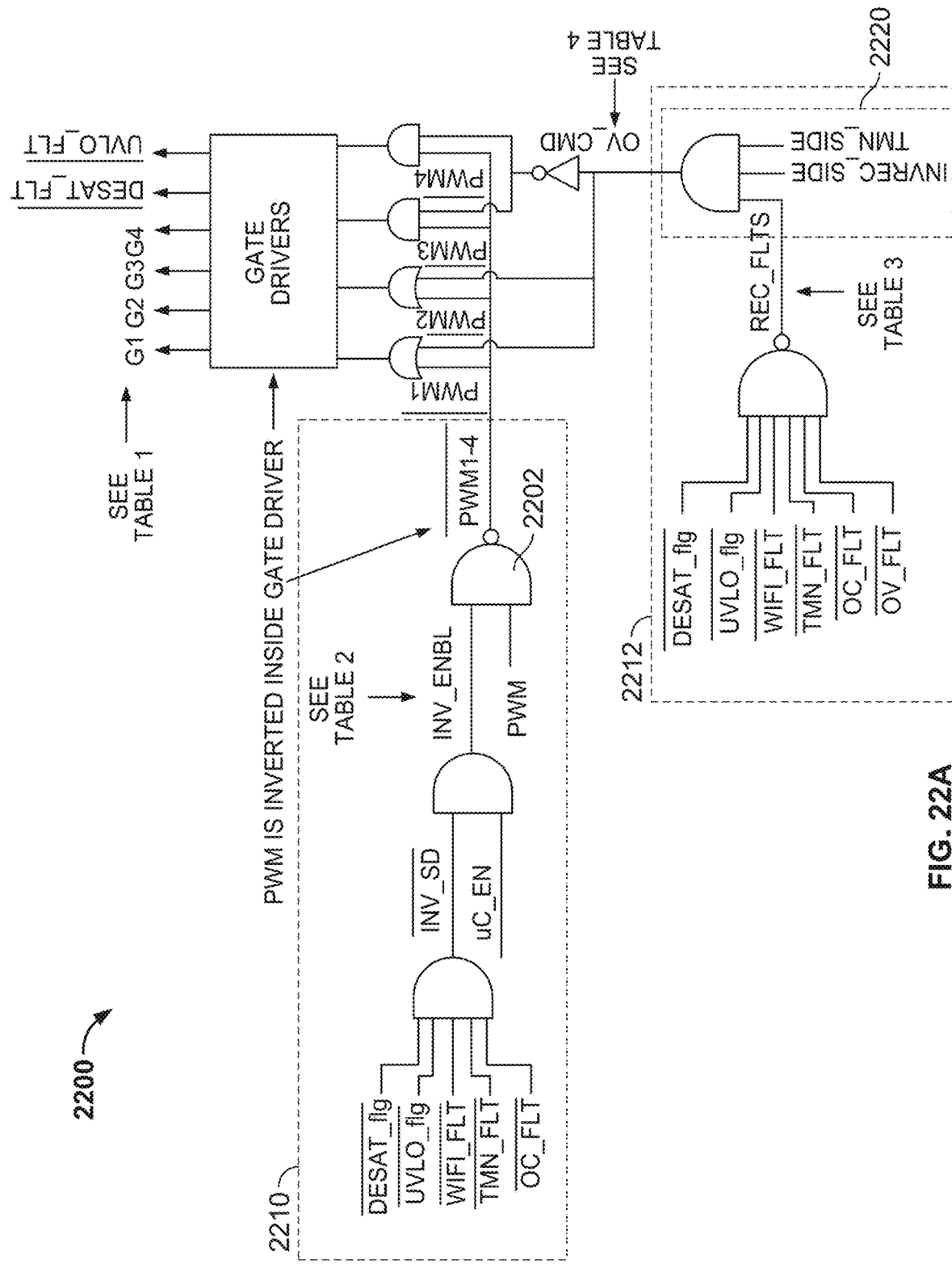
FIG. 22A is a block diagram of exemplary protection logic for a bidirectional wireless power transfer device.

FIG. 21 is a diagram 2100 of a bidirectional wireless power transfer device that illustrates an arrangement of fault sensing circuits. Diagram 2100 illustrates the locations at which various fault signals described below are measured in the wireless power transfer device. The fault signals illustrated include OV_CMD, VOUT_I, VOUT_V, OVP, WIFI_FLT, and TMN_FLT. FIG. 22A is a block diagram 2200 of exemplary protection logic for a bidirectional wireless power transfer device and FIG. 22B illustrates logic truth tables associated with the exemplary protection logic shown in FIG. 22A.

In FIG. 22A the logic circuitry 2210 evaluates faults during an operating personality as an inverter, and logic circuitry 2212 evaluates faults during an operating personality as a rectifier. The logic circuitry 2220 enables particular protective actions specific to a rectifier operating personality. The illustrated protection logic is exemplary, and may be simplified or further expanded, and may be implemented in hardware or software. Logic can be active high or active low, and the outputs of previous logic can be appropriately negated.

The logic circuitry 2210 evaluates various system faults including DESAT_flg, UVLO_flg WIFI_FLT, TMN_FLT, and OC_FLT. DESAT_flg and UVLO_flg are flags that are used in some implementations to indicate proper operation of the rectifier-inverter switches. For example, they may indicate a desaturation condition in an IGBT switch. WIFI_FLT indicates that a WiFi fault has occurred. For example, if a fault occurs on one wireless power transfer device (e.g. a receiver) it may communicate the fault to another device (e.g., the transmitter) to allow the device to execute appropriate actions to maintain the safety of the system as a whole. TMN_FLT is discussed above, and indicates that a fault has occurred at the TMN (e.g., a TMN over and/or under current fault). OC_FLT indicates that an over current condition has occurred at the inverter-rectifier. The logic circuitry 2220 generally evaluates the same faults as logic circuitry 2210, but also may include an additional fault signal; OV_FLT. OV_FLT may indicate an over voltage fault at wireless power device. For example, when operating as a rectifier, the OV_FLT may serve as an indication of a load disconnect fault, as discussed below.

The control circuitry detects a fault condition (2002). For example, the control circuitry receives one of the fault signals shown in FIGS. 21, 22A, and 22B. For example, Truth Table 2 of FIG. 22B shows the logic combinations that generate an inverter enable signal (INV_ENBL). When the INV_ENBL signal is high the PWM signals are passed through the NAND gate 2202 in FIG. 22A. However, if any of the faults in Truth Table 2 are detected (e.g., the fault signal goes low), the INV_ENBL signals is disabled (low), indicating the existence of a fault condition.

The control circuitry identifies an operating personality and a hardware configuration of the wireless power transfer device (2004). For example, the particular protective action that the control circuitry will perform is executed based on the operating personality and hardware configuration of the wireless power transfer device. As discussed above, the operating personality can be indicated by a flag such as the TMN_SIDE flag shown in FIG. 22A and the truth tables in FIG. 22B. The TMN_SIDE flag indicates whether the wireless power transfer device is operating as a receiver or a transmitter. Referring to Truth Tables 1 and 4, the value of TMN_SIDE corresponds to an operating personality of INV (e.g., operation as an inverter and a transmitter) when the value is 0 and an operating personality of REC (e.g., operation as a rectifier and a receiver) when the value is 1. A hardware configuration refers to a flag that indicates whether the control circuitry is controlling a wireless power transfer device configured as a GA side device (e.g., a grid-connected system) or a VA side device (e.g., a device-connected system). The hardware configuration indicates to the control circuitry which protective actions can be executed based on the operating configurations and limitations of the hardware. For example, GA side resonators and TMNs can be configured differently from VA side resonators and TMNs. Consequently, GA side resonators and TMNs may have different (e.g., generally higher) operating limits than VA side components, and different protective actions may be required. Referring to Truth Tables 1 and 4, the value of INVREC_SIDE indicates that the wireless power transfer device is configured as a GA side device when the value is 0 and that the wireless power transfer device is configured as a VA side device when the value is 1.

The control circuitry identifies protection operations for protecting the wireless power transfer device from the fault condition based on the identified operating personality and hardware configuration (2006). The control circuitry controls the operations of the wireless power transfer device in accordance with the protection operations (2008). For example, as indicated by Truth Table 1, if the wireless power transfer device is operating as an inverter (e.g., a power transmitter) (TMN_SIDE=0) and is configured as a either a GA or a VA (INVREC_SIDE=0 or 1) the PWM control signals for the inverter-rectifier will be overridden and force to zero if any fault occurs that disables INV_ENBL, thereby, shutting down the inverter-rectifier. In addition, a component of the IMN 103 can be shorted to dissipate residual current in the resonator coil. For example, switches SW1 1608 of FIG. 16 can be closed to dissipate any residual resonator current. In some implementations, if the hardware configuration of the wireless power transfer device indicates that the device is configured as a GA side device and the operating personality is an inverter (power transmitter) the protective operations can further include switching in a resistor configured to dissipate excess power from the inverter-rectifier. For example, the control circuitry can close switch SW2 1610 to dissipate excess power from the power source 1604 through resistor R1 1612 shown in FIG. 16. In some implementations, the resistor may only be switched in for certain fault types. For example, if the device is configured as a GA and operating as an inverter the resistor may be switched in for an over current fault. If the device is configured as a GA and operating as a rectifier the resistor may be switched in for an over voltage fault.

If the operating personality indicates that the wireless power transfer device is operating as a rectifier (power receiver) (e.g., TMN_SIDE=1) and a fault occurs (e.g., as indicated by INV_ENBL falling low in Truth Table 1) the control circuitry can shutdown the inverter-rectifier by overriding the PWM control signals. In some implementations, the control circuitry can also short a component of the matching network to dissipate residual current in the resonator coil by, for example, closing switches SW1 1608 of FIG. 16.

Figure 23:
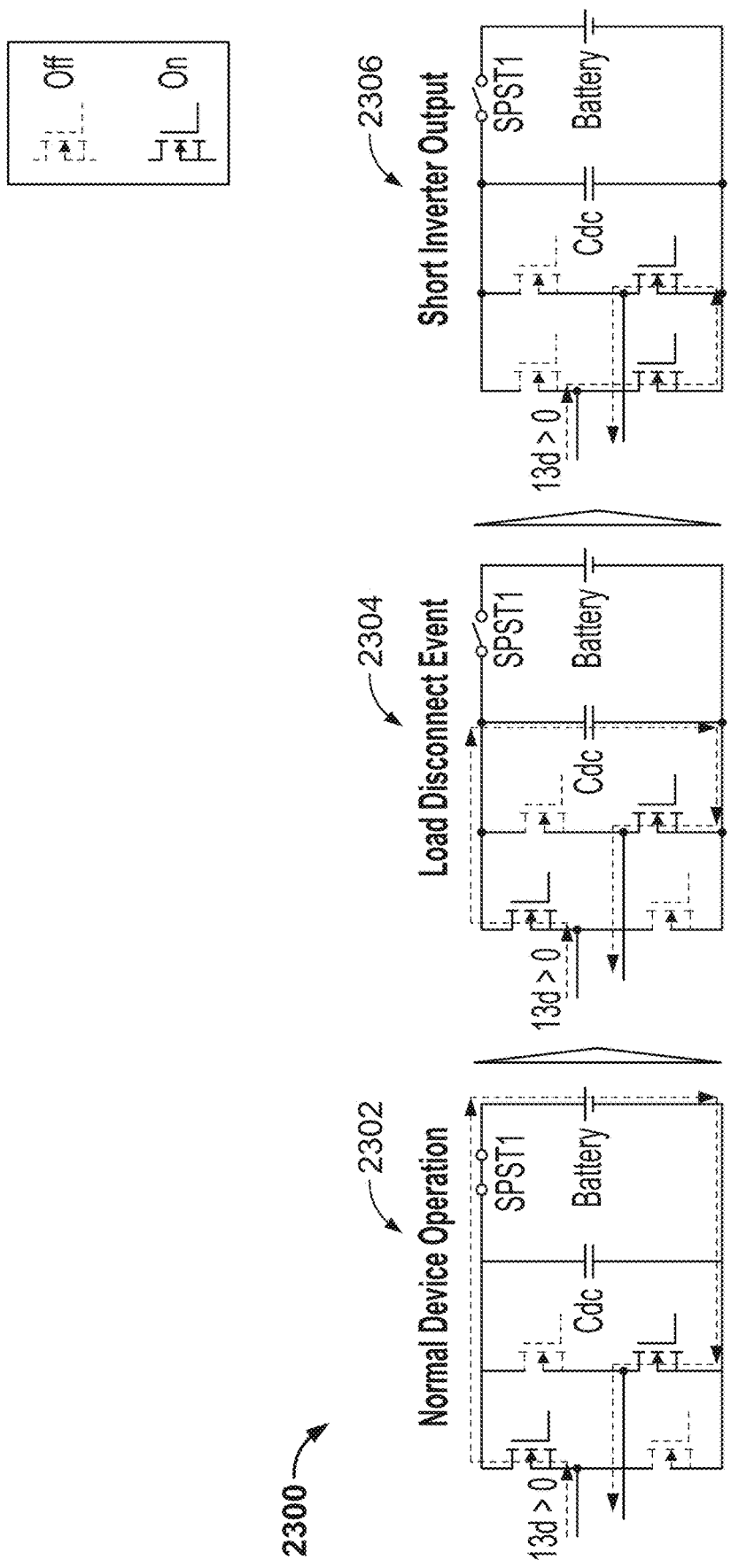
FIG. 23 shows a series of diagrams depicting the operation of the inverter-rectifier in response to a load disconnect when assigned a rectifier operating personality.

As indicated by Truth Tables 1 and 4, if the operating personality indicates that the wireless power transfer device is operating as a rectifier (power receiver) (e.g., TMN_SIDE=1) and the hardware configuration is as a VA (INVREC_SIDE=1) when a fault occurs (e.g., as indicated by REC_FLTS going high) the control circuitry can shutdown the inverter-rectifier by overriding the PWM control signals to short the AC side of the inverter-rectifier (e.g., gate drive signals G3, G4=1). For example, FIG. 23 shows a series of diagrams 2300 depicting the operation of the inverter-rectifier in response to a load disconnect when assigned a rectifier operating personality. The diagrams 2300 illustrate the switching of the grid tied inverter if there is a grid disconnect, or the switching of the vehicle inverter if there is a battery disconnect (when battery is the load) is shown. In diagram 2302 the inverter-rectifier is operating normally as a rectifier. In diagram 2304 the load disconnect occurs routing current through capacitor Cdc. The output capacitor (decoupling capacitor Cdc) operates as the overvoltage/load disconnect sensor as described above, however it is understood that other sensing means can be employed. As discussed above, upon detection of the load disconnect and identification that the inverter-rectifier is operating as a rectifier and has a hardware configuration as a VA, the control circuitry shorts the AC side of the inverter by turning transistors Q3 and Q4 on, and open circuits the DC side by turning transistors Q1 and Q2 off (diagram 2306).

In some implementations, shorting the AC side of the inverter-rectifier in response to a VA side fault (such as a load disconnect) during operation as a rectifier (power receiver) causes a corresponding fault to occur on the associated GA side device by initiating overcurrent and/or overvoltage transients on the GA side device, as discussed above in reference to FIG. 14. Initiating a GA side shutdown in this manner may provide a quicker system wide fault response rather than passing fault codes through the communication link. For example, if the communication link fails or experiences a slow connection (e.g., increased noise or bit errors).

In some implementations, the assertion of REC_FLTS also causes the OC_CMD signal to be asserted. This signal drives the switch 2102 in FIG. 21, which switches in a resistor to aid in power dissipation. The signal may also directly drive switches which short components of the impedance matching network, such as SW1 1608 of FIG. 16.

In some implementations, in the event of a grid-disconnect (e.g., when the hardware configuration is GA) the control circuitry can shutdown the inverter by turning all the transistors Q1-Q4 off.

In some implementations, the wireless power transfer devices can include a load disconnect sensor. For example, a load disconnect can be detected by an over voltage or an under current condition at the output (load side) of an inverter-rectifier when operating as a rectifier. For example, a VA side device operating as a receiver may detect a load disconnect by receiving an over voltage fault, an undercurrent fault, or both. In response, control and protection circuitry in the VA side device can shutdown the inverter-rectifier by shorting two or more rectifier protection switches (e.g., Q3 and Q4 of FIG. 21). Each of the protection switches may also be coupled to a diode to include a body-diode. The control and protection circuitry in the VA side device can short a protection switch coupled to a TMN to short (and protect) the TMN. Shorting the inverter-rectifier may cause a corresponding overcurrent transient on the GA side device. In response to the overcurrent fault, the GA side device (operating as a transmitter) can shutdown its inverter-rectifier and short its TMN. The current and voltage response to a load disconnect event are described in more detail above in reference to FIG. 14.

In reference to FIG. 16, in some implementations, the resonator coil L1s may be designed to accommodate for higher current during load disconnect conditions. However, methods such as shorting parallel TMN elements (such as C2) and/or switching in a resistor (such as R1), may be important in implementations where excess coil current/voltage may cause arcing or heating at the coil L1s.

In some implementations, a communication link (e.g., a WiFi link) can be used to protect the system from failure. For example, if a load disconnect occurs the receiver can inform the transmitter of the fault via the communication link. During low power operation the shutdown operation of the receiver as described above may not induce a large enough transient current in the transmitter to produce a corresponding over current fault. Therefore, the fault communicated through the communication link may serve to trigger protective action by the transmitter. For example, the receiver side, upon detection of a fault, such as a load disconnect (over voltage), would communicate the fault information to the transmitter side via the WiFi or other out-of-band communication requiring the source side inverter to turn-off. In the meantime until the transmitter-side inverter turns off, protection mechanisms on the receiver side such as switching in resistor R1 and or shorting components of the TMN and or IMN can allow for reducing of coil currents.

In some implementations, upon detection of an overvoltage condition (e.g. because of load disconnect), upon detecting V(v_bus+) rising in the output capacitor, the resistor R1 parallel with the load, can be switched in, and/or the capacitor C2 in parallel with the load can be shorted in by the controller. Switching in the parallel resistor R1 can allow some or all the current to circulate in the resistor, and shorting the capacitor C2 can reduce excess coil current on the load-side coil. This can ensure the system is safe until an error message containing information regarding the fault can be communicated from the load side to the source side. The error message can include requiring the source side inverter to turn-off, or the error message can be interpreted by the source side inverter as a command to turn off. In some implementations (e.g., for an 11 kW system), the resistor R1 can be sized according to the power rating of the system and the communication channel latency (from the load side to the source side) time, and/or the time the source side takes to shut down power.

In some implementations, a load short fault can be detected by an under voltage fault at the output of the rectifier. For example, a VA side device operating as a receiver (e.g., inverter-rectifier operating as a rectifier) can detect a load short condition when the output voltage drops at the rectifier output. In response, the control and protection circuitry of the VA side device can short a protection switch coupled to a TMN on the VA side device. This may cause a corresponding current transient in the GA side device operating as a transmitter. In response, the control and protection circuitry on the GA side device may detect an overcurrent condition. In response, the control and protection circuitry on the GA side device can short a protection switch coupled to a TMN on the GA side device In this disclosure, certain circuit or system components such as capacitors, inductors, resistors, are referred to as circuit "components" or "elements." The disclosure also refers to series and parallel combinations of these components or elements as elements, networks, topologies, circuits, and the like. More generally, however, where a single component or a specific network of components is described herein, it should be understood that alternative implementations may include networks for elements, alternative networks, and/or the like.

As used herein, the term "direct connection" or "directly connected," refers to a direct connection between two elements where the elements are connected with no intervening active elements between them. The term "electrically connected" or "electrical connection," refers to an electrical connection between two elements where the elements are connected such that the elements have a common potential. In addition, a connection between a first component and a terminal of a second component means that there is a path between the first component and the terminal that does not pass through the second component.

As used herein, the term "coupled" when referring to circuit or system components is used to describe an appropriate, wired or wireless, direct or indirect, connection between one or more components through which information or signals can be passed from one component to another. Furthermore, the term "coupled" when used in reference to electric circuit components or electric circuits generally refers to an "electrical connection" unless otherwise stated.

Implementations of the subject matter and the operations described in this specification can be realized in digital electronic circuitry, or in computer software, firmware, or hardware, including the structures disclosed in this specification and their structural equivalents, or in combinations of one or more of them. Implementations of the subject matter described in this specification can be realized using one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal; a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer can include a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a wireless power transmitter or receiver or a wirelessly charged or powered device such as a vehicle, a mobile telephone, a personal digital assistant (PDA), a mobile audio or video player, a game console, or a Global Positioning System (GPS) receiver, to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

While this specification contains many specific implementation details, these should not be construed as limitations on the scope of any implementation of the present disclosure or of what may be claimed, but rather as descriptions of features specific to example implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A fault protection method for a bidirectional wireless power transfer system, the method comprising:
   detecting, by control circuitry of a wireless power transfer device, a fault for the bidirectional wireless power transfer system;
   identifying, by the control circuitry, an operating personality of the wireless power transfer device and a hardware configuration of the wireless power transfer device;
   in response to detecting the fault, identifying, by the control circuitry and based on the operating personality and the hardware configuration, protection operations for protecting the wireless power transfer device from the fault; and
   controlling, by the control circuitry, operations of the wireless power transfer device according to the protection operations, wherein the protection operations cause a corresponding fault condition in a second wireless power transfer device that is magnetically coupled to the wireless power transfer device.

2. The method of claim 1, wherein, in response to the operating personality indicating that the wireless power transfer device is operating as a wireless power transmitter, the protection operations comprise:
   shutting down an inverter-rectifier; and
   shorting at least a portion of an impedance matching circuit.

3. The method of claim 2, wherein shutting down the inverter-rectifier comprises overriding inverter-rectifier pulse width modulation (PWM) control signals.

4. The method of claim 1, wherein, in response to the operating personality indicating that the wireless power transfer device is operating as a wireless power receiver and the hardware configuration indicating that the wireless power transfer device is configured as a grid-connected system, the protection operations comprise:
   shutting down an inverter-rectifier;
   shorting at least a portion of an impedance matching circuit to dissipate current from a resonator coil; and
   switching in a resistor configured to dissipate excess power from the inverter-rectifier.

5. The method of claim 4, wherein shutting down the inverter-rectifier comprises overriding inverter-rectifier pulse width modulation (PWM) control signals.

6. The method of claim 1, wherein, in response to the operating personality indicating that the wireless power transfer device is operating as a wireless power receiver, the protection operations comprise:
   shutting down an inverter-rectifier; and
   shorting at least a portion of an impedance matching circuit to dissipate current from a resonator coil.

7. The method of claim 6, wherein shutting down the inverter-rectifier comprises overriding inverter-rectifier pulse width modulation (PWM) control signals.

8. The method of claim 1, wherein, in response to the operating personality indicating that the wireless power transfer device is operating as a wireless power receiver and the hardware configuration indicating that the wireless power transfer device is configured as a device-connected system, the protection operations comprise closing switches of an inverter-rectifier to provide a short circuit between terminals of a resonator coil.

9. The method of claim 1, wherein the fault is at least one of: a tunable impedance matching network fault, an overcurrent fault, or an overvoltage fault.

10. The method of claim 1, wherein the fault is an overvoltage fault or an overcurrent fault triggered by a load disconnect.

11. The method of claim 1, further comprising initiating the fault by disconnecting a load from the wireless power transfer device in response to detecting a vehicle collision.

12. A method of operating a bidirectional wireless power transfer system, the method comprising:
 transmitting, by a first wireless power transfer device to a second wireless power transfer device, instructions to reverse a direction of power flow between the first wireless power transfer device and the second wireless power transfer device;
 receiving, from the second wireless power transfer device, an indication that the second wireless power transfer device has reconfigured to operate according a reverse direction of power flow;
 in response to the indication:
  assigning an operating personality of the first wireless power transfer device in accordance with the reverse direction of power flow, wherein the operating personality indicates that the first wireless power transfer device is operating as a wireless power receiver; and
  controlling operation of an inverter-rectifier of the first wireless power transfer device for operation according to the operating personality, wherein controlling operation of the inverter-rectifier comprises:
   in response to a power at the inverter-rectifier being less than a threshold value, operating the inverter-rectifier in a passive rectifier mode; and
   in response to the power at the inverter-rectifier being greater than a threshold value, generating pulse width modulation (PWM) control signals for operating the inverter-rectifier in an active rectification mode.

13. The method of claim 12, wherein controlling operation of the inverter-rectifier comprises generating pulse width modulation (PWM) control signals for operating the inverter-rectifier as a rectifier.

14. The method of claim 12, wherein the PWM control signals alternately turn on corresponding pairs of transistors in the inverter-rectifier to generate a DC output signal.

15. The method of claim 12, wherein the PWM control signals alternately turn on corresponding pairs of transistors in the inverter-rectifier in response to detecting a zero current condition at an input to the inverter-rectifier.

16. The method of claim 12, further comprising in response to the indication, resetting a tunable matching network of the first wireless power transfer device and controlling operation of the tunable matching network according to the assigned operating personality.

17. The method of claim 12, wherein the first wireless power transfer device is coupled to a vehicle and the second wireless power transfer device is coupled to a power grid.

18. A fault protection method for a bidirectional wireless power transfer system, the method comprising:
 detecting, by control circuitry of a wireless power transfer device, a fault for the bidirectional wireless power transfer system;
 identifying, by the control circuitry, an operating personality of the wireless power transfer device and a hardware configuration of the wireless power transfer device;
 in response to detecting the fault, identifying, by the control circuitry and based on the operating personality and the hardware configuration, protection operations for protecting the wireless power transfer device from the fault; and
 controlling, by the control circuitry, operations of the wireless power transfer device according to the protection operations,
 wherein, in response to the operating personality indicating that the wireless power transfer device is operating as a wireless power transmitter, the protection operations comprise:
  shutting down an inverter-rectifier; and
  shorting at least a portion of an impedance matching circuit.

19. A fault protection method for a bidirectional wireless power transfer system, the method comprising:
 detecting, by control circuitry of a wireless power transfer device, a fault for the bidirectional wireless power transfer system;
 identifying, by the control circuitry, an operating personality of the wireless power transfer device and a hardware configuration of the wireless power transfer device;
 in response to detecting the fault, identifying, by the control circuitry and based on the operating personality and the hardware configuration, protection operations for protecting the wireless power transfer device from the fault; and
 controlling, by the control circuitry, operations of the wireless power transfer device according to the protection operations,
 wherein, in response to the operating personality indicating that the wireless power transfer device is operating as a wireless power receiver, the protection operations comprise:
  shutting down an inverter-rectifier; and
  shorting at least a portion of an impedance matching circuit to dissipate current from a resonator coil.

20. A fault protection method for a bidirectional wireless power transfer system, the method comprising:
 detecting, by control circuitry of a wireless power transfer device, a fault for the bidirectional wireless power transfer system;
 identifying, by the control circuitry, an operating personality of the wireless power transfer device and a hardware configuration of the wireless power transfer device;
 in response to detecting the fault, identifying, by the control circuitry and based on the operating personality and the hardware configuration, protection operations for protecting the wireless power transfer device from the fault; and
 controlling, by the control circuitry, operations of the wireless power transfer device according to the protection operations,
 wherein, in response to the operating personality indicating that the wireless power transfer device is operating as a wireless power receiver and the hardware configuration indicating that the wireless power transfer device is configured as a device-connected system, the protection operations comprise closing switches of an inverter-rectifier to provide a short circuit between terminals of a resonator coil.

* * * * *